United States Patent
Sather et al.

(10) Patent No.: US 12,061,988 B1
(45) Date of Patent: *Aug. 13, 2024

(54) DECOMPOSITION OF TERNARY WEIGHT TENSORS

(71) Applicant: Perceive Corporation, San Jose, CA (US)

(72) Inventors: Eric A. Sather, Palo Alto, CA (US); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 849 days.

This patent is subject to a terminal disclaimer.

(21) Appl. No.: 17/089,653

(22) Filed: Nov. 4, 2020

Related U.S. Application Data

(60) Provisional application No. 63/065,472, filed on Aug. 13, 2020.

(51) Int. Cl.
*G06N 3/08* (2023.01)
*G06N 3/04* (2023.01)
*G06N 3/084* (2023.01)

(52) U.S. Cl.
CPC .............. *G06N 3/084* (2013.01); *G06N 3/04* (2013.01)

(58) Field of Classification Search
CPC ......... G06N 3/084; G06N 3/04; G06N 3/0985
See application file for complete search history.

(56) References Cited

U.S. PATENT DOCUMENTS

| | | |
|---|---|---|
| 9,904,874 B2 | 2/2018 | Shoaib et al. |
| 11,468,313 B1 | 10/2022 | Naumov et al. |
| 2013/0138589 A1 | 5/2013 | Yu et al. |
| 2016/0086078 A1 | 3/2016 | Ji et al. |
| 2016/0174902 A1 | 6/2016 | Georgescu et al. |
| 2017/0286830 A1 | 10/2017 | El-Yaniv et al. |
| 2018/0107925 A1 | 4/2018 | Choi et al. |
| 2019/0065896 A1* | 2/2019 | Lee .......................... G06N 3/045 |
| 2019/0138882 A1 | 5/2019 | Choi et al. |
| 2019/0138896 A1 | 5/2019 | Deng |
| 2019/0171927 A1 | 6/2019 | Diril et al. |
| 2019/0180184 A1 | 6/2019 | Deng et al. |
| 2019/0188557 A1 | 6/2019 | Lowell et al. |

(Continued)

OTHER PUBLICATIONS

Wang, "Fixed-point Factorized Networks", 2017 IEEE Conference on Computer Vision and Pattern Recognition. (Year: 2017).*

(Continued)

*Primary Examiner* — Dave Misir
(74) *Attorney, Agent, or Firm* — ADELI LLP

(57) ABSTRACT

Some embodiments provide a method for training parameters of a network. The method receives a network with layers of nodes. Each node of a set of the layers computes an output value based on a set of input values and a set of trained weight values. A first layer of the network includes a first number of filters. The method replaces the first layer with a second layer having a second number of filters that is less than the first number and a third layer, following the second layer, having the first number of filters. Each weight value in the filters of the second and third layers is restricted to a set of allowed quantized weight values. A total number of weight values in the filters of the second and third layers is less than a total number of weight values in the filters of the first layer.

24 Claims, 27 Drawing Sheets

(56) References Cited

U.S. PATENT DOCUMENTS

| | | |
|---|---|---|
| 2019/0286970 A1 | 9/2019 | Karaletsos et al. |
| 2019/0340492 A1 | 11/2019 | Burger et al. |
| 2019/0354842 A1 | 11/2019 | Louizos et al. |
| 2020/0134461 A1 | 4/2020 | Chai et al. |
| 2020/0202213 A1 | 6/2020 | Rouhani et al. |
| 2020/0202218 A1 | 6/2020 | Csefalvay |
| 2020/0210838 A1 | 7/2020 | Lo et al. |
| 2020/0264876 A1 | 8/2020 | Lo et al. |
| 2020/0302269 A1 | 9/2020 | Ovtcharov et al. |
| 2021/0019630 A1* | 1/2021 | Yao .................. G06N 3/045 |
| 2021/0248459 A1* | 8/2021 | Li ...................... G06N 3/045 |
| 2021/0264271 A1* | 8/2021 | Gebre ............... G06N 3/045 |
| 2021/0406672 A1 | 12/2021 | Hoang et al. |

OTHER PUBLICATIONS

Sze, "Efficient Processing of Deep Neural Networks: A Tutorial and Survey", IEEE, 2017. (Year: 2017).*
Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.
Martens, James, "New Insights and Perspectives on the Natural Gradient Method," Nov. 21, 2017, 59 pages, retrieved from https://arxiv.org/abs/1412.1193v9.
Withagen, Heini, "Reducing the Effect of Quantization by Weight Scaling, " Proceedings of 1994 IEEE International Conference on Neural Networks (ICNN '94), Jun. 28-Jul. 2, 1994, 3 pages, IEEE, Orlando, Florida, USA.
Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.
Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.
Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.
Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.
Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.
Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.
Courbariaux, Matthieu, et al., "Binarized Neural Networks: Training Neural Networks with Weights and Activations Constrained to +1 or -1," Mar. 17, 2016, 11 pages, arXiv:1602.02830v3, Computing Research Repository (CoRR)—Cornell University, Ithaca, NY, USA.
Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.
Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.
Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.
He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.
Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.
Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.
Jain, Anil K., et al., "Artificial Neural Networks: A Tutorial," Computer, Mar. 1996, 14 pages, vol. 29, Issue 3, IEEE.
Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.
Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.
Kingma, Diederik P., et al., "Auto-Encoding Variational Bayes," May 1, 2014, 14 pages, arXiv:1312.6114v10, Computing Research Repository (CoRR)—Cornell University, Ithaca, NY, USA.
Kong, Chen, et al., "Take it in your stride: Do we need striding in CNNs?," Dec. 7, 2017, 9 pages, arXiv:1712.02502v1, Computer Research Repository (CoRR)—Cornell University, Ithaca, NY, USA.
Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.
Li, Fengfu, et al., "Ternary Weight Networks," May 16, 2016, 9 pages, arXiv:1605.04711v1, Computing Research Repository (CoRR)—Cornell University, Ithaca, NY, USA.
Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.
Moshovos, Andreas, et al., "Exploiting Typical Values to Accelerate Deep Learning," Computer, May 24, 2018, 13 pages, vol. 51—Issue 5, IEEE Computer Society, Washington, D.C.
Non-Published Commonly Owned Related U.S. Appl. No. 17/089,648 with similar specification, filed Nov. 4, 2020, 118 pages, Perceive Corporation.
Non-Published Commonly Owned Related U.S. Appl. No. 17/089,660 with similar specification, filed Nov. 4, 2020, 118 pages, Perceive Corporation.
Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.
Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.
Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.
Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

(56) References Cited

OTHER PUBLICATIONS

Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.

Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.

Yang, Tien-Ju, et al., "Designing Energy-Efficient Convolutional Neural Networks using Energy-Aware Pruning," Apr. 18, 2017, 9 pages, arXiv:1611.05128v4, Computer Research Repository (CoRR)—Cornell University, Ithaca, NY, USA.

Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.

Zhang, Dongqing, et al., "LQ-Nets: Learned Quantization for Highly Accurate and Compact Deep Neural Networks," Jul. 26, 2018, 21 pages, arXiv:1807.10029v1, Computer Research Repository (CoRR)—Cornell University, Ithaca, NY, USA.

Zhou, Shuchang, et al., "DoReFa-Net: Training Low Bitwidth Convolutional Neural Networks with Low Bitwidth Gradients," Jul. 17, 2016, 14 pages, arXiv:1606.06160v2, Computer Research Repository (CoRR)—Cornell University, Ithaca, NY, USA.

Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.

Bhattacharya, Sourav, et al., "Sparsification and Separation of Deep Learning Layers for Constrained Resource Inference on Wearables," SenSys '16, Nov. 14-16, 2016, 15 pages, ACM, Stanford, CA, USA.

Han, Song, et al., "Learning Both Weights and Connections for Efficient Neural Networks," Oct. 30, 2015, 9 pages, retrieved from https://arxiv.org/abs/1506.02626.

Hu, Hengyuan, et al., "Network Trimming: A Data-Driven Neuron Pruning Approach towards Efficient Deep Architectures," Jul. 12, 2016, 9 pages, retrieved from https://arxiv.org/abs/1607.03250v1.

Neklyudov, Kirill, et al., "Structured Bayesian Pruning via Log-Normal Multiplicative Noise," Proceedings of the 31st Conference on Neural Information Processing Systems (NIPS 2017), Dec. 4-9, 2017, 10 pages, ACM, Long Beach, CA, USA.

Wang, Peiqi, et al., "SNrram: An Efficient Sparse Neural Network Computation Architecture Based on Resistive Random-Access Memory," DAC '18, Jun. 24-29, 2018, 7 pages, ACM, San Francisco, CA, USA.

Chen, Shangyu, et al., "Deep Neural Network Quantization via Layer-Wise Optimization Using Limited Training Data," Proceeding of the 33rd AAAI Conference on Artificial Intelligence (AAAI-19), Jul. 2019, 8 pages, AAAI.

He, Yang, et al., "Soft Filter Pruning for Accelerating Deep Convolutional Neural Networks," Aug. 21, 2018, 8 pages, retrieved from https://arxiv.org/abs/1808.06866.

Hu, Yiming, et al., "A Novel Channel Pruning Method for Deep Neural Network Compression," May 29, 2018, 10 pages, retrieved from https://arxiv.org/abs/1805.11394.

Jaderberg, Max, et al., "Speeding Up Convolutional Neural Networks with Low Rank Expansions," May 15, 2014, 12 pages, retrieved from https://arxiv.org/abs/1405.3866.

Kozyrskiy, Nikolay, et al., "CNN Acceleration by Low-Rank Approximation with Quantized Factors," Jun. 16, 2020, 14 pages, retrieved from https://arxiv.org/abs/2006.08878.

Molchanov, Pavlo, et al., "Pruning Convention Neural Networks for Resource Efficient Inference," Jun. 8, 2017, 17 pages, retrieved from https://arxiv.org/abs/1611.06440.

Yang, Huanrui, et al., "Learning Low-rank Deep Neural Networks via Singular Vector Orthogonality Regularization and Singular Value Sparsification," Apr. 20, 2020, 14 pages, retrieved from https://arxiv.org/abs/2004.09031.

Zhang, Xiangyu, et al., "Accelerating Very Deep Convolutional Networks for Classification and Detection," Nov. 18, 2015, 14 pages, retrieved from https://arxiv.org/abs/1505.06798.

Vaswani, Sharan, "Exploiting Sparsity in Supervised Learning," Month Unknown 2014, 9 pages, retrieved from https://vaswanis.github.io > optimization_report.

Yan, Shi, "L1 Norm Regularization and Sparsity Explained for Dummies," Aug. 27, 2016, 13 pages, retrieved from https://blog.mlreview.com/l1-norm-regularization-and-sparsity-explained-for-dummies-5b0e4be3938a.

Jin, Canran,, et al., "Sparse Ternary Connect: Convolutional Neural Networks Using Terrorized Weights with Enhanced Sparsity," 2018 23rd Asia and South Pacific Design Automation Conference (ASP-DAC), Jan. 22-25, 2018, 6 pages, IEEE, Jeju, South Korea.

Li, Yawei, et al., "Group Sparsity: The Hinge Between Filter Pruning and Decomposition for Network Compression," Mar. 20, 2020, 14 pages, arXiv:2003.08935, Computer Research Repository (CoRR)—Cornell University, Ithaca, NY, USA.

Marban, Arturo, et al., "Learning Sparse & Ternary Neural Networks with Entropy-Constrained Trained Terrorization (EC2T)," May 25, 2020, 11 pages, arXiv:2004.01077, Computer Research Repository (CoRR)—Cornell University, Ithaca, NY, USA.

* cited by examiner

DECOMPOSITION OF TERNARY WEIGHT TENSORS

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feed-forward, convolutional, recurrent, long-short term memory (LSTM), and Neural Turing Machines (NTM).

Neural networks typically involve many (e.g., thousands, millions, or even potentially billions) of weights that are calculated during training and then used when the neural network is embedded into a device. For instance, layers in a ResNet50 network (a known network architecture for image analysis) may have up to 512 3×3 kernels (which may have a depth up to 512) in a single layer, which would include over 2 million weights in a single layer. Recently, techniques have been introduced to solve this issue in part by creating very sparse networks (i.e., with most weight values set to zero). However, other techniques for reducing the number of weights, especially in these larger layers, would be useful.

BRIEF SUMMARY

Some embodiments of the invention train the parameters of a machine-trained (MT) network while reducing the number of parameters (e.g., weights) in certain layers by decomposing a first network layer (e.g., a convolutional or fully-connected layer) having a first number of filters into two successive layers (referred to here as second and third layers). In some embodiments, the second layer has fewer filters than the first layer, but these filters are the same size (i.e., have the same number of weights) and are implemented in the same manner as the first-layer filters. The third layer then has the same number of filters as the first layer, but these are smaller filters (e.g., 1×1 convolutions, which have fewer weights). In other embodiments, the filters of the second and third layers both have fewer weights per filter than the first layer, though the second layer still has fewer filters than the first layer and the third layer has the same number of filters as the first layer. The result is that the output feature maps of the third layer have the same structure as the output feature maps of the first layer, while requiring fewer weights to be trained (and thus fewer weights to be stored by a circuit that implements the network).

In some embodiments, each of the weights is restricted to a set of allowed quantized weight values (e.g., the set $\{0,1,-1\}$ or $\{0,\alpha_k,-\alpha_k\}$). In addition, in some embodiments, the training is further complicated in that the output values of the second layer are quantized (e.g., to a particular number of bits). The combination of (i) weight quantization (e.g., ternarization), (ii) weight sparsity (ensuring that a threshold of the weight values are equal to zero), and (iii) output value quantization allows for the network to be implemented by a specialized neural network inference circuit of some embodiments that restricts the types of allowable networks in the interest of power and memory savings. However, these features (weight and output value quantization) also make training the network more complicated. Whereas a layer of a network with floating-point weight and output values could be decomposed as described after training with minimal loss of accuracy, a result of the weight and value quantization is that the decomposition is better handled during training.

In some embodiments, the training process for the weights of the MT network (with or without decomposition of one or more layers) involves initially training the layers without restricting the weights to allowed sets of values (e.g., training the weights as floating-point values using a standard stochastic gradient descent (SGD) operation), then using these initially-trained values for the weights to (i) determine the sets of allowed values for each layer and (ii) train the weights as restricted to their respective sets of allowed values. After training, each weight value for each node in a given layer will have an assigned weight value that is one of the allowed values for the layer. In some such embodiments, the set of allowed values has two allowed values of $\{0, \alpha\}$ or three allowed values of $\{0, \alpha, -\alpha\}$. The value $\alpha$ can vary between layers ($\alpha_k$ may be used to indicate the allowed scale value for the layer k, or between filters within a layer). During training, various techniques are used (e.g., as factors in a loss function that measures network output accuracy and is used to adjust the weight values and other parameters) to constrain the weights to their respective allowed values and, in some embodiments, to ensure that at least a threshold percentage of the values are set to 0.

When training the network to introduce weight and/or output value quantization, different embodiments use different approaches to training the weight values. As mentioned, some embodiments initially train the weights without quantization (e.g., using floating-point values), then quantize the weights and continue training with quantization. In some such embodiments, the decomposition of one or more layers of the original network is introduced between the initial training (without quantization) and the subsequent quantization and additional training. Some such embodiments use the alternating direction method of multipliers (ADMM) technique to constrain the weight values for each quantized layer (including the decomposed layers) to their respective sets of allowed values. In addition, some embodiments use a further set of penalty terms in the loss function that accounts for (i) the loss of accuracy introduced by quantization and/or (ii) the relationships between weights within the decomposed layers.

Specifically, for ADMM training, some embodiments project the floating-point weight values onto the allowed quantized weight values using a loss function that measures error based on the difference between the projected weight values and the quantized weight values as well as the relative importance of the weights. This projection operation also imposes a sparsity constraint, in some embodiments, requiring that at least a particular percentage of the quantized weight values be set to zero (e.g., by pushing to zero those weights for which the penalty to the loss function for doing so is smallest). After the projection operation, some embodiments perform additional training by converting the quantized weight values back to floating-point values and performing SGD training. The loss function used for this SGD training, in some embodiments, includes a loss-aware ADMM penalty term that pushes the weights towards the quantized weight values.

Some embodiments calculate the loss-aware penalty term of the loss function using the Hessian matrix of the first term of the loss function (that measures the difference between actual output and expected output), where the diagonal values of the Hessian matrix are second-order partial derivatives of the loss function with respect to each weight in the MT network. In some embodiments, the loss increase for a particular weight is linearly related to a corresponding diagonal term of the Hessian matrix. To minimize the computational burden of calculating the Hessian terms, some embodiments approximate the diagonal terms of the Hessian matrix using an empirical Fisher approximation method. The Fisher approximation method estimates the Hessian by computing first-order derivatives (e.g., gradients) of the loss function (with respect to the weights) during multiple prior training iterations of the MT network.

After initial training (before quantization), and with the Hessian matrix approximated (this is also referred to herein as the loss matrix), some embodiments initialize the quantization process for a layer that will be decomposed by performing a loss-aware singular value decomposition (SVD) of the weight tensor for the layer. The weight tensor is a representation of all of the weights for all of the filters of the layer—as each filter in the layer is a three-dimensional tensor, the overall weight tensor for the layer is a four-dimensional tensor (two dimensions are the kernel size (e.g., 3×3), while the number of input feature maps and number of filters are the other two dimensions). This loss-aware decomposition is mapped into a set of four tensors: (i) a first set of ternary weight values having the same dimensions as the first layer but with fewer filters, (ii) a first set of scale values for the first set of ternary weights, (iii) a second set of ternary weight values having a 1×1 kernel size, the same number of input feature maps as the first set of ternary weight values has filters, and the same number of filters as the first layer, and (iv) a set of scale values for the second set of ternary weights. For both the first and second sets of scale values, each scale value corresponds to multiple weights (e.g., to all weights in a filter).

Some embodiments ternarize the second set of weight values, then first set of weight values, and use multiple passes in order to refine the ternarization of one set based on the current ternarization of the other (using the loss function to try to minimize the error introduced by ternarization). During this iterative process, the scale values are also optimized. In addition, these optimizations also account for output value quantization between application of the first pair of tensors (the first set of ternary weights and first set of scale values) and the second pair of tensors (the second set of ternary weights and second set of scale values).

After performing projection, some embodiments perform additional SGD training (allowing the weight values to move freely as floating point values) while using an additional penalty term that pushes the weight values to the quantized weights (by imposing an additional loss factor based on the distance of the weight from its ternary value). In some embodiments, the weights are not decomposed during the SGD training, but the penalty term pushes the floating-point weight tensor towards the product of the four weight/scale tensors listed above. During this training, some embodiments model the effect of the intermediate value quantization by adding noise to the output values. Iterations of the projection operation and the SGD training are repeated as necessary in some embodiments. After training, the layer is decomposed again into two distinct weight matrices with scale values.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention train the parameters of a machine-trained (MT) network while reducing the number of parameters (e.g., weights) in certain layers by decomposing a first network layer (e.g., a convolutional or fully-connected layer) having a first number of filters into two successive layers (referred to here as second and third layers). In some embodiments, the second layer has fewer filters than the first layer, but these filters are the same size (i.e., have the same number of weights) and are implemented in the same manner as the first-layer filters. The third layer then has the same number of filters as the first layer, but these are smaller filters (e.g., 1×1 convolutions, which have fewer weights). In other embodiments, the filters of the second and third layers both have fewer weights per filter than the first layer, though the second layer still has fewer filters than the first layer and the third layer has the same number of filters as the first layer. The result is that the output feature maps of the third layer have the same structure as the output feature maps of the first layer, while requiring fewer weights to be trained (and thus fewer weights to be stored by a circuit that implements the network).

Figure 1:
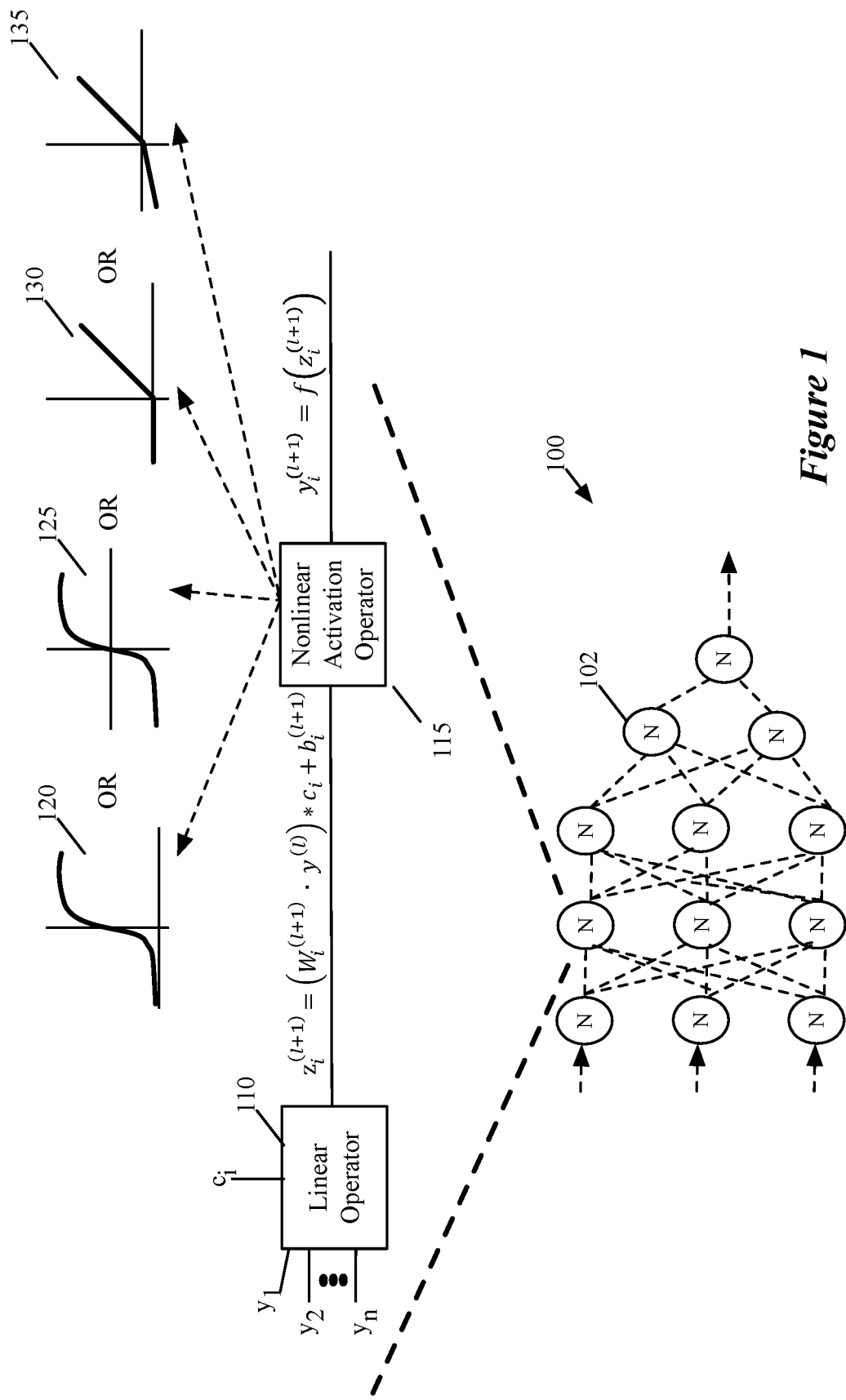
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a pre-defined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, element-wise operation layers, fully-connected layers, and/or normalization layers. The convolutional layers of some embodiments use a small kernel (e.g., 3×3) to process blocks of input values (output values from the previous layer) in a set of two-dimensional grids (e.g., channels of pixels of an image, input feature maps) with the same set of parameters. The kernels (also referred to as filters) are three-dimensional, and multiple kernels are used to process each group of input values in a layer (resulting in a set of three-dimensional output grids, also referred to as output feature maps). Pooling layers combine clusters of outputs from one layer into a single node at the next layer, as part of the process of reducing an image (which may have a large number of pixels) or other input item down to a smaller size (e.g., a vector output). In some embodiments, pooling layers can use max pooling (in which the maximum value among the clusters of node outputs is selected) or average pooling (in which the clusters of node outputs are averaged).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, multiplies this by a scaling value (which may be set to 1), and adds an offset. In other words, a hidden or output node's linear operator computes a scaled weighted sum of its inputs (which are outputs of the previous layer of nodes) plus an offset (also referred to as a bias). Similarly, the linear component 110 of each input node of some embodiments computes a dot product of a vector of weight coefficients and a vector of input values, scales this dot product, and adds an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable 1 can be any of the hidden layers (i.e., $l \in \{1, \ldots, L-1\}$ index the hidden layers of the network, with l=0 representing the input layer and l=L representing the output layer). The variable $z_i^{(l+1)}$ represents the output of the linear component of a hidden node i in layer l+1. As indicated by the following Equation (1), the variable $z_i^{(l+1)}$ is computed as the dot product of a vector of weight values $W_i^{(l+1)}$ and a vector of outputs $y^{(l)}$ from layer l multiplied by a scaling value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n} \left(W_{ik}^{(l+1)} \cdot y_k^{(l)}\right) * c_i + b_i^{(l+1)}. \quad (1)$$

The scaling value $c_i$ is a value to which all the weight values for the node are normalized. In some embodiments, the scaling value $c_i$ is 1. The symbol * is an element-wise product, while the symbol is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments require that at least a threshold percentage of the weight values (for a given layer or for the entire network) are equal to zero (e.g., 75%, 80%, etc.).

The output $y^{(l+1)}$ of the nonlinear component 115 of a node in layer l+1 is a function of the node's linear component, and can be expressed as by Equation (2) below:

$$y_i^{(l+1)} = f(z_i^{(l+1)}). \quad (2)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions. Equation (2) can be expressed in the following expanded format of Equation (3):

$$y_i^{(l+1)} = f(z_i^{(l+1)}) = f\left[\left(\sum_{k=1}^{n} w_{ik} * y_k\right) * c_i + b_i^{(l+1)}\right]. \quad (3)$$

In this equation, $w_{ik}$ are weight values associated with the inputs $y_k$ of the node i in layer l+1.

Figure 2:
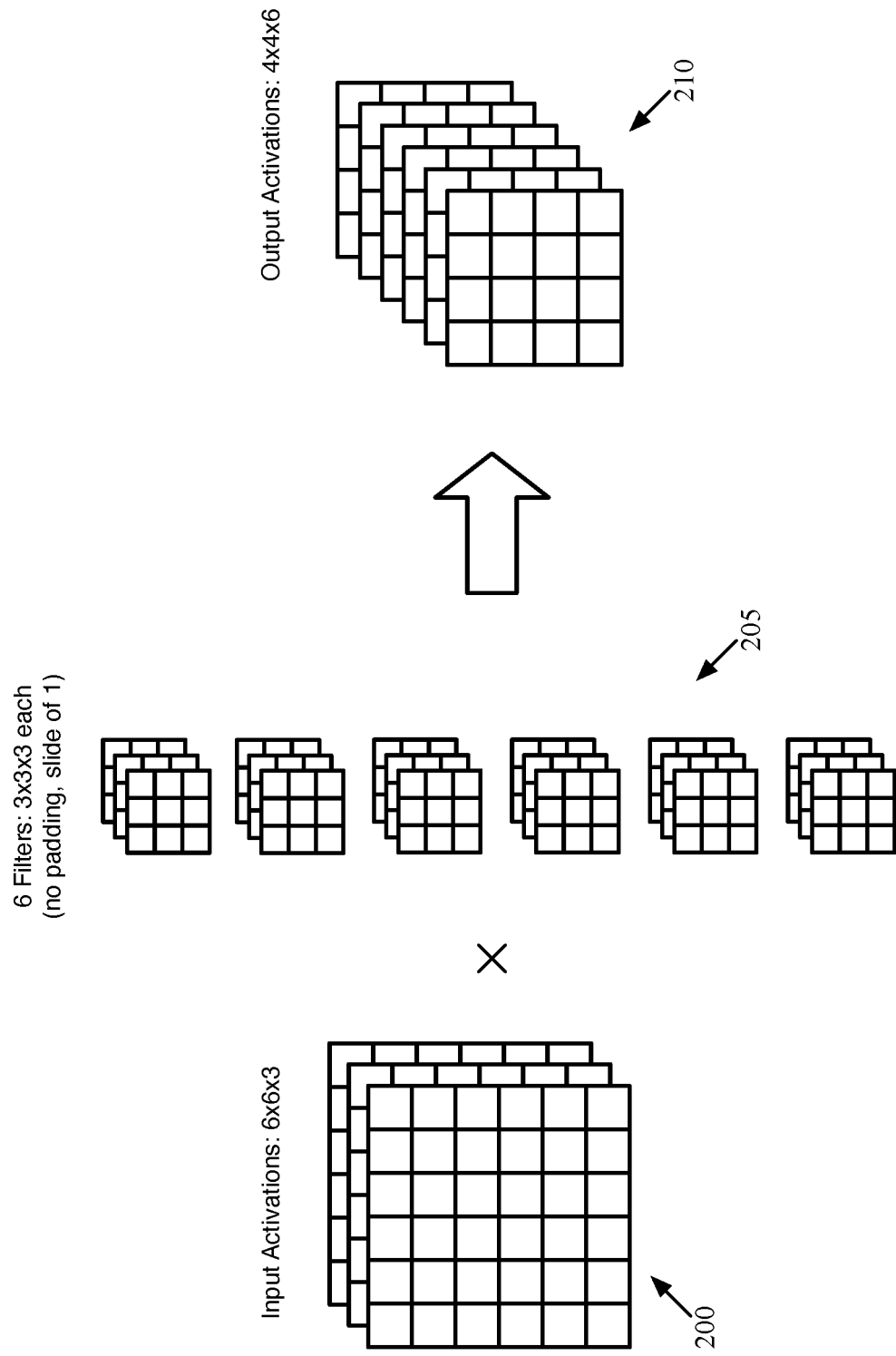
FIG. 2 conceptually illustrates a representation of a convolutional layer of a convolutional neural network.

FIG. 2 conceptually illustrates a representation of a convolutional layer of a convolutional neural network. The convolutional layer receives a set of input activation values 200 organized as a three-dimensional array. This three-dimensional array is either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, also referred to as input feature maps for the layer, as shown in the figure. In this example, the dimensions of the input values are 6×6×3 (i.e., three 6×6 grids).

Each computation node of the convolutional layer involves a linear component (e.g., a dot product followed by scaling and bias functions) as well as a non-linear component, as described above. The input to each computation node is a subset of the input activation values, and the dot product for the computation node involves multiplying those input activation values by the weights that make up one of the filters of the layer. As shown, in this example the layer includes six filters 205, each of which is 3×3×3. Each value in one of the filters is a weight value that is trained using the techniques described herein. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three input feature maps, or channels, so the depth is three). The number of filters in a given layer can also vary—in general, each filter is attempting to identify the presence or extent of a particular feature in the input values. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values. Specifically, in a typical convolution layer, each 3×3×3 filter is moved across the three-dimensional array of activation values, and the dot product between the 27 activations in the current subset and the 27 weight values in the filter is computed. This process starts in the top left corner (i.e., x=0–2, y=0–2) of the grid, and includes the full depth of the array. The filter moves across the rows, in this case using a slide of 1 (i.e., moving one column per computation node, such that the second dot product uses activations at x=1–3, y=0–2). When the end of a row is reached, the filter is moved back to the first columns (i.e., x=0–2) and down one row (i.e., y=1–3), and so on until the bottom right corner of the array is reached. Though not the case in this example, some embodiments use zero-padding at the edges of the grids (e.g., to allow for better detection of features at the edges of images).

The output activation values 210 are arranged in a 4×4×6 array in this example. The outputs from a single filter are arranged in a single grid (also referred to as an output feature map), and because the example has six filters 205, the output activations have six output feature maps. Using a slide value of 1 with no zero-padding results in a 4×4 output feature map for each filter. These output activation values 210 are then the input activation values for the next layer of the neural network.

Before a multi-layer network (e.g., a convolutional neural network) can be used to solve a particular problem, the network is put through a supervised training process that adjusts the network's configurable parameters (e.g., the weight values, biases, etc.). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values). In addition, as described further below, some embodiments quantize the network (constraining the weight values to sets of allowed values and/or accounting for quantization of output values to a certain number of bits), decompose certain layers of the network into what are effectively two layers that use fewer combined weight values than the original layer, use the alternating direction method of multipliers (ADMIM) to train the quantized weight values (which includes performing forward and backward propagation), and ensure that at least a threshold percentage of the weight values are set to zero.

In some embodiments, the training process for the weights of the neural network involves initially training the layers without restricting the weights to allowed sets of values (e.g., as floating-point values), then using these initially-trained values for the weights to (i) determine the sets of allowed values for each layer (or filter) and (ii) train the weights as restricted to their respective sets of allowed values. The restriction to the respective sets of allowed values is also referred to as weight quantization in some embodiments. After training, each weight value for each filter in a given layer will have an assigned weight value that is one of the allowed values for the layer (or the filter, if differentiation is allowed between the filters in a layer). In some such embodiments, the set of allowed values has two allowed values of {0, positive value} or three allowed values of {0, positive value, negation of positive value}. The positive value, often referred to as the $\alpha_k$ for the layer (or filter), can vary between layers or between filters in a layer, and may be determined based on the initial non-quantized training.

During training, various techniques are used (e.g., as factors in a loss function that measures network output accuracy and is used to adjust the weight values and other parameters) to constrain the weights to their respective allowed values, to modify the allowed values for layers and/or filters, and, in some embodiments, to ensure that at least a threshold percentage of the values are set to 0. These techniques of (i) using at most three weight values per layer that can be represented as {0, 1, −1} (referred to as weight quantization) and (ii) ensuring that at least a threshold percentage of the weight values are zero (referred to as sparsification) enables the design of neural networks that can be loaded onto and executed by specialized network inference circuits that use the network to process input data (e.g., images, sound clips, etc.) for which the network is trained. Specifically, certain neural network computation chips are designed for networks that meet these constraints.

Before describing the training operations in greater detail, the concept of decomposing a neural network layer into multiple smaller layers is introduced. Certain network architectures may have layers with millions of weights, which can result in weights and/or filters that are effectively redundant. That is, certain larger layers may have more weights than are needed to extract the information required at that layer. Low-rank decomposition of a layer allows for a reduction in the number of weights used in that layer, while maintaining the same (or nearly the same) level of expressiveness for the layer. Specifically, some embodiments transform a k×k, stride s convolution that produces $N_{out}$ feature maps into a back-to-back pair of convolutions. In some such embodiments, the first convolution in the decomposition is a k×k, strides convolution that outputs a reduced number r of feature maps, where r<$N_{out}$. The second convolution in the decomposition is a 1×1, stride 1 convolution that decompresses the r feature maps into the original $N_{out}$ feature maps. More generally, some embodiments decompose a $k_x \times k_y$, stride $s_x \times s_y$ convolution that produces $N_{out}$ feature maps into a $k_x \times 1$, stride $s_x \times 1$ convolution that outputs a reduced number r of feature maps, where r<$N_{out}$, followed by a $1 \times k_y$, stride $1 \times s_y$ convolution that takes the r feature maps as input and outputs the original $N_{out}$ feature maps.

To illustrate the notion of decomposition of a convolutional layer, the layer can be represented by matrix multiplication operations. As an example, a k×k convolution with stride 1 will be considered. Such a convolution can be represented by (i) an input tensor I with $N_{in}$ input feature maps, each of which has a spatial area $A_{in}$, for a total of $N_I \equiv N_{in}A_{in}$ inputs, (ii) an output tensor Y with $N_{out}$ output feature maps, each of which has a spatial area $A_{out}$, for a total of $N_Y \equiv N_{out}A_{out}$ ouputs, and (iii) a weight tensor W with dimensions $N_{out} \times N_{in} \times k \times k$, for a total of $N_w \equiv N_{out}N_{in}k^2$ weights. The output values of such a convolution are represented as:

$$Y(c_{out}, x, y) = \sum_{c_{in}=0}^{N_{in}-1} \sum_{i=0}^{k-1} \sum_{j=0}^{k-1} I\left(c_{in}, x - \left\lfloor \frac{k}{2} \right\rfloor + i, y - \left\lfloor \frac{k}{2} \right\rfloor + j\right) W(c_{out}, c_{in}, i, j), \quad (4)$$

where $c_{out}$ is the index of the output channel (i.e., $c_{out}$ ranges from 0 to $N_{out}$−1), and (x, y) are the spatial coordinates of the output feature maps.

Each output value $Y(c_{out}, x, y)$ is a linear combination of entries in a k×k×$N_{in}$ patch of the input tensor with volume $V_p = k^2 N_{in}$, and there are $A_{out}$ of these patches. Thus, the convolution can be represented as a matrix multiplication using the strategy for rearranging image blocks into columns (Im2Col). This process takes each k×k×$N_{in}$ patch, represents the patch as a column vector, and then arranges these columns as an input matrix $\hat{I}$, which is thus a $V_p \times A_{out}$ matrix. It should be noted that each entry in the input tensor I is copied into $k^2$ different columns in $\hat{I}$, ignoring boundary/padding issues (each input value is used in the calculation of $k^2$ different output values for each filter). In some embodiments, the structure of the input matrix $\hat{I}$ is analogous to a Toeplitz matrix. The weight tensor is represented as a matrix with $N_{out}$ rows and $V_p$ columns, for a total of $N_{out}V_p = N_{out}N_{in}k^2 = N_w$ weights. That is, each row corresponds to a particular filter of the convolutional layer, with all of the weights in that filter part of the row.

The output $\hat{Y}$ is the product of $\hat{W}$ (an $N_{out} \times V_p$ matrix) with $\hat{I}$ (a $V_p \times A_{out}$ matrix), and is thus an $N_{out} \times A_{out}$ matrix, with the expected number $N_{out} A_{out} = N_Y$ outputs. The convolution can be computed as $$\hat{Y}(c_{out}, p) = \sum_{a=0}^{V_p - 1} \hat{W}(c_{out}, a) \hat{I}(a, p), \quad (5)$$

where p is the index of the patch, with $0 \leq p < A_{out}$. In this document, the input is represented as a column vector, and therefore the convolution is computed by applying the weight matrix on the left of the input. As a note, the ^'s that decorate W, I and Y in the above discussion are dropped in subsequent discussion within this document, which is a trivial transformation in some embodiments.

As noted, the weight matrices for a convolution can be approximated using a low-rank decomposition $$W(c_{out}, a) \approx X(c_{out}, a) = \sum_{m=0}^{r-1} B(c_{out}, m) A(m, a). \quad (6)$$

Here, r is the rank of the decomposition, B is an $N_{out} \times r$ matrix, A is an $r \times V_p$ matrix, and their product, X=BA, is the low-rank approximation for the weight matrix W. The matrix A operates on the "Toeplitz" input matrix I, and thus has the form of a convolution (in that the same matrix is applied to each patch of the input matrix). A has the same spatial dimensions as the original weight matrix W(i.e., represents a k×k, stride-1 convolution), but has a smaller number of rows (i.e., $r<N_{out}$) and thus generates a smaller number of feature maps. The matrix B transforms the r values at each output-map (x, y) into $N_{out}>r$ values. Thus, B represents a 1×1 convolution that decompresses the compressed representation produced by A.

As noted, in some embodiments, each of the weights in the matrices A and B is restricted to a set of allowed quantized weight values (e.g., the set $\{0,1,-1\}$ or $\{0,\alpha_k,-\alpha_k\}$). In addition, in some embodiments, the training is further complicated in that the output values of each layer are quantized (e.g., to a particular number of bits). The combination of (i) weight quantization (e.g., ternarization), (ii) weight sparsity (ensuring that a threshold of the weight values are equal to zero), and (iii) output value quantization allows for the network to be implemented by a specialized neural network inference circuit of some embodiments that restricts the types of allowable networks in the interest of power and memory savings. However, these features (especially weight and output value quantization) also make training the network more complicated. Whereas a layer of a network with floating-point weight and output values could be decomposed as described after training with minimal loss of accuracy, a result of the weight and value quantization is that the decomposition is better handled during the course of training the network.

Figure 3:
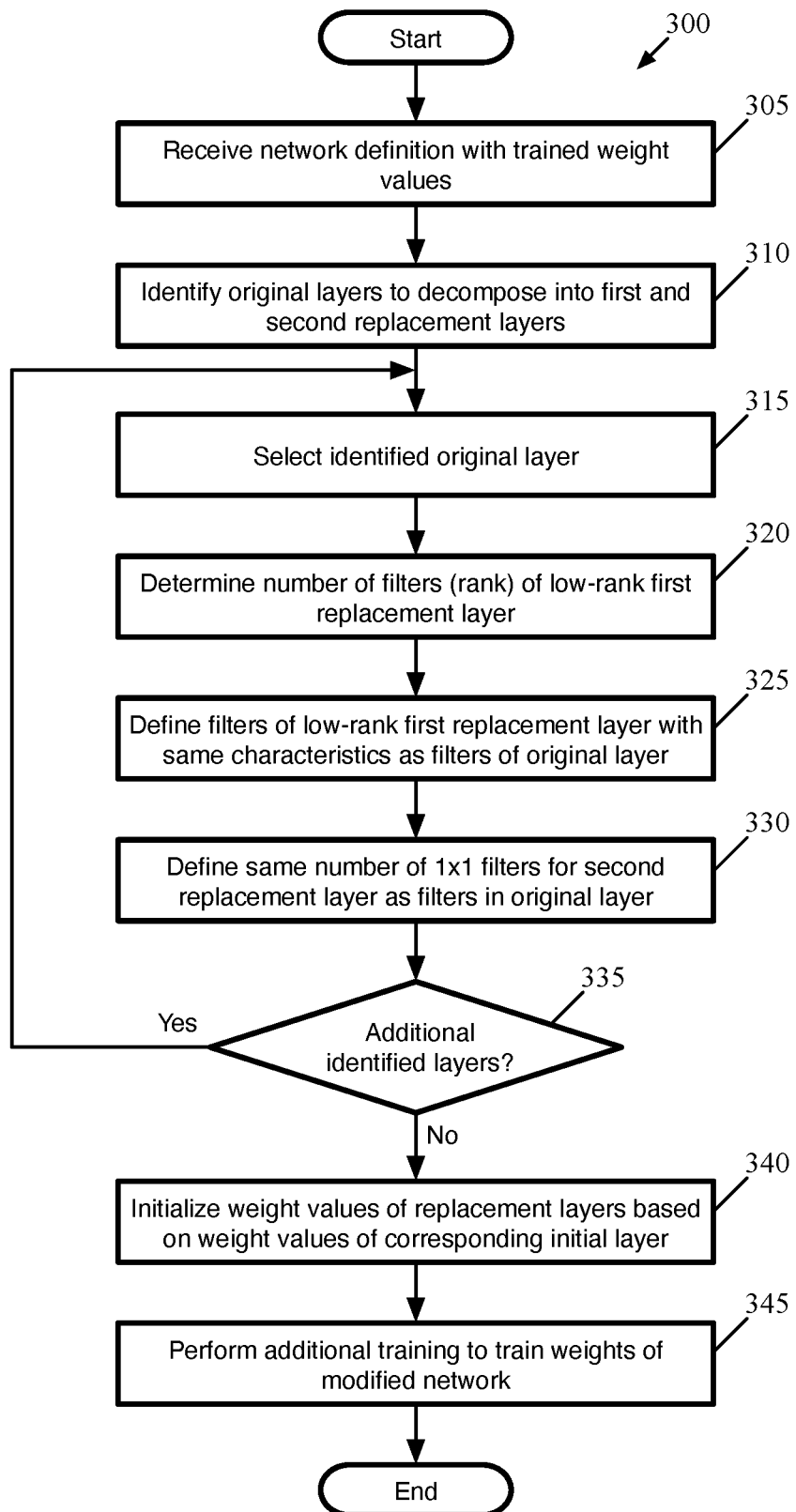
FIG. 3 conceptually illustrates a process 300 of some embodiments for modifying a network to decrease the number of weights in at least some of the layers of the network while training the network.

FIG. 3 conceptually illustrates a process 300 of some embodiments for modifying a network to decrease the number of weights in at least some of the layers of the network while training the network. The process 300 reduces the complexity of these layers while maintaining the ternary nature of the network (i.e., all of the weight values are represented using the set $\{0, 1, -1\}$), sparsity (i.e., a high percentage of the weight values are zero) and expressiveness of the decomposed layers (i.e., the accuracy of the network should not be meaningfully decreased). In some embodiments, the process 300 is performed by a neural network training system that trains the parameters (e.g., weights, bias values, etc.) of a neural network. The process 300 will be described in part by reference to FIG. 4, which illustrates decomposition of a simple convolutional layer.

As shown, the process 300 begins by receiving (at 305) a network definition with trained weight values for the network. In some embodiments, the network definition specifies the structure of the network (i.e., the number of nodes in each layer, which output values from one layer are received by each node of the next layer, the activation functions used by each layer, etc.). In some embodiments, the network is initially trained with floating-point weight values (i.e., prior to quantization of the weights or output values) and the decomposed layers are defined prior to (or along with) quantization of the weights.

Next, the process 300 identifies (at 310) original layers (i.e., layers of the received network) to decompose into first and second replacement layers. Some embodiments may decompose layers into more than two replacement layers, but the technique primarily described herein uses two layers—the more layers into which a single layer is decomposed, the more complexity involved in the training process to ensure that the network retains the same features and accuracy. In some embodiments, the original layers to decompose are manually identified (i.e., by a user of the network training system) or are identified according to manually-specified characteristics (e.g., layers of at least a particular size). For instance, very large layers (e.g., layers with hundreds of filters producing hundreds of output feature maps) might have a lot or redundancy that can be eliminated via layer decomposition. In this case, reducing the number of filters via decomposition could actually help standard training techniques (e.g., stochastic gradient descent) better explore the parameter space, leading to more accurate networks.

To reduce the complexity of some of the layers of the network, some embodiments decompose a layer into two successive layers: a first low-rank replacement layer with a reduced number of filters and a second replacement layer with the same number of filters as the original layer, but using 1×1 convolutions. This effectively reduces the number of weights for the layer as a whole, while still resulting in the same number of output feature maps (and with those output feature maps having the same size) as the original single layer.

Thus, the process 300 selects (at 315) one of the identified original network layers for decomposition. Different embodiments may select the identified layers in different orders (e.g., from the start of the network to the end, in a random order, etc.). In addition, it should be understood that the process 300 is a conceptual process, and the decomposition operations might be performed for multiple layers in parallel in some embodiments.

For the selected layer, the process 300 determines (at 320) a number of filters (i.e., the rank) for the low-rank first replacement layer. In some embodiments, the factor by which the layer is compressed depends on the size of the layer and/or other factors. For instance, if a smaller layer (e.g., a layer with 32 filters) is being compressed, then the compression may only be by a factor of two (i.e., down to 16 filters). Larger layers can allow for greater compression in some embodiments; for instance, a layer with 512 filters could be compressed by a factor of 8 or more in some cases (i.e., down to 64 filters). It should be noted that while these examples use a rank for the first replacement layer that is a divisor of the original number of filters, this is not a requirement in some embodiments. For instance, a layer could begin with 400 filters and be decomposed into two layers with the first layer having 60 filters. In addition, some embodiments treat the rank of the first replacement layer as a hyperparameter and use a hyperparameter optimization algorithm in order to determine the rank.

The process 300 defines (at 325) filters of the low-rank first replacement layer with the same characteristics as the filters of the original layer. That is, if the original layer includes a first number of k×k filters with a defined padding and stride, then the first replacement layer includes a second number (that is smaller than the first number) of k×k filters with the same defined padding and stride. The process 300 also defines (at 330) the same number of 1×1 filters for the second replacement layer as there are filters in the original layer. That is, if the original layer includes a first number of k×k filters, then the second layer includes that same first number of 1×1 filters.

Figure 4:
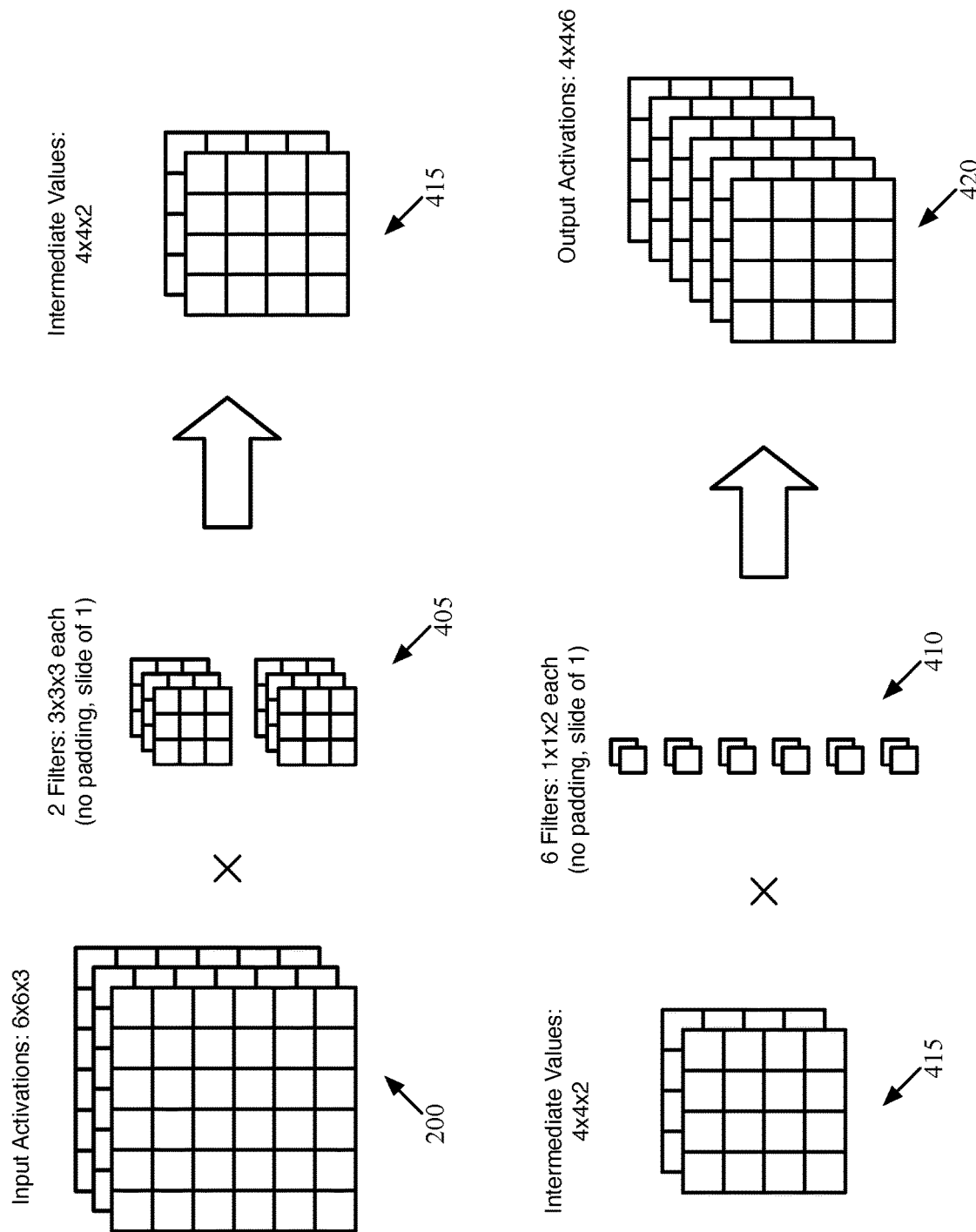
FIGS. 4 and 5 illustrate decompositions of a simple convolutional layer.

FIG. 4 conceptually illustrates the decomposition of the layer shown in FIG. 2. This layer takes as input the input activations 200 (i.e., three 6×6 feature maps), and uses six 3×3 filters 205 with no padding and a slide of 1. Here, the layer is decomposed into two layers with two different sets of filters 405 and 410. The first set of filters 405 includes only two filters (rather than six), which have the same dimensions (3×3×3) as the filters 205 of the original layer.

These filters, as shown, produce intermediate values 415 as two output feature maps, which have the same dimensions as the output activations 210 from the original layer (i.e., 4×4 output feature maps). These intermediate values 415 are provided as input to the filters 410 of the second replacement layer. As shown, these are six 1×1 filters that have a depth (2) equal to the number of intermediate feature maps (i.e., the number of filters in the first set of filters 405). The six 1×1 filters 410 expand the two intermediate feature maps into six output feature maps 420, which have the same dimensions and number of activations as the original output feature maps 210. In this simple example, the total number of weights that need to be trained (and stored by an inference circuit) is reduced from 162 (3×3×3×6) in the original set of filters 205 to 66 (3×3×3×2+1×1×2×6) in the combined first and second sets of replacement filters 405 and 410.

After defining the filters for the decomposition layers replacing the selected original layer, the process 300 determines (at 335) whether there are any additional layers to be decomposed. If additional layers remain, the process 300 returns to 315 to select the next layer.

If the network to be output is a floating-point network (i.e., the weight values and activations are floating-point values), then in some embodiments the weight values for the decomposition (i.e., the weight values for the filters 405 and 410) can be computed after training using various techniques without additional training. However, for quantized networks, additional training is required (as is the case even without decomposition) in order to (i) determine the appropriate weight scale(s) for each layer and (ii) determine the quantized value for each weight in the filters.

In this case, the process 300 initializes (at 340) weight values for the filters of the replacement layers based on the weight values of the corresponding original layers. In some embodiments, this involves initializing four tensors per decomposed original layer—two ternary weight tensors and two scale tensors. The initialization of these tensors using a loss-aware ADMM framework is described in further detail below.

The process 300 then performs (at 345) additional training to train the weight values of the modified network. In some embodiments, this additional training is performed using the loss-aware ADMM framework, which alternately projects the weight values onto the quantized (e.g., ternarized) framework with a required sparsity and trains the projected values along a floating-point spectrum using SGD (forward and backward propagation) while imposing constraints that bias the weight values towards the ternary values. These techniques are described in greater detail in U.S. patent application Ser. Nos. 16/923,001, now issued as U.S. Pat. 11,995,555, and 16/923,003, now issued as U.S. Pat. No. 11,847,567, which are incorporated herein by reference. In addition, these techniques are described in detail below in the context of decomposed neural network layers.

Figure 5:
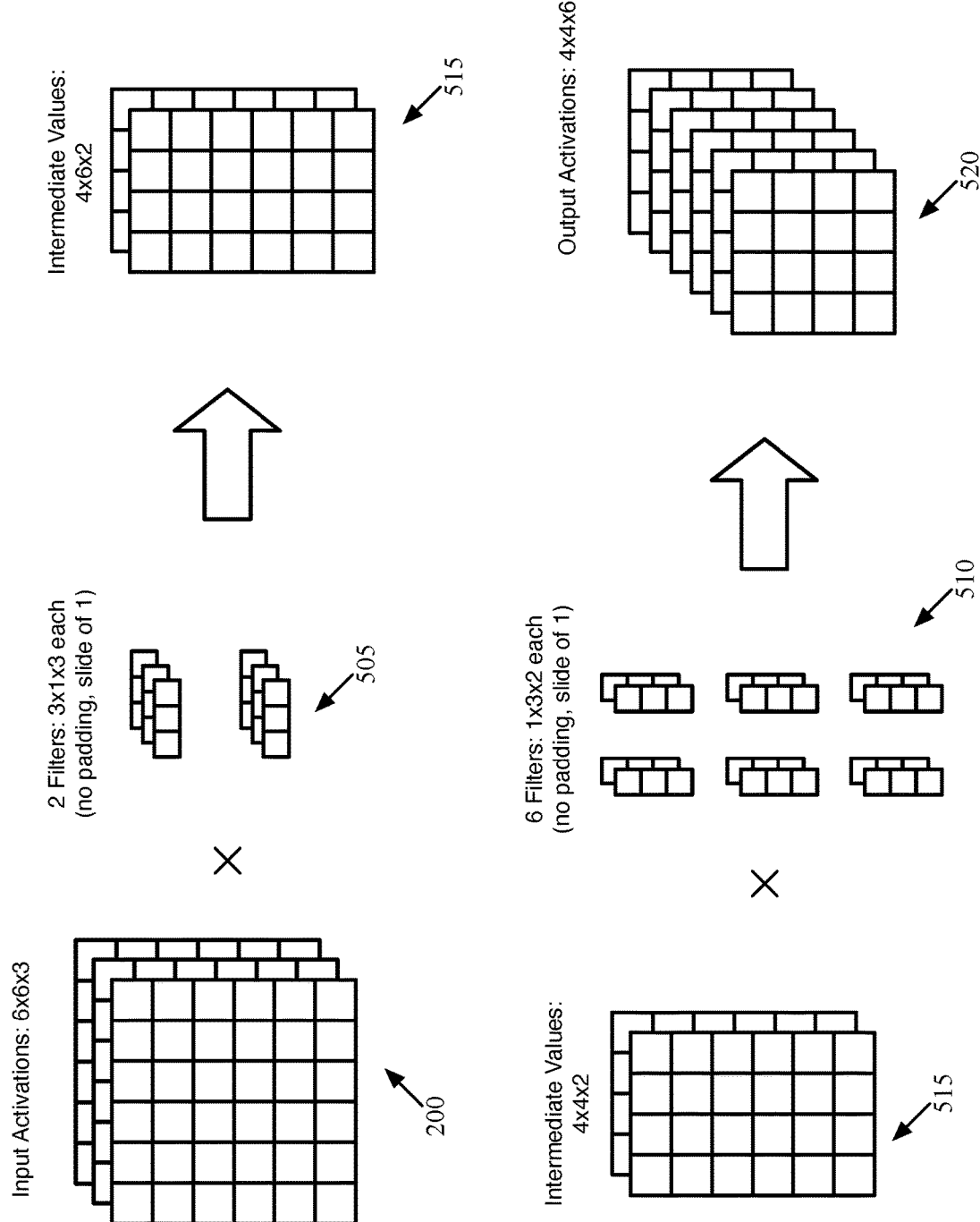

As mentioned, while FIGS. 3 and 4 show decomposition of a layer into a first replacement layer with the same characteristics (but lower rank) and a second 1×1 replacement layer, some embodiments decompose a $k_x k_y$ convolutional layer into a low-rank $k_x \times 1$ first replacement layer and a $1 \times k_y$ second replacement layer. FIG. 5 conceptually illustrates such a decomposition of the layer shown in FIG. 2. This layer takes as input the input activations 200 (i.e., three 6×6 feature maps), and uses six 3×3 filters 205 with no padding and a slide of 1. Here, the layer is decomposed into two layers with two different sets of filters 505 and 510. The first set of filters 505 includes only two filters (rather than six) that have dimensions of 3×1×3 (i.e., fewer weights per filter than the filters 205 of the original layer). These filters, as shown, produce intermediate values 515 as two output feature maps, which are larger than the output activations 210 from the original layer (i.e., the smaller size of the filters results in larger 4×6 output feature maps). These intermediate values 515 are provided as input to the filters 510 of the second replacement layer. As shown, these are six 1×3 filters that have a depth (2) equal to the number of intermediate feature maps (i.e., the number of filters in the first set of filters 505). The six 1×3 filters 510 expand the two intermediate feature maps into six output feature maps 520, which have the same dimensions and number of activations as the original output feature maps 210. In this simple example, the total number of weights that need to be trained (and stored by an inference circuit) is reduced from 162 (3×3×3×6) in the original set of filters 205 to 54 (3×1×3×2+1×3×2×6) in the combined first and second sets of replacement filters 505 and 510, an even smaller number of weights than in the example of FIG. 4.

Figure 6:
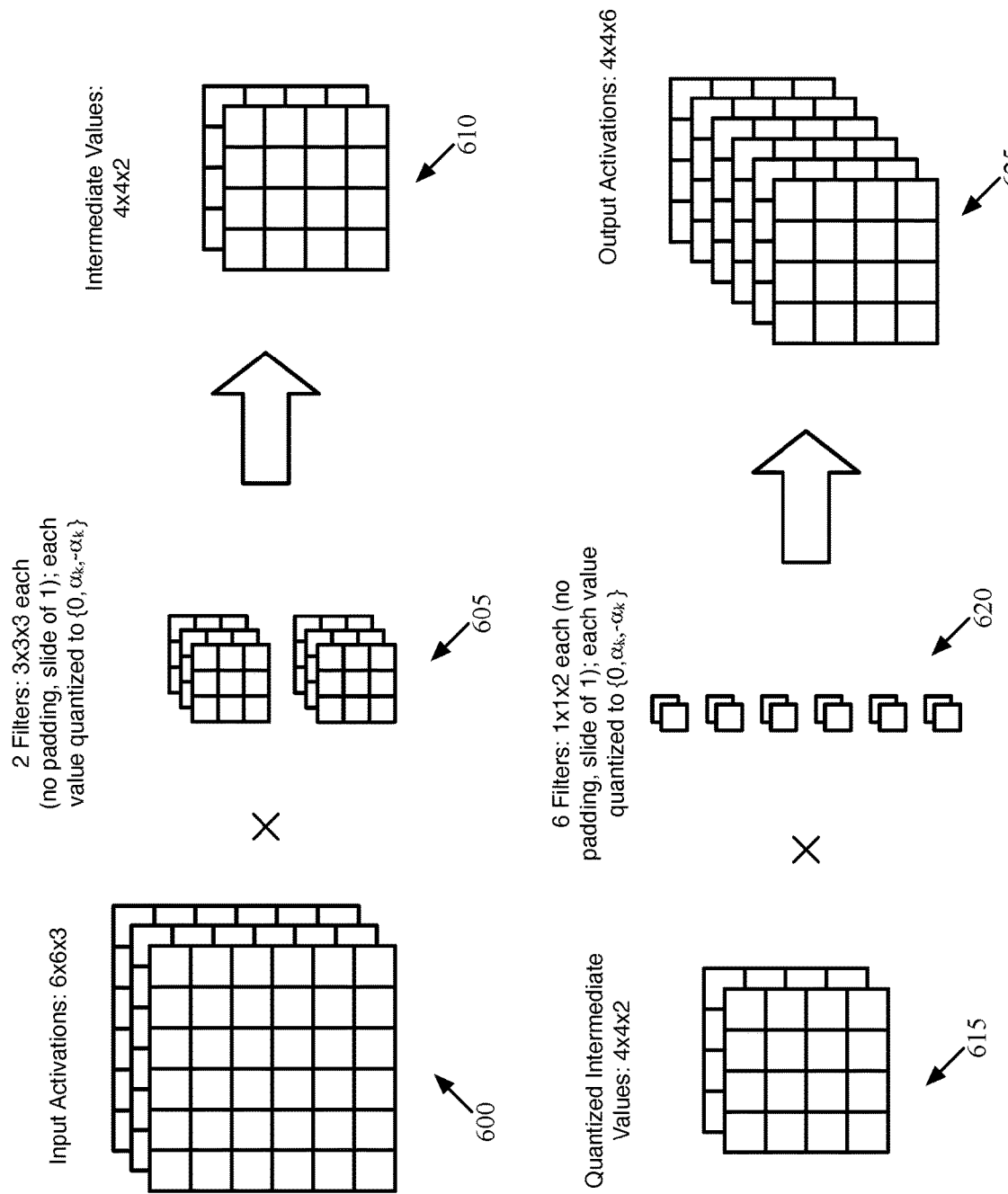
FIG. 6 illustrates a similar decomposition as shown in FIG. 4, but with weight and value quantization.

As noted, the examples shown in FIGS. 4 and 5 illustrate decomposition of a convolutional layer in which all of the weights and activations are floating-point values. However, some embodiments need to account for quantization of the weights (e.g., ternarization) as well as quantization of output values (e.g., to four or eight bit values). FIG. 6 illustrates a similar decomposition as shown in FIG. 4, but with weight and value quantization.

In this case, the first replacement layer again includes two 3×3×3 filters 605, and receives three 6×6 input feature maps 600. In this example, the weights in the filters are ternarized, such that each weight has one of the values $\{0, \alpha_k, -\alpha_k\}$ (where $\alpha_k$ may be a scale value for the entire layer or may be separate scale values for each of the filters). The dot products of the weight values with different blocks of the input values 600 produce intermediate values 610, which are arranged as two intermediate feature maps. However, for input to the second replacement layer, these intermediate values 610 are quantized to produce quantized intermediate values 615 (e.g., a set of 4-bit or 8-bit values). These quantized values 615 may be generated from the values 610 by any sort of quantization process (e.g., truncating, taking the most significant bits, etc.). The second replacement layer again includes six 1×1×2 filters 620, and receives the quantized intermediate values 615 as inputs. The weights in the filters 620 are again ternarized, such that each weight has one of the values $\{0, \alpha_k, -\alpha_k\}$ (where $\alpha_k$ may again be a scale value for the entire layer or may be separate scale values for each of the filters). The dot products of the weight values with each pair of input values, along with application of the activation function (i.e., the activation function for the original layer), produces six output activation feature maps 625 having the same dimensions as the output feature maps 210 of the original layer. The activation values in these output feature maps 625 are also quantized in some embodiments.

Training the decomposed layers can be complex in some embodiments because of the inter-relationships between the filters in the two layers as well as the quantization. In a standard layer, each output activation value is based on (i) a block of the input values for the layer and (ii) the weight values of one of the filters. However, for a decomposed layer with value quantization, each output activation is based on (i) a block of the input values for the layer, (ii) the weight values of all of the filters of the first low-rank replacement layer, (iii) the number of bits used for quantizing the intermediate value, and (iv) the weight values of one of the 1×1 filters of the second replacement layer.

Figure 7:
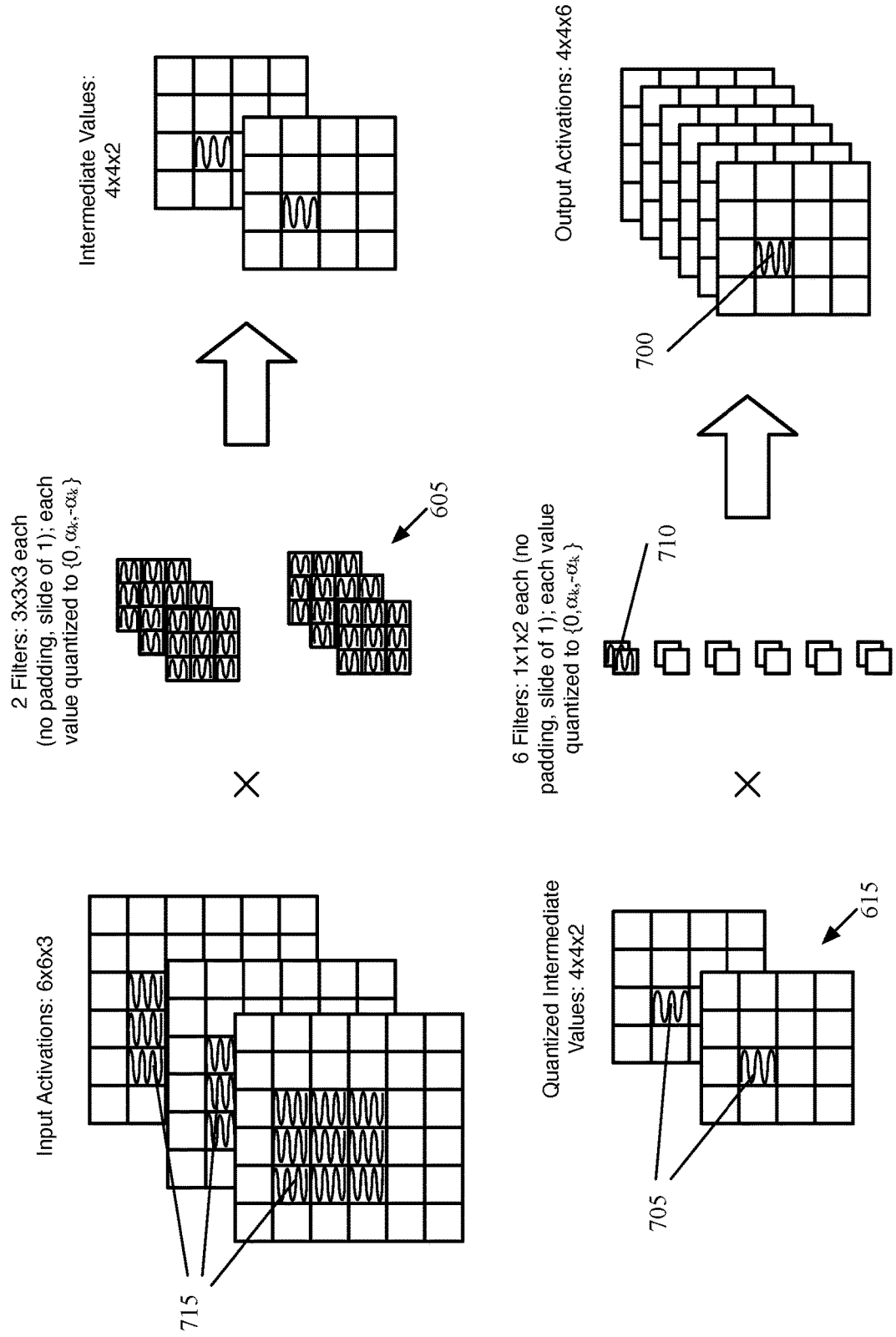
FIG. 7 illustrates all of the values that are used to generate a specific output value using the example of FIG. 6.

FIG. 7 illustrates all of the values that are used to generate a specific output value 700 using the example of FIG. 6. In the second layer, the output activation value 700 is a dot product of one input value 705 in each of the quantized intermediate feature maps 615 (these are values having the same coordinates in the quantized intermediate feature maps) and the values of the filter 710. As shown in the first layer, each of these quantized input values 705 is generated based on a dot product of the same block of input values 715 (a 3×3 grid in each of the input feature maps 600) and a different one of the filters 605. Thus, the output value 700 is generated based on the input values 715, all of the weight values of the filters 605, and the weight values of the filter 710.

Figure 8:
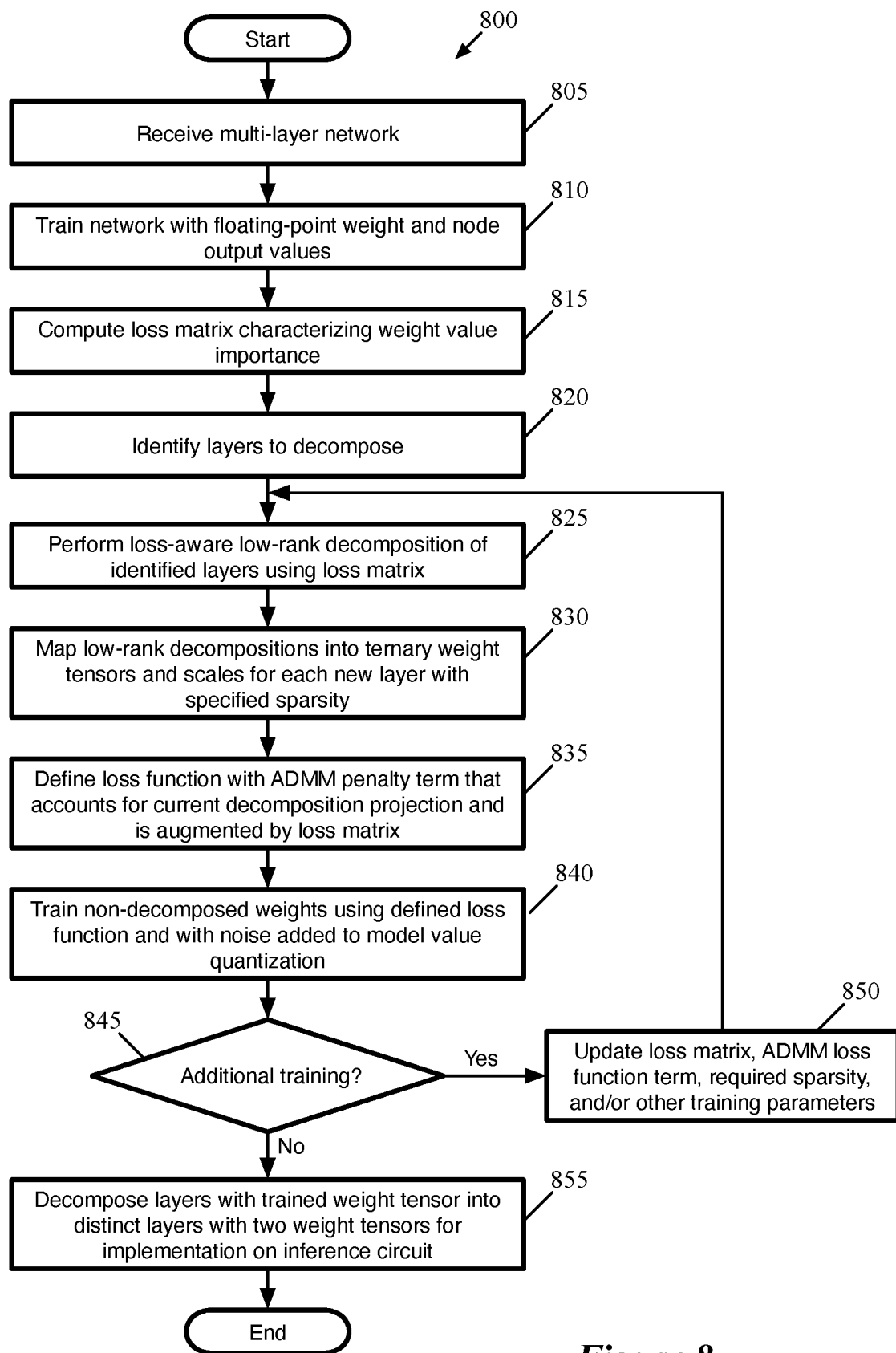
FIG. 8 conceptually illustrates a process of some embodiments for training a quantized multi-layer network in which at least some of the layers are decomposed.

FIG. 8 conceptually illustrates a process 800 of some embodiments for training a quantized multi-layer network (e.g., with ternary weights) in which at least some of the layers are decomposed. The process, in some embodiments, is performed by a network optimization application, which may be a program executing on a single device (e.g., a single laptop or desktop, a mobile device, a physical or virtual server, etc.) or a distributed application that operates on multiple machines (e.g., on multiple physical computers, multiple virtual machines or containers within a datacenter or multiple datacenters, etc.). In some embodiments, the process 800 is an amalgamation of several processes that can be performed by multiple different machines or groups of machines (e.g., a floating-point training process, a quantization process, etc.).

As shown, the process 800 begins by receiving (at 805) a multi-layer network (e.g., a neural network) for training with initialized floating-point weights. The network of some embodiments is made up of numerous computation nodes, organized in layers, that produce output values based on one or more input values. These layers may include convolutional layers, pooling layers, element-wise operation layers, fully-connected layers, etc. In at least a subset of the hidden and output layers (e.g., the nodes of the convolutional and fully-connected layers), each node includes a linear component that uses a set of weight values to linearly combine the input values of the node, as well as a non-linear component that uses the output of the node's linear component to compute the output value for the node. FIG. 1, described above, illustrates an example of such a multi-layer network and the operation of at least a subset of its nodes.

The process trains (at 810) the network with floating-point values for the weights and node output values. Specifically, in some embodiments, this training involves defining a loss function for the network that measures the error (i.e., loss) of the actual output of the network for a particular input compared to a pre-defined expected (or ground truth) output for that particular input. During one training iteration, an input data set is first forward-propagated through the network nodes to compute the actual network output for each input in the data set. Then, the loss function is back-propagated through the network to adjust the weight values in order to minimize the error (e.g., using first-order partial derivatives of the loss function with respect to the weights, referred to as the gradients of the loss function). This optimization method for minimizing the output loss function, iteratively repeated, is referred to as stochastic gradient descent (SGD). During the training, some embodiments accumulate and store the average sum squares of the gradients for later use.

Having trained a floating-point network, the process 800 computes (at 815) a loss matrix to characterize the dependence of the accuracy of the network on the many different weight values. In some embodiments, the accuracy of the network is represented by the loss function used for floating-point training of the network. Thus, in some embodiments, the loss matrix is the Hessian matrix of the loss function, where the diagonal values of the Hessian matrix are second-order partial derivatives of the loss function with respect to each weight in the network. The dependence of the loss increase of the network for a particular weight (i.e., the extent to which changing the weight increases the inaccuracy of the network) is proportional to a corresponding diagonal term of the Hessian matrix. In some embodiments, all of the off-diagonal terms of this loss matrix are zero.

To minimize the computational burden of calculating the Hessian terms, some embodiments of the invention approximate the terms of the Hessian matrix using an empirical Fisher approximation method that estimates the Hessian using the first-order partial derivatives (e.g., the gradient) of the loss function that were used during the prior floating-point training iterations of the network.

Other embodiments estimate the loss matrix terms separately from the weight training data, by propagating a set of training inputs through the network (including the replica weights) and sampling from a predicted output probability distribution. These sample probability distributions are used in place of ground truth outputs to compare to the actual output distribution (i.e., to compute the loss function), and back-propagation (e.g., the same back-propagation algorithm as used for actual network training) is performed in order to determine the gradients of all of the weights. These gradients are not used to modify the weights, but instead to compute the loss matrix values. For instance, in some embodiments, the diagonal terms (each corresponding to a single weight) are computed as the outer product of each weight's gradient with itself.

Next, the process 800 identifies (at 820) the layers of the network to decompose (e.g., into pairs of replacement layers). In some embodiments, the network layers to decompose are manually identified (e.g., by a user of the network training system) or are identified according to manually-specified characteristics (e.g., layers of at least a particular size). For instance, very large layers (e.g., layers with hundreds of filters producing hundreds of output feature maps) might have a lot or redundancy that can be eliminated via layer decomposition. In this case, reducing the number of filters via decomposition could actually help standard training techniques (e.g., stochastic gradient descent) better explore the parameter space, leading to more accurate networks.

The process 800 then performs (at 825) a loss-aware low-rank decomposition of the identified layers using the generated loss matrix. In some embodiments, the goal of this decomposition is to minimize the error as weighted by the loss matrix in the following low-rank approximation:

$$L \equiv \frac{1}{2} \sum_{c_{out}=0}^{N_{out}-1} \sum_{a=0}^{V_p-1} H(c_{out}, a)[W(c_{cout}, a) - X(c_{cout}, a)]^2 \quad (7)$$

For simplicity, Equation (7) gives the "approximation loss" for a single layer of the network, but this can be summed over all of the layers. Here, X is the low-rank decomposition X=BA as given in Equation (6), W is the original, unfactored, weight matrix and H is the loss matrix that determines the relative importance of the squared error in each element of the original, unfactored weight matrix.

To determine the loss-aware decomposition, some embodiments use an expectation-maximization (EM) strategy that is described in "Weighted Low-Rank Approximation", by Srebro and Jaakkola, in Proceedings of the Twentieth International Conference on Machine Learning (ICML-2003), August 2003, pgs. 720-727, and which is incorporated herein by reference. In this case, the loss matrix H is used as the weighting to specify for which weights minimizing the error is most important.

To model the decomposition problem, the EM strategy starts with the supposition that the observed matrix W is drawn from a normal distribution with a mean value equal to a low-rank matrix X, which is the matrix the optimizer is attempting to find. The approximation loss given by Equation (7) can be viewed as the negative log likelihood of observing W given a distribution centered at the low-rank decomposition X As such, minimizing the error corresponds to finding the value of X that maximizes the likelihood.

Next, the problem is viewed as a missing value problem in which element $W_{ij}$ is only observed with probability given by $$\tilde{H}_{ij} \equiv \frac{H_{ij}}{H_{max}}, \quad (8)$$

where $H_{max}$ is the maximum element of the loss-matrix H. If an element is not observed, then that element is replaced with the corresponding element of the current estimate for X The EM algorithm proceeds by setting the initial guess to zero)($X^{(0)}=0$), then iteratively performing updates $$E = \tilde{H} \odot W + (1-\tilde{H}) \odot X^{(t)} (E \text{ Step}) \quad (9)$$

$$X^{(t+1)} = LRA_r[E] (M \text{ Step}). \quad (10)$$

The expectation (E) step computes the expected value of the low-rank matrix, given that an element is only observed with probability $\tilde{H}$, and otherwise the current estimate, $X^{(t)}$ is used. The maximization (M) step computes an unweighted, rank-r approximation, $LRA_r$, using a standard algorithm for unweighted low-rank approximation. In the case of an unweighted approximation, the approximation loss is minimized by performing SVD and retaining the terms in the decomposition that have the largest singular values. As such, computing the low-rank decomposition maximizes the log-likelihood in the case of an unweighted decomposition (no missing matrix elements).

The presence of $\tilde{H}$ will upweight directions the elements of which have larger loss matrix coefficients, making these elements more likely to be included in the weighted low-rank decomposition. Thus a direction in the SVD of W that has a small singular value in the original matrix might nevertheless be included in the loss-aware decomposition if that direction has a large corresponding value in the loss matrix.

Returning to FIG. 8, the process 800 next maps (at 830) the low-rank decompositions into ternary weight tensors and scale tensors for each new layer with a specified sparsity. In some embodiments, this is part of a process of projecting all of the weights (including those in non-decomposed layers) onto quantized values. As mentioned, in some embodiments, the weights of the network are ternarized and the network training accounts for intermediate value quantization so that the network can be executed by a specialized neural network inference circuit with these features. Such a specialized inference circuit is described in detail below.

For this purpose, some embodiments map the loss-aware decomposition into a set of four tensors corresponding to the weights A and B above. These tensors include (i) a first set of ternary weight values for the low-rank set of filters of the first layer A, (ii) a first set of scale values for the first set of ternary weights, (iii) a second set of ternary weight values for the 1×1 filters of the second layer B, and (iv) a second set of scale values for the second set of ternary weights. For both the first and second sets of scale values, each scale value corresponds to multiple weights (e.g., to all weights in a filter). That is, in a decomposition W≈BA, each row of the matrix (representing a filter) is a row of ternary weight values scaled by a common row scale. So $A=S^A Q^A$ where $Q^A$ is a ternarized matrix with the same dimensions as A, and $S^A$ is a diagonal matrix of row scales. Similarly, $B=s^B Q^B$.

It should be noted that, in the case that a convolutional or fully-connected layer is trained with batch normalization, the affine transformation performed by the batch normalization (the product of the "standardizing transform, $(x-\mu)/\sigma$, and the learned transform) is not included in the decomposed weight matrix W, and remains in place as training is continued. This ensures that the loss matrix for W (which is used to perform the loss-aware decomposition) correctly measures the perturbation of the loss due to approximating W. After completing weight ternarization, the row scales and bias of B are combined with the affine transformation of the original, undecomposed layer in order to compute the overall affine transform for the second layer.

It can be noted that the loss-aware, rank-r, SVD of W is of the form $W \approx U\Sigma V^T$, where U is a first r columns of an n×n orthogonal matrix, with $n=N_{out}$, $V^T$ is first r columns of an m×m orthogonal matrix, where m is the volume of an input patch $V_p$, and $\Sigma$ is an r×r diagonal matrix of singular values. For the initialization, a floating-point SVD solution is projected into a scaled ternary factorization as described above, $S^B Q^B S^A Q^A$. To do this, the outer product form of the SVD is exploited. This outer product form is given by $$W \approx USV^T = \sum_{k=0}^{r-1} u^k \sum_{kk} (v^k)^T, \quad (11)$$

where $u^k = U(:, k)$ is the $k^{th}$ column of U and $v^k = V(:, k)$ is the $k^{th}$ column of V (":" is a wild card in this notation). Thus, $U(:, k)$ is the subblock of the matrix including elements with arbitrary row index and column index k. That subblock is the $k^{th}$ column of U.

The approximation to W can also be represented in outer-product form $$W \approx USV^T \approx X \equiv \sum_{k=0}^{r-1} (S^A)_{kk} [S^B x^k (y^k)^T]. \quad (12)$$

Here, $x^k \equiv B(:,k)$ is the $k^{th}$ column of $Q^B$, and $(y^k)^T = Q^A(k, :)$ is the $k^{th}$ row of $Q^A$. This outer product form has two helpful properties for optimizing the approximation loss. First, $S_{kk}^A$, the $k^{th}$ element on the diagonal of the scale matrix $S^A$, scales the $k^{th}$ outer product, but does not affect any of the other outer products. Second, only a single element of $x^k$ contributes to any given element of the matrix X. Thus, the quadratic approximation loss can be expressed as a sum of loss terms, one for each element of $x^k$. The same is true of the scaled vector $\tilde{x}^k \equiv (S_{kk}^A) x^k$.

An algorithm for minimizing diagonal quadratic loss with respect to a scaled ternary vector, which is described below, can be used to find the global minimum of the approximation loss with respect to the scaled ternary vector $\tilde{x}^k$ in some embodiments, assuming all other variables are held fixed, for each k. Similarly, this algorithm can be used to find the global minimum of the approximation loss with respect the scaled ternary vector $\tilde{y}^k \equiv (S_k^A) y^k$, for each k. Finally, some embodiments analytically minimize over the diagonal scale matrix $S^B$. Optimizing with respect to a scaled ternary vector provides an advantage in that all of the variables are optimized simultaneously, helping to avoid getting stuck in a local minimum. In addition, this avoids the problem of mapping all of the ternary variables to 0 because the scale was previously set too large or mapping all of these variables to ±1 because the scale was previously set too small.

Dot products for B are typically far smaller than those for A, because the dot products for B are 1×1 convolutions (and because the first layer, represented by A, does not have so many filters and thus has fewer output feature maps). As such, it is easier to first ternarize B and then ternarize A. Some embodiments use multiple passes in order to refine the ternarization of one of these matrices based on the current ternarization of the other.

The mapping of the low-rank decompositions into the four matrices $S^B Q^B S^A Q^A$, thus follows the following process in some embodiments. The matrices are initialized as $S^B=1$, $Q^B=U$, $S^A=\Sigma$, and $Q^A=V^T$, based on the loss-aware low-rank decomposition ($Q^A$ and $Q^B$ are not initially ternary). The mapping process then performs the iterative process to ternarize $Q^A$ and $Q^B$. For k=0, ..., r−1 (i.e., starting from outer product with the largest, loss-aware singular value), the mapping process minimizes the approximation loss with respect to the scaled ternary vector $\tilde{x}_k \equiv (S_{kk}^A) x^k = (Q^B S^A)(:, k)$, the $k^{th}$ column of $Q^B S^A$. Then, for k=0, r−1 (i.e., starting from outer product with the largest, loss-aware singular value), the mapping process minimizes the approximation loss with respect to the scaled ternary vector $(\tilde{y}^k)^T \equiv (S_{kk}^A)^T = (S^A Q^A)(k, :)$, the $k^{th}$ row of $S^A Q^A$. Lastly for the iteration, the mapping process minimizes the approximation loss with respect to $S^B$. These three minimization operations are repeated as needed or desired in some embodiments. It should be noted that in the first iteration when $Q^A$ and $Q^B$ are mapped from floating point values to ternary values, this might increase the approximation loss. In subsequent iterations these matrices $Q^A$ and $Q^B$ are refined, thereby either keeping the loss constant or decreasing it. As indicated, techniques used by some embodiments for minimizing the approximation loss will be discussed in greater detail below.

In addition to mapping the low-rank decompositions into ternary weight tensors and scales, as noted, some embodiments also project the non-decomposed layers (e.g., non-decomposed convolutional and fully connected layers) onto their own ternary weights and scales. That is, the mapping of the low-rank decompositions into ternary weight tensors and scales is part of this larger projection step of ADMM. This projection step is discussed in greater detail in U.S. patent application Ser. Nos. 16/923,001 and 16/923,003, incorporated by reference above, and in some embodiments involves optimizing the ternary weights and scales while meeting a global sparsity constraint (i.e., ensuring that at least a particular percentage of the weights are set to zero). The decomposition mapping is part of this process that involves more complexity due to the greater level of interaction between weights. In ordinary loss-aware ADMM, the loss is simply an element-wise sum over the weights, and there is minimal interaction between the weights. However, for decomposed layers, each element of X is a dot product of a row of B and a column of A. That is, whereas for non-decomposed layers, the loss term for an element of W is based on a single ternary weight value, for the decomposed layers the loss term for a single element of W is based on an entire dot product that might include hundreds of variables, and each of these variables affects multiple loss terms.

Returning again to FIG. 8, after performing the initial ternarization of the weights, the process 800 of some embodiments performs alternating stages to further train the network with quantized weights. The process 800 defines (at 835) a loss function with an ADMM penalty term that accounts for the current decomposition projection and is augmented by the loss matrix. The process 800 then trains (at 840) the non-decomposed weights of the network using the defined loss function and with noise added to model value quantization.

This retraining begins with the initialized and sparsified weight values and is discussed in further detail below. In this stage, the process 800 performs forward propagation to run a set of inputs through the quantized network (i.e., with the initialized weight values and layer scaling factors), then calculates the value of the loss function as defined at 835 (that incorporates the loss matrix) based on these inputs and the resulting outputs. This calculated loss function value is used to again perform back-propagation to train the weight values of the network to new values (e.g., new floating-point values).

In some embodiments, during this training (the proximal step of ADMM) the layers marked for decomposition are not decomposed. That is, in the terminology used above, the weight matrix W is trained rather than the matrix $X=BA=S^B Q^B S^A Q^A$. As such, this training does not perfectly model the application of the matrix A followed by the matrix B, because during inference the outputs of A will be quantized (e.g., rounded down to the nearest discrete value). As such, some embodiments model this quantization by adding random noise during forward propagation to the outputs of the (non-decomposed) layer. The noise is added (rather than subtracted) in some embodiments so as to counter the effect of the discretization always rounding down. The techniques used to determine the size of the random error are described in further detail below.

In addition, the loss function used during this training in some embodiments starts with the loss function used during the initial floating-point training of the network, with an additional ADMM constraint term that includes a factor based on the loss matrix. Whereas for normal layers the constraint is imposed that biases the learned weight matrix W towards equaling the ternarized matrix from the projection step, for decomposed layers a similar constraint is imposed (i.e., the weight matrix W is biased towards equaling the ternarized matrix X). To implement this, a loss-aware (i.e., incorporating the loss matrix) ADMM Lagrangian term is used in the loss function (in addition to measuring actual error of the network outputs as compared to ground truth). This Lagrangian term is given by:

$$L_{ADMM} = \sum_{c,a} \left[ \mu_{ca}(W_{ca} - X_{ca}) + \frac{\rho}{2} H_{ca}(W_{ca} - X_{ca})^2 \right] \quad (13)$$

$$= \frac{\rho}{2} \sum_{c,a} H_{ca} \left[ \left( W_{ca} - X_{ca} + \frac{\mu_{ca}}{\rho H_{ca}} \right)^2 + \left( \frac{\mu_{ca}}{\rho H_{ca}} \right)^2 \right] \quad (14)$$

The second form, which completes the square, is the term that should be minimized in the singular value decomposition. When the Lagrange multipliers $\mu_{ca}$, are included, this term tries to minimize the loss-aware difference between X and W+µ/ρH.

After the projection/sparsity and proximal (floating-point SGD) training stages, the process determines (at 845) whether more training is required. Some embodiments use a minimization process (e.g., a stochastic gradient descent minimizer) to determine when to stop training the network. Training is no longer necessary when the MT network has fully quantized weights with minimized loss from the quantization.

If the process 800 determines that further training is required, then in some embodiments the process updates (at 850) the loss matrix (e.g. by recalculating the Hessian matrix or the Fisher approximation thereof using the retrained weight values), the ADMM loss function term, and/or other training parameters (e.g., the learning rate, the balance between the standard loss term and the ADMM loss term, etc.). The process then returns to 825 to continue training the network.

Once training is complete (i.e., no more training is required), then the process 800 decomposes (at 855) the layers with trained weight tensors into distinct layers with two weight tensors for implementation on the neural network inference circuit of some embodiments. In some embodiments, this entails performing one additional decomposition into the four tensors $S^B Q^B S^A Q^A$. Both of the layers resulting from the decomposition can be treated as standard convolutional layers by the inference circuit (and the compiler that generates instructions for the inference circuit). The first layer has the same stride and kernel size as the original (pre-decomposition) layer and the weights for this layer are set to $Q^A$. The affine scale for each channel c is set to $S^A$ [c]. Some embodiments do not use any batch normalization at this layer.

The second layer B is also accounted for. As described above, this is always a 1×1 kernel with no padding and a stride of 1, in some embodiments. The weights for this layer are set to $Q^B$. In addition, the affine transformation used for this layer is the result of multiplying by $S^B$, applying the batch normalization transform $(x-\mu)/\sigma$, and then applying the learned affine transform for the overall (pre-decomposition) layer. In some embodiments, the inference circuit allows for either 4-bit or 8-bit output activations. In some such embodiments, whether the network as a whole uses 4-bit or 8-bit activations, the outputs of the first decomposed layer A are 8-bit activations so as to preserve as much data as possible. It should be noted that so long as the rank (from the original layer to the first replacement layer A) is reduced by at least a factor of two, then the use of 8-bit activations does not increase the amount of memory required for the layer. The process 800 then ends after this final decomposition.

Figure 9A:
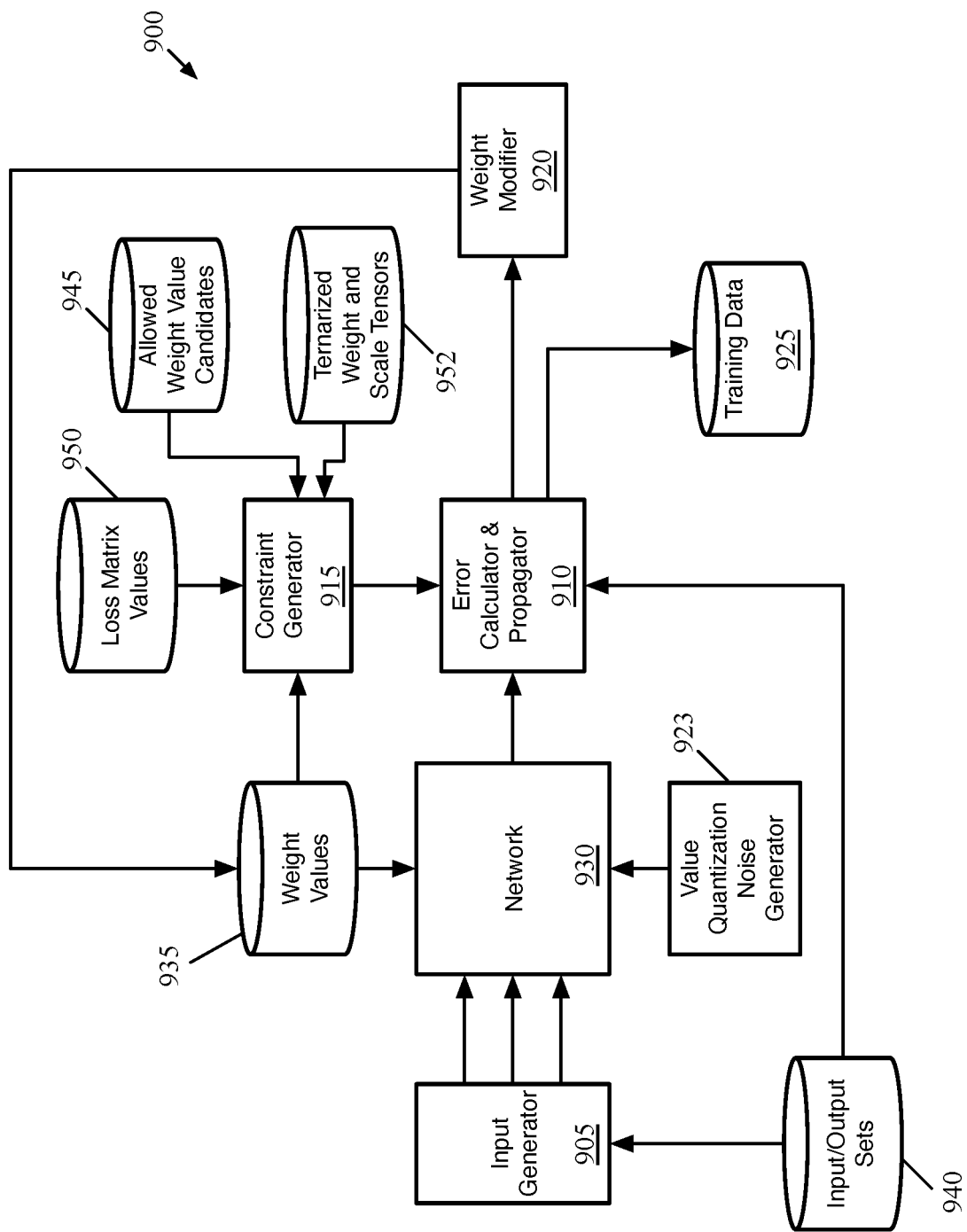
FIGS. 9A-B conceptually illustrate a training system of some embodiments that trains the weight values (and other parameters) of a network so as to ensure that (i) each weight is assigned a value that belongs to a set of allowed values for that weight and (ii) at least a threshold percentage of the trained weight values are equal to zero.
Figure 9B:
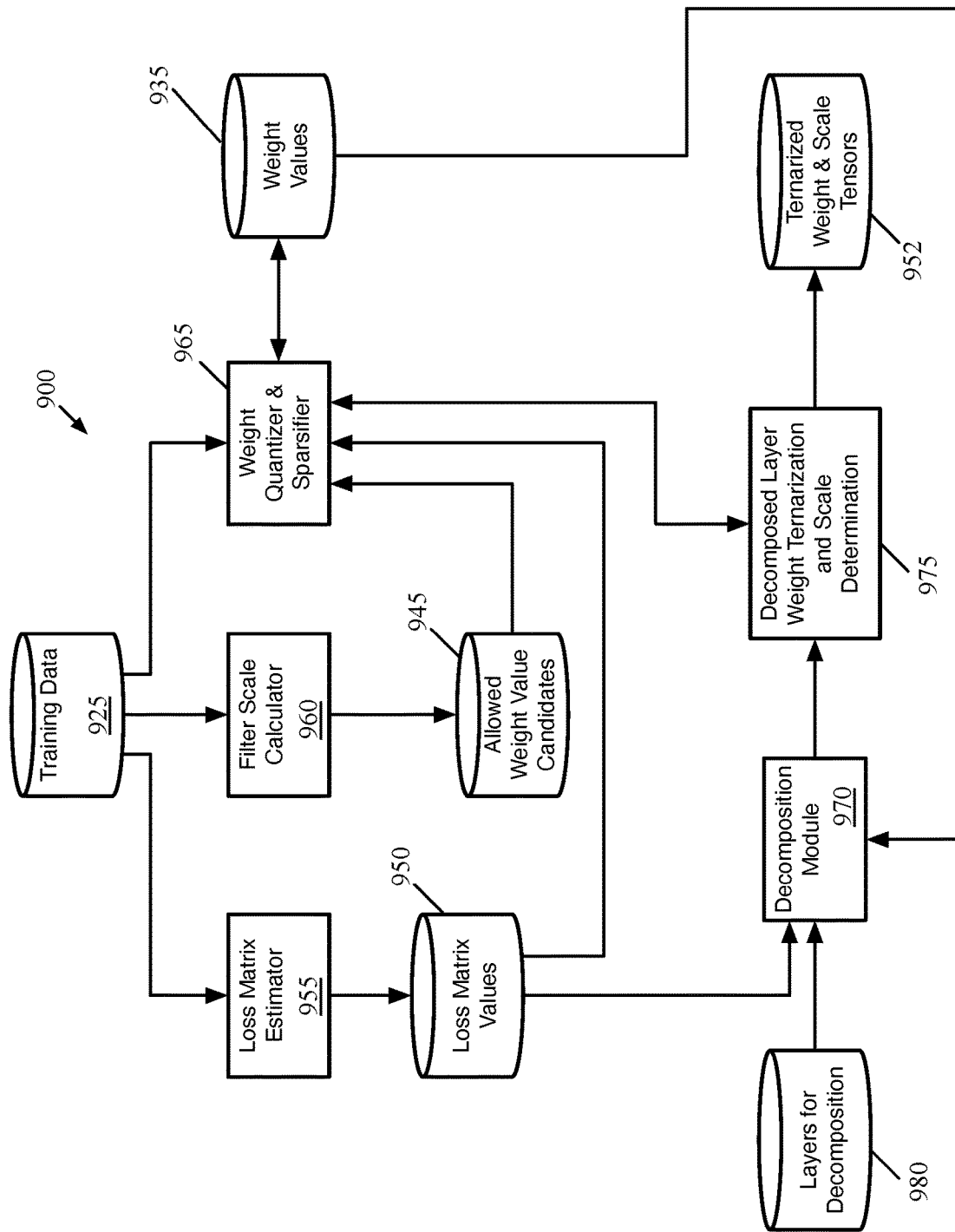

FIGS. 9A-B conceptually illustrate a training system 900 of some embodiments that trains the weight values (and other parameters) of a network so as to ensure that (i) each weight is assigned a value that belongs to a set of allowed values for that weight (e.g., a ternary set of values) and (ii) at least a threshold percentage of the trained weight values are equal to zero. In some embodiments, the training system 900 uses the sets of allowed weight values to generate additional constraint terms for the loss function that are used in the training, in order to bias the trained weight values towards those allowed values. The allowed values may be the same for all nodes in a network being trained, different for each layer of nodes, different for each filter in a layer, or different for each node in the network. The resulting weight values are used for the multi-layer machine-trained network when embedded in a device (e.g., for execution by a specialized neural network inference circuit).

As described above, some embodiments initially train the network with floating-point weight values, then use these trained weight values to determine sets of allowed weight values for each weight and project the weights to one of the quantized values in the set of allowed weight values for that weight. Using the loss function augmented with a constraint term, the Alternating Direction Method of Multipliers (ADMM) technique is used for subsequent training of the quantized values while forcing as many of the weight values as possible to zero. The ADMM technique is described in the paper "Extremely Low Bit Neural Network: Squeeze the Last Bit Out with ADMM" by Leng, Cong, et al., 32nd AAAI Conference on Artificial Intelligence, pp. 3466-3473 (2018), which is incorporated herein by reference. In some embodiments, the training is iterative, and alternately (i) projects the weights to their quantized sets of allowed values minimizing a loss function that assigns different importance to different weights and (ii) trains the weights using a loss function that includes a constraint term that biases the weights towards their current sets of allowed values while still accounting for the difference between expected and actual outputs of the network.

FIG. 9A illustrates the portion of the training system that (i) performs training on a floating-point (pre-quantization) network and (ii) performs the proximal steps of ADMM training (post-quantization). As shown, the training system 900 has a number of modules, including an input generator 905, an error calculator and propagator 910, a constraint generator 915, a weight modifier 920, and a value quantization noise generator 923, all of which will be described in further detail below. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power. In some embodiments, the modules performing the projection step of ADMM operate on one set of devices while the modules performing the proximal step (e.g., floating-point SGD training) operate on a different set of devices.

The network 930 of some embodiments is a multi-layer machine-trained network (e.g., a feed-forward neural network), such as that shown in FIG. 1. This network 930 includes multiple layers of nodes, including a layer of input nodes, at least one layer of hidden nodes, and a layer of output nodes. A typical network will include many layers of hidden nodes, including various different types of layers. Each of at least a subset of the hidden nodes and output nodes includes a linear component (that uses the weight values 935) and a non-linear activation function (i.e., the nodes of convolutional and fully-connected layers). The network 930 receives an input and computes a corresponding output.

The weight values 935 are used to parametrize the network and are trained by the system 900 for the network to perform a particular task. In some embodiments, during the initial training (e.g., before quantizing the weights and training with ADMM), the weights are represented by floating-point values. In some embodiments, the possible candidate weight values (i.e., the set of allowed values) for each weight in the network are the ternary set {−1,0, +1}. In other embodiments, the candidate values are different for each layer or each filter of the network, with the candidate set being {−$\alpha_k$, 0, +$\alpha_k$} for the k-th layer. In this case, however, the weights can be normalized to the scale of {−1,0, +1}.

During the initial training process of some embodiments, floating-point weight values (e.g., ranging from −1 to 1) are used. During this training, the input generator 905 prepares inputs from the input/output sets 940, which are forward propagated through the network to generate output values. The error calculator and propagator 910 compares these generated output values to expected (ground truth) output values using a loss function. The error calculator and propagator 910 also back-propagates the computed error for a set of inputs (referred to as a minibatch) to determine the rate of change of the loss function with respect to a change in the weight at the current value of the loss function. The weight modifier 920 uses these gradients to modify the weight values for the next training iteration. This process is repeated for multiple minibatches of inputs 940 until the weight values 935 have converged to optimized floating-point values. In some embodiments, the results of this training (e.g., the optimized floating-point weight values, the gradients of the loss function with respect to each weight for one or more iterations of training, individual node outputs used to compute batch normalization parameters, etc.) are stored as floating-point training data 925, which is used by other modules of the training system (i.e., those shown in FIG. 9B).

The input/output sets 940 include various inputs to the network as well as the corresponding expected (ground truth) outputs for each of the inputs. Some embodiments perform training with a large number of different inputs, as this can help train the weight values for an average input. Each input in an input set may be an image, a voice snippet, etc. that is to be propagated through the network, depending on the specific purpose for which the network is being trained. For example, if a network is being trained to identify faces, the set of inputs will include numerous images of several different people's faces, probably including various types of edge cases (e.g., images where the face is distorted, where objects partially appear in front of the face, etc.). Each input also has a corresponding expected (ground truth) output that is what the network should generate as its output when presented with that input.

For subsequent training to quantize the weight values (e.g., using ADMM), the weight values are projected to their respective allowed values, as described above by reference to FIG. 8 and below by reference to the modules shown in FIG. 9B. After the projection step, these values are used during subsequent forward propagation. This projection is in some embodiments as simple as projecting the floating-point value to the nearest allowed value. In other embodiments, the projection is an iterative process using the loss matrix, and incorporates complexities required for handling decomposed layers, as described in further detail above. During subsequent training iterations, the weights may be pushed between the values in their respective sets of allowed values (and the respective sets of allowed values may also vary in some embodiments).

As mentioned, in some embodiments, each layer of nodes is assigned a set of allowed weight values during the projection step of ADMM. That is, after each iteration through the projection step, each weight value for each node in the layer will have an assigned weight value that is one of the possible weight values for the layer. In some such embodiments, the set of allowed weight values has two possible values (binary) of {0, $\alpha_k$} or three possible values (ternary) of {−$\alpha_k$, 0, +$\alpha_k$}. The $\alpha_k$ for each layer varies between layers or between filters within a layer in some embodiments. During training, the various techniques described herein are used to constrain the weights to these two or three values and, in some embodiments, to ensure that at least a threshold percentage of the values come out to 0. The allowed weight value candidates storage 945 stores this information (i.e., the $\alpha_k$ for each layer or filter) for use during the projection step as well as to generate the constraints used in the proximal step.

Training of the quantized network during the proximal step of ADMM operates similarly to the floating-point training, but with (i) the weight values starting out as their quantized values from the projection step and (ii) with additional constraint terms in the loss function. In addition, some embodiments also (iii) add random noise to outputs of layers marked for decomposition in some embodiments. The input generator 905 selects a set of inputs (and corresponding expected outputs) from the input/output sets 940. The network 930 processes these inputs (using the weight values 935 as well as random noise generated by the value quantization noise generator 923) to generate computed outputs. The error calculator and propagator 910 uses a loss function that computes the difference between the computed and expected outputs (e.g., the loss function used to train the floating-point weight values) in addition to including other terms specific to training with quantized weight values.

In some embodiments, this loss function includes (i) a first term that measures the difference between the actual output of the network and the expected output of the network, given a training input data set (i.e., a standard loss term) and (ii) a second term that constrains the weights to the sets of allowed values. This constraint term also accounts for the increase in loss when quantizing any individual weight (i.e., due to constraining the weights to the sets of allowed values). This constraint term can be referred to as a loss-aware penalty term. As described above, the loss term is also adapted to account for the decomposed layers as described above by reference to Equation (7).

To provide the error calculator and propagator 910 with the correct loss function constraint terms, the constraint generator 915 uses the allowed weight value candidates 945, the loss matrix values 950, and the ternarized weight and scale tensors 952 (X in the loss function constraint term for decomposed layers). The allowed weight value candidates are the layer and/or channel scales determined for each weight in the non-decomposed layers. Both of these sets of values (as well as the current weight values 935, in some embodiments), are used to compute the loss-aware ADMM penalty term.

The derivation of such a loss-aware penalty term for non-decomposed layers will now be described. Starting with a floating-point network that converges to a (local) minimum in error, for any change δ(w) in the neural network parameters, the corresponding change in loss is approximated in some embodiments using a 2$^{nd}$ order approximation around the floating-point weight values as follows by Equation (15):

$$\mathcal{L}(w + \delta w) - \mathcal{L}(w) \cong g^T \delta w + \frac{1}{2}\delta w^T H \delta w, \quad (15)$$

where g=∇L(w) is the gradient of the loss function, and H=∇² L(w) is the Hessian matrix of the loss function. In other embodiments, a different loss matrix can be used instead of the Hessian to estimate the corresponding change in loss. The loss matrix is assumed to be the Hessian for the purposes of discussion below, but not limited to the Hessian of the loss function in other embodiments.

Using Equation (15) the impact of quantizing a single floating-point weight $w_i$ to a quantized value $q_i$ can be considered. The change in parameter can be written as $\delta(w)=(q_i-w_i)e_i$, where $e_i$ is the unit vector with value of zero everywhere except the i-th position where the value is 1. With this in mind, considering that that gradient averages to 0 over the training samples (since the floating-point network started from a local minimum), the change in loss from quantizing the i-th weight $w_i$ to a quantized value $q_i$ can be represented as follows:

$$\mathcal{L}(w+(q_i-w_i)e_i)-\mathcal{L}(w) \cong \frac{1}{2}(q_i-w_i)^2 H_{ii}, \quad (16)$$

where $H_{ii}$, are the diagonal elements of the Hessian matrix H, corresponding to second-order partial derivatives of the loss function with respect to each weight in the network.

Referring to FIG. 9B, the loss matrix estimator 955 computes the loss matrix terms using prior training data 925 in some embodiments (e.g., from the floating-point training or, if updating the loss matrix, from recent quantized training). In other embodiments, the loss matrix estimator 955 uses gradient data generated by separately propagating inputs through the network and using predicted probability distribution output samples for loss calculation and back-propagation (e.g., generated by the error calculator and propagator 910).

To minimize the computational burden of calculating the Hessian terms, in some embodiments the loss matrix estimator 955 approximates the terms of the Hessian matrix using a Fisher approximation method. The Fisher approximation method may be a standard Fisher approximation method or an empirical Fisher approximation method (e.g., an empirical estimate of the Fisher information of w 1) in different embodiments. The standard Fisher approximation method of some embodiments uses the predicted probability distribution output samples of inputs separately run through the network to calculate gradient data (e.g., using Monte Carlo estimates). The empirical Fisher approximation method estimates the Hessian by computing first-order derivatives (e.g., gradients) of the loss function (with respect to the weights) during multiple prior training iterations of the MT network, which are part of the stored training data 925. See Theis, Lucas, Korshunova, Iryna, Tejani, Alykhan, Huszár, Ferenc, "Faster Gaze Prediction with Dense Networks and Fisher Pruning," arXiv preprint arXiv: 1801.05787, 2018, which is incorporated herein by reference.

In some embodiments, whether using the empirical or Monte Carlo approximation method, the Fisher matrix term for each weight is based on the averaged sum squared of the gradient terms for the weight. As an example using the empirical Fisher method, $g_{ni}$ is the gradient of the loss function with respect to the n-th prior floating-point training iteration, for the i-th weight. As noted, the training system 900 of some embodiments stores these gradient terms during the floating-point training of the network (as these terms are computed for backpropagation), so no extra computation is involved (though storage is required for multiple training iterations worth of gradients). The averaged sum squared $\beta_i$ of the N gradient terms for the selected (i-th) weight is given by:

$$\beta_i = \frac{1}{2N}\sum_{n=1}^{N} g_{ni}^2. \quad (17)$$

These terms are independent of the quantized value chosen for the weight in some embodiments.

In other embodiments, the gradients are calculated by propagating a set of training inputs through the network and sampling from a predicted output probability distribution for each input. These sample probability distributions are used in place of ground truth outputs to compare to the actual output distribution (i.e., to compute the loss function), and back-propagation (e.g., the same back-propagation algorithm as used for actual network training) is performed in order to determine the gradients of all of the weights (including the replica weights). Some embodiments use this method when possible (rather than the empirical Fisher approximation method) as it provides more accurate results despite the additional computation required. However, this technique requires a loss function that takes the form of a negative log-likelihood (i.e., that measures surprise). For instance, if the network output is a one-hot classifier (e.g., classifying objects in images between different possible categories), then such a loss function is typical. However, for multiple object detection or other complicated network outputs, formulating the loss function as a negative log-likelihood may be more difficult (in which case the empirical Fisher approximation method is used). Rather than computing an average sum-squared of the gradients, some embodiments compute the outer product of the gradient identified in this manner for the weight for to the currently-selected diagonal term.

Once the square of the gradient has been calculated, the loss matrix estimator 955 assigns this value to the selected diagonal term of the Hessian matrix. The value is actually the Fisher approximation $H_{ii}$ to the corresponding i-th diagonal term of the Hessian matrix. Some embodiments also introduce a scaling factor between the averaged sum squared gradient and the corresponding diagonal Fisher matrix entry.

As mentioned, in some embodiments the constraint generator 915 uses the loss matrix terms to generate the loss-aware penalty term for use by the error calculator and propagator 910. The standard ADMM penalty term (without the additional loss-aware term) for the loss function is given by:

$$\mathcal{L}_{ADMM} = \frac{\rho}{2}\sum_{k}\left\|\hat{W}_k + \lambda_k - Q_k\right\|^2, \quad (18)$$

where $\hat{W}_k \equiv W_k/\alpha_k$ and $\lambda_k$ is the Lagrange multiplier for the k-th layer. The penalty assumes that quantization-constraint violations are of equal importance for all weights in a layer, while violations in a layer with a small weight scale ($\alpha_k$) are more expensive than violations in a layer with large weight scale.

Given knowledge of the Hessian (assumed diagonal), it can be used in some embodiments to measure the cost of the constraint violation for any weight. The Hessian (or in this case, the Fisher approximation H) functions as a metric on the space of network weights. The loss-aware ADMM penalty term becomes:

$$\mathcal{L}_{ADMM} = \frac{\rho}{2}(W + \lambda - \alpha Q)^T H (W + \lambda - \alpha Q), \quad (19)$$

where W is the vector of all the (floating-point) weights $w_i$ and Q is the vector of all the quantized values $q_i \in \{-1, 0, +1\}$. The parameter $\rho$ controls the regularization forces, dictating how fast the quantization will take place. If $\rho$ is too large, the penalty loss will be given a too big importance, the weights will be strongly pulled towards their projected counterparts, and the network will be quickly quantized, but with a large loss in precision. If $\rho$ is too small, the penalty loss will not matter, and the weights will never get pulled closer to a quantized version. In some embodiments, the algorithm uses individual values $\rho_k$ per layer. In other embodiments, a global value of $\rho$ is used for all layers.

Equation (19) can also be written as:

$$\mathcal{L}_{ADMM} = \mu^T(W - \alpha Q) + \frac{\rho}{2}(W - \alpha Q)^T H (W - \alpha Q). \quad (20)$$

Here, $\mu$ is a vector of Lagrange multipliers (for the sparse quantization constraints) and a is a diagonal matrix that operates on the weight space that provides the per-layer weight scale. It should be noted that $\lambda$ is usually used (as in Equation (8)) to denote the Lagrange multipliers divided by $\rho$ and for a modified constraint, expressed in terms of the normalized weights: $W_k/\alpha_k - Q_k = 0$. During loss-aware ADMM, the loss matrix sets the scale for the curvature, not a', so working with normalized weights is no longer helpful. As such, some embodiments work with the unscaled Lagrange multipliers for a constraint on the unnormalized weights; to avoid confusion, this document refers to the vector of these multipliers as $\mu$ rather than A. Because $\mu$ is unscaled and constrains the unnormalized weights, it does not need to be updated when the value of $\rho$ or $\alpha_k$ is changed, unlike $\lambda$.

As mentioned, the loss-aware ADMM penalty term given in Equations (19) and (20) is that for a non-decomposed layer. For layers that are decomposed (which could be anywhere from a single layer to all of the layers), the loss-aware ADMM penalty term is given by Equation (14) above. In this equation for decomposed layers, X replaces $\alpha Q$.

In addition, the training system 900 includes a value quantization noise generator 923. This value quantization noise generator 923 of some embodiments generates noise to add to the outputs of layers that are being decomposed during the proximal step of ADMIM training (i.e., during forward propagation of inputs 940 through the network 930) in order to model the value quantization that will occur after the first decomposed layer A (i.e., for the inputs to the second decomposed layer B). Some embodiments model this quantization by adding random noise during forward propagation to the outputs of the (non-decomposed) layer. The noise is added (rather than subtracted) in some embodiments so as to counter the effect of the discretization always rounding down.

To properly model the effect of value quantization for a given layer, the noise generator 923 uses information about the inputs to the layer in order to determine the appropriate scales for the noise. Specifically, to determine the appropriate scales, $S^V$, the noise generator 923 needs to have information on the distribution of $V^T I$, where I are the inputs to the layer. The noise generator 923 of some embodiments uses a sample of input patches drawn randomly from feature maps computed for a random sample of training items. Referring to the discussion above regarding decomposition, each element of a feature map produced by $V^T$ (and thus A) is the projection of the corresponding input patch on the direction of the corresponding column of V. The noise generator 923 computes statistics of these projections and use the statistics to determine the element of the scale matrix, $S^V$, that best preserves information about the values in that distribution. Put another way, the noise generator 923 maximizes the mutual information between the "continuous" pre-VQ distribution and the discrete post-VQ distribution.

During training, this discretization effect can be modeled as additive noise:

$$\hat{W} \hat{I} \approx B(AI + \epsilon), \quad (21)$$

where the noise $\epsilon$, which is independently and identically distributed for each output value in each output feature map produced by VQ $\circ$ A, is proportion to the spacing $\delta$ between values produced by VQ. For example, the noise might be uniformly distributed, $\epsilon_i \sim U(-\delta/2, +\delta/2)$, which has variance $\sigma^2 = \delta^2/12$. The variance of an output produced by the decomposed layer is given by $$\text{Var}[(B\epsilon)_c] = \frac{\delta^2}{12} \sum_k B_{ck}^2 \quad (22)$$

$$= \frac{\delta^2}{12}(S_c^B)^2 \times (\text{number of nonzero entries in row } c \text{ of } Q^B) \quad (23)$$

Here, ST is the scale of the $c^{th}$ row of B, which is determined by the current ternary decomposition, BA, and thus is a constant during the SGD training for a current proximal step (it is updated with each projection step). To model this noise during forward propagation, the noise generator 923 of some embodiments draws samples from a zero-mean normal with the specified variance and adds this noise to the layer outputs of the network 930. It should be noted that even with a careful estimate for the magnitude of the additive noise, E, adding noise introduces a risk of overfitting. As such, some embodiments use hyperparameter optimization techniques to further optimize the magnitude of the noise.

The training system 900, as shown in FIG. 9B (which shows the modules that handle the projection step of ADMM), also includes a filter scale calculator 960 and a weight quantizer and sparsifier 965. In some embodiments, the filter scale calculator 960 initializes the weight scales for each filter (or layer) of the network that is not being decomposed by calculating the variance (or standard deviation) of the floating-point weight values of the weights in the selected filter (or layer). The positive and negative values of variance (or, alternatively, the standard deviation) are then defined as the scaling factors for that filter/layer. For example, if the scaling factor for the k-th filter calculated in this manner is represented by $\alpha_k$, the ternary discrete values that are allowed for weights are $\{-\alpha_k, 0, +\alpha_k\}$. In some embodiments, the filter scale calculator 960 can adjust the layer scales during training, as well as during initialization based on the assigned quantized weight tensor Q.

The weight quantizer and sparsifier 965 performs the initial weight assignment (and sparsification) as well as the projection step of ADMM training, for non-decomposed layers. In some embodiments, the weights are simply snapped to their nearest candidate for their respective filters in the allowed weight values 945. In addition, some embodiments require a certain threshold of sparsification (i.e., a particular percentage of the weights in the network to be set to zero). In order to minimize the impact on the loss that arises from imposing the sparsity condition, some embodiments compute the ADMM penalty for the quantization of each weight, and attempt to minimize this penalty while (i) assigning all of the weights to one of their respective allowed values and (ii) imposing the sparsity condition so that at least a minimum number of the weights are set to zero. Without the use of decomposition, each of the weights can be treated independently, and the training system sets to zero the weights with the smallest penalties for doing so. This penalty can be measured in different embodiments based on distance of the initially-trained value from zero or a more complex calculation involving multiple factors. In some embodiments, this calculation uses the loss matrix to specify an importance of each weight.

In some embodiments, the ADMM projection step treats the decomposed layers separately, at least in part. As shown, the training system 900 also includes a decomposition module 970 and a decomposed layer weight ternarization and scale determination module 975. In some embodiments, these are actually incorporated as part of the weight quantizer and sparsifier module 965 and/or filter scale calculator 960, while in other embodiments the decomposition modules 970 and 975 operate independently. Irrespective of whether they are separate modules or the same, the sparsification operations operate in tandem for non-decomposed layers and decomposed layers in some embodiments, as both contribute to the global sparsity. Some embodiments, in fact, include an additional module not shown in this figure for handling global sparsity across a network with both decomposed and non-decomposed layers.

The decomposition module 970 of some embodiments determines the loss-aware low-rank decomposition for each of the layers 980. As described above by reference to operation 825 of FIG. 8, some embodiments use an expectation-maximization (EM) strategy to determine the loss-aware low-rank decomposition, which is based in part on the loss matrix values 950. In some embodiments, this decomposition determines the optimal rank of the first layer A for the decomposition (i.e., the number of filters in the layer, which is the number of rows in the matrix A).

The decomposed layer weight ternarization and scale determination module 975 of some embodiments is responsible for optimizing the decomposition to determine the four weight and scale tensors $S^B$ $Q^B$ $S^A$ $Q^A$ As described above, these matrices are initialized based on the low-rank decomposition from decomposition module 970 as $S^B=1$, $Q^B=U$, $S^A=\Sigma$, and $Q^A=V^T$, with $Q^A$ and $Q^B$ not ternarized initially. The decomposed layer weight ternarization and scale determination module 975 then performs the iterative process to ternarize $Q^A$ and $Q^B$. For k=0, ..., r−1 (i.e., starting from outer product with the largest, loss-aware singular value), the module 975 minimizes the approximation loss with respect to the scaled ternary vector $\tilde{x}^k \equiv (S_{kk}^A)x^k=(Q^B S^A)(:, k)$, the $k^{th}$ column of $Q^B S^A$. Then, for k=0, ..., r−1 (i.e., starting from outer product with the largest, loss-aware singular value), the module 975 minimizes the approximation loss with respect to the scaled ternary vector $(\tilde{y}^k)^T \equiv (S_{kk}^A)(y^k)^T=(S^A Q^A)(k, :)$, the $k^{th}$ row of $S^A Q^A$. Lastly for the iteration, the module 975 minimizes the approximation loss with respect to $S^B$. These three minimization operations are repeated as needed or desired in some embodiments. These ternarized weight and scale tensors for the decomposed layers are stored in 952, as they are used in the subsequent proximal step of ADMM (e.g., to determine the ADMM penalty constraint).

The following describes in greater detail techniques used by the weight ternarization and scale determination module 975 of some embodiments to minimize the approximation loss given by Equation (7) above. These techniques of some embodiments basically identify sets of variables that are convenient to optimize. As described above, the matrix X, which is the decomposed ternarized approximation to W, can be expressed as a sum of outer products $$X = \sum_{k=0}^{r-1} P^k, \quad (24)$$

where $P^k$ is the $k^{th}$ outer product given by $$P^k \equiv (S^A)_{kk}[S^B x^k (y^k)^T]. \quad (25)$$

As $x^k \equiv B(:, k)$ is the $k^{th}$ column of $Q^B$ and $y^k \equiv Q^A(k,:)$ is the $k^{th}$ row of $Q^A$, $x^k(y^k)^T$ is an outer product. The portion of the approximation loss that depends on the outer product $P^k$ is $$L \equiv \frac{1}{2} \sum_{c=0}^{N_{out}-1} \sum_{a=0}^{V_p-1} H_{ca}[P_{ca}^k - T_{ca}^k]^2, \quad (26)$$

where $T^k$ is the "target" value for $P^k$ defined by $$T^k \equiv W - (X - P^k) = W - \sum_{j \neq k} P^j. \quad (27)$$

The decomposed layer weight ternarization and scale determination module 975 of some embodiments uses, in some embodiments, an algorithm that takes a row of A or a column of B for optimization, as there is no interactions among the elements of the k-th row of A or the elements of the k-th row of B. The portion of the approximation loss that depends on the k-th scaled column vector of $Q^B$ (that is, $\tilde{x}^k \equiv (S_{kk}^A)x^k$), is given by $$L(\tilde{x}^k) = \frac{1}{2}\sum_c (\tilde{x}_c^k)^2 \left[(s_c^B)^2 \sum_a H_{ca}(y_a^k)^2\right] - \sum_c \tilde{x}_c^k \left[s_c^B \sum_a H_{ca} y_a^k T_{ca}^k\right]. \quad (28)$$

Similarly, the portion of the approximation loss that depends on the k-th scaled row vector of $Q^A$ (that is, $\tilde{y}^k \equiv (S_{kk}^A)y^k$), is given by $$L(\tilde{y}^k) = \frac{1}{2}\sum_a (\tilde{y}_a^k)^2 \left[\sum_c H_{ca}(s_c^B x_c^k)^2\right] - \sum_a \tilde{y}_a^k \left[\sum_c H_{ca} s_c^B x_c^k T_{ca}^k\right]. \quad (29)$$

These quadratic losses are diagonal in the elements of $\tilde{x}^k$ and $\tilde{y}^k$, respectively. As such, this loss can be minimized with respect to $\tilde{x}^k$ using the following algorithm for minimizing a diagonal quadratic loss with respect to a scaled ternary vector.

The algorithm for minimizing a diagonal quadratic loss with respect to a scaled ternary vector is based on an algorithm found in "Model Compression as Constrained Optimization, With Application to Neural Nets, Part II:

Quantization" by Miguel Á. Carreira-Perpiñan and Yerlan Idelbayev, arXiv preprint arXiv:1707.04319, July 2017, which is incorporated herein by reference. Initially, the algorithm for minimizing this loss without considering a sparsity constraint will be described, followed by the incorporation of such a constraint.

In the optimization over scaled rows of A and scaled columns of B, a diagonal quadratic loss function of a scaled ternary vector needs to be minimized. As such, a loss given by $$L(z) = \frac{1}{2}z^T Dz + b^T z \qquad (30)$$

is minimized, where z is a scaled ternary vector with components $z_i = \gamma q_i$, $\gamma$ is the scale and each $q_i$ is a ternary value. $D = \text{diag}(d_0, d_1, \ldots, d_{n-1})$ is a positive definite diagonal matrix with floating point elements $d_i$, and b is a vector with floating point components. The loss can be rewritten by completing the square as $$L(z) = \frac{1}{2}\left[(z - \hat{z})^T D(z - \hat{z}) - \hat{z}^T D\hat{z}\right] \qquad (31)$$

where $\hat{z} = -D^{-1}b$.

Given a scale $\gamma \geq 0$, the loss is minimized when $$q_i = \begin{cases} \text{sign}(\hat{z}_i), & |\hat{z}_i| > \gamma/2 \\ 0, & \text{otherwise} \end{cases} = \begin{cases} \text{sign}(-b_i), & |b_i| > (\gamma/2)d_i \\ 0, & \text{otherwise} \end{cases}. \qquad (32)$$

Under the assumption that the indices are ordered such that the $|\hat{z}_i|$ are in descending order of absolute value, possible solutions for $\gamma$ can be labeled by the maximum index J such that $|\hat{z}_i| > \gamma/2$ for all $i \leq J$. The loss for a given J is then $$L_J(\gamma) = \sum_{i \leq J} d_i \gamma \left(\frac{\gamma}{2} - |\hat{z}_i|\right). \qquad (33)$$

Minimizing over $\gamma$ gives $$\gamma_J^* = \frac{\sum_{i \leq J} d_i |\hat{z}_i|}{\sum_{i \leq J} d_i} = \frac{\sum_{i \leq J} |b_i|}{\sum_{i \leq J} d_i}. \qquad (34)$$

In other words, the optimal value is the weighted average of the $|\hat{z}_i|$ that map to a nonzero ternary value. At this value of $\gamma^*$, the loss is $$L_J = -\frac{1}{2}(\gamma_J^*)^2 \sum_{i \leq J} d_i. \qquad (35)$$

The algorithm for computing the optimal solution (without a sparsity constraint) iterates over $J = 0, \ldots, n-1$. In each iteration, the algorithm accumulates the partial sums of $d_i$ and $|b_i|$, computes $L_J$ and keeps track of the current lowest $L_J$ and the corresponding value of $\gamma_J$. After completing these iterations, the algorithm usese the optimal value of $\gamma_J$ to compute $q_i$.

As mentioned, this algorithm for minimizing a diagonal quadratic loss with respect to a scaled ternary vector does not account for a sparsity constraint, but can be modified to do so. This sparsity constraint is modeled by adding a Lagrange penalty term to the approximation loss to get $$L(z) = \frac{1}{2}z^T Dz + b^T z + \lambda \|q\|_1 = \frac{1}{2}\gamma^2 q^T Dq + \gamma b^T q + \lambda \|q\|_1, \qquad (36)$$

where $\lambda$ is the Lagrange multiplier. The penalty term is proportional to $\|q\|_1$, which, because q is ternary, is the number of nonzero weights in the vector. For a weight with $b_i \neq 0$, the loss is lower with $q_i = -\text{sign}(b_i)$ than with $q_i = \text{sign}(b_i)$. The loss difference between the preferred nonzero value and zero is $$\Delta L_i(\lambda) \equiv L_i(b_i = -\text{sign}(b_i)) - L_i(b_i = 0) = \frac{d_i}{2}\gamma^2 - |b_i|\gamma + \lambda. \qquad (37)$$

Given a scale $\gamma \geq 0$, the optimal value of $q_i$ is $$q_i^*(\gamma) = -\text{sign}(b_i) \times \begin{cases} 0, & \gamma < \gamma_i^- \\ 1, & \gamma_i^- \leq \gamma \leq \gamma_i^+ \\ 0, & \gamma > \gamma_i^+ \end{cases}, \qquad (38)$$

where $$\gamma_i^\pm = \frac{1}{d_i}\left(|b_i| \pm \sqrt{b_i^2 - 2\lambda d_i}\right) = \frac{|b_i|}{d_i}\left(1 \pm \sqrt{1 - \frac{2\lambda d_i}{b_i^2}}\right). \qquad (39)$$

There are several cases. If $$\frac{b_i^2}{2d_i} < \lambda,$$

then $\gamma_i^\pm$ are both complex, and the weight is always zeroed regardless of $\gamma$. If $$\frac{b_i^2}{2d_i} = \lambda,$$

then $\gamma_i^- = \gamma_i^+$, and the weight is always zeroed. Finally, if $$\frac{b_i^2}{2d_i} > \lambda,$$

then $\gamma_i^\pm$ are both real and positive, and the weight is set to $-\text{sign}(b_i)$ if $\gamma \in (\gamma_i^-, \gamma_{i+})$ and zeroed otherwise. That is, if the roots given by Equation (39) are complex or degenerate, then the weight is always set to zero. If the roots are real, then sometimes the weight is nonzero.

When the scale is large, a weight is better approximated by zero than by $q_i = \pm 1$. As the scale decreases, the nonzero value $-\text{sign}(b_i)$ is a better fit. However, when the scale gets sufficiently small, the cost/benefit of nonzero $q_i$ is outweighed by the sparsity cost, $\lambda$, of having a nonzero weight, and so in this case the weight is also zeroed. If the weights in the set, S, are assigned to their respective preferred nonzero value $-\text{sign}(b_i)$, then the total cost is $\Sigma_{i \in S} \Delta_i L(\gamma)$, and the optimal value of $\gamma$ is given by $$\gamma_S^* = \frac{\sum_{i \in S} |b_i|}{\sum_{i \in S} d_i}. \quad (40)$$

At this optimal value $\gamma_S$, the loss has value $$L_S^* = -\frac{1}{2}(\gamma_S^*)^2 \sum_{i \in S} d_i + \lambda |S|. \quad (41)$$

The algorithm of some embodiments for computing the optimal solution with a sparsity constraint is as follows. For each weight with $b_i^2 - 2\lambda d_i$, the algorithm appends two triples with components $(\gamma, \sigma, i)$ equal to $(\gamma_i^-, -1, i)$ and $(\gamma_i^+, +1, i)$ to an array, and sorts in order of decreasing $\gamma$. The algorithm then initializes running sums of $\sigma$, $d_i$ and $|b_i|$ to zero: sum_d=0 sum_b=0, sum_sigma=0. Processing the array of triples in order of decreasing $\gamma$, the algorithm updates the running sums sum_sigma+=$\sigma$, sum_b+=$\sigma$+=$|b_i|$, and sum_d+=$\sigma d_i$, computes optimal values of $\gamma^*$ and $L^*_S$ for the current S, and updates the current best loss L* and corresponding scale, $\gamma^*$. Finally, the algorithm computes the optimal ternary values $q_i^*(\gamma^*)$.

It should be noted that while the above algorithm for minimizing a diagonal quadratic loss with respect to a scaled ternary vector is described in the context of a decomposed layer, some embodiments also use such an algorithm to optimize the weights of a non-decomposed layer or channel. One important choice in the above algorithm is where to set the Lagrange multiplier for an optimal solution. If there is an existing ternary solution with approximation loss $L_o$, $N_A$ nonzero weights in A, and $N_B$ nonzero weights in B, then including the Lagrange penalty, this solution has Lagrangian value $L_o + \lambda(N_A + N_B)$. If $\lambda$ exceeds $\lambda_{max}$, defined as $$\lambda_{max} = \frac{L_0}{\min(N_A, N_B)}, \quad (42)$$

then there is a solution with a smaller value of the Lagrangian obtained by setting all weights to zero. Because this is an undesirable solution, $\Delta_{max}$ is an upper bound on reasonable values of the multiplier. From the previous description, there is a threshold $\lambda_i$, given by $$\lambda_i \equiv |b_i|\gamma - \frac{d_i}{2}\gamma^2, \quad (43)$$

such that for $\lambda_i < \lambda$ the weight will be zeroed. If there is a scaled ternary matrix with $N_0$ nonzero values optimized for $\lambda=0$ and a limit of N nonzero, then thresholds $\lambda_i$ can be computed for all the weights and sorted in decreasing order. $\lambda$ can then be set equal to the $N_{th}$ largest $\lambda_i$. Given that the threshold values will change as more values are zeroed, multiple passes of the refinement algorithm can be performed gradually increasing the multiplier $\lambda$ until the required sparsity is met.

The algorithm above describes the imposition of a sparsity constraint for a particular decomposed layer. However, in some embodiments, the training system imposes a global sparsity constraint that limits the overall percentage of weights in the network that can be given non-zero values. For a network without any decomposed layers, a global sparsity algorithm of some embodiments (such as that described in U.S. patent application Ser. No. 16/923,003, incorporated by reference above) identifies weights that have the lowest increase in loss due to being set to zero. For non-decomposed layers, this increase is not dependent on the other weights (except for replicated layers, which have dependencies on each other, as described in U.S. patent application Ser. No. 16/923,003). For decomposed layers, the sparsity costs are much more linked, and thus the imposition of a global sparsity constraint is more complex.

In order to impose a global sparsity constraint, some embodiments estimate the increase in the loss to due zeroing an element of $Q^A$ using formula for the loss of a row of A (Equation (29)) and zeroing that one element, with all other variables held fixed. Similarly, the increase in the loss due to zeroing an element of $Q^B$ using the loss for a column of B (Equation (28)) can be estimated. Given a global sparsity constraint requiring a fraction s of the network weights to be zero, the fraction of the network weights that have the smallest estimates for the loss increase can be set to zero at the beginning of the decomposition. It should be noted that doing so requires having a decomposition for all network layers simultaneously, and that these estimates of the cost increase due to zeroing a weight are approximate in that they ignore the fact that the ternarization of $Q^A$ and $Q^B$ and the optimization of the scales changes these estimates. As such, some embodiments include the sparsity assignments in the iterative optimization of the decomposition.

Figure 10:
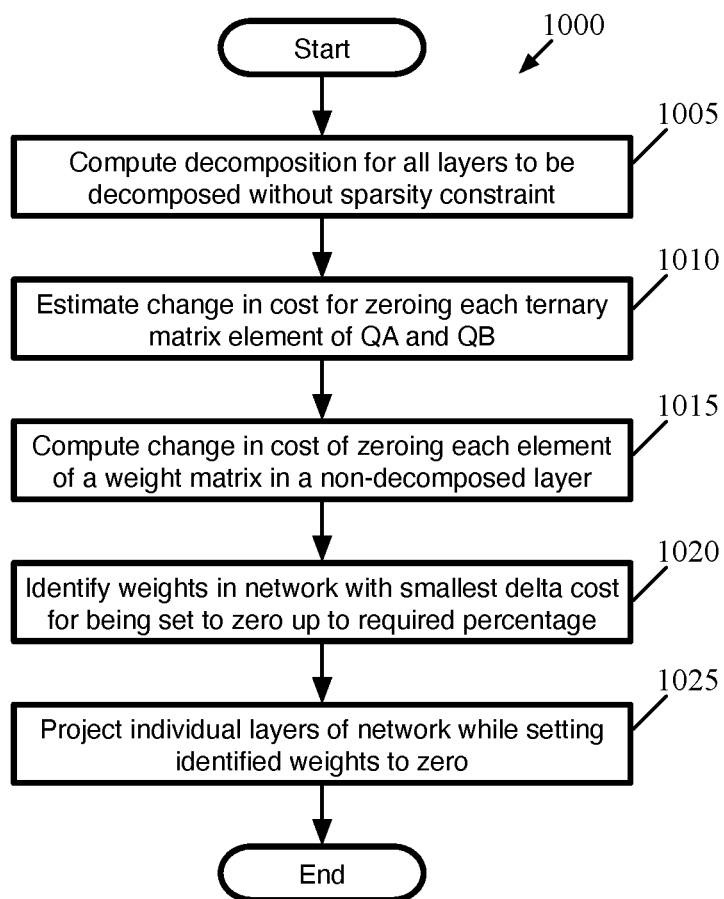
FIG. 10 conceptually illustrates a process of some embodiments for imposing global sparsity for a network that may include both decomposed and non-decomposed layers.

FIG. 10 conceptually illustrates a process 1000 of some embodiments for imposing global sparsity for a network that may include both decomposed and non-decomposed layers. In some embodiments, the process 1000 is performed by a training system 900 (e.g., as part of the proximal step of ADMM).

As shown, the process 1000 begins by computing (at 1005) the decomposition for all layers identified as being decomposed, without imposing any sparsity constraint. In some embodiments, this is the loss-aware low-rank decomposition performed by the decomposition module 970 for each layer 980 identified for decomposition.

Next, the process 1000 estimates (at 1010) the change in cost for zeroing each ternary matrix element in $Q^A$ and $Q^B$ of each layer. As just described, these values can be estimated using Equations (29) and (28) for the elements of $Q^A$ and $Q^B$, respectively. The process 1000 of some embodiments also computes (at 1015) the change in cost of zeroing each element of the weight matrices in non-decomposed layers. As described, because the cost calculation for a given weight is not substantially dependent on other weights, there is less complex computation involved than for the weights of decomposed layers.

The process 1000 then identifies (at 1020) the weights in the network with the smallest delta cost (i.e., the smallest increase in the loss function) for being set to zero, up to a required percentage. If the target fractional weight sparsity (i.e., the percentage of weights required to be set to zero) is s and the decomposed network includes a total of N weights (accounting for both decomposed and non-decomposed layers), then sN weights should be set to zero.

Finally, the process 1000 projects (at 1025) the individual layers of the network. In some embodiments, the weight quantizer and sparsifier 965 provides the decomposed layer weight ternarization and scale determination module 975 as to which elements of $Q^A$ and $Q^B$ are to be set to zero for each decomposed layer so that these processes can use this data to determine the weight and scale tensors.

It should be noted that the process 1000 assumes a fixed rank for each low-rank decomposition (i.e., for each decomposed layer). Some embodiments use a modified process that also helps determine the rank. This process computes the delta cost per weight for zeroing each outer product, by using the loss formula to compute the cost of zeroing an entire outer product and normalizing this delta cost by dividing by the number of ternary weights (in $Q^A$ and $Q^B$) that would be zeroed. It should be noted that the sparsification of outer products may be favored because the cost of zeroing the outer product is amortized across a row of weights in $Q^A$ and a column of weights in $Q^B$. In the array of sparsification options considered by the weight quantizer and sparsifier 965, options for zeroing both outer products and individual weights are considered. The array is, as usual, sorted by cost increase per weight, and the sorted array is processed by selecting sparsification options until the target sparsity is reached. The process is designed so as to not double count weights that are sparsified both as individual weights and as elements of an outer product.

Some embodiments further refine this global sparsity process by allowing the global sparsity decision (e.g., by the weight quantizer and sparsifier 965) to determine the amount of weights set to zero in a decomposed layer, but not which specific weights. As previously indicated, zeroing an element in the k-th column of B changes the sparsification costs for all weights in the k-th row of A (i.e., the weights are not independent). As such, estimating the costs for zeroing the weights in a factored layer and deciding which network weights to set to zero without considering these interactions could provide a bad result. As one example (an edge case), if all the weights in the k-th row of A are set to zero (i.e., effectively removing a filter of the first layer of the decomposition), then leaving any weights in the k-th column of B is not useful.

Thus, some embodiments use the above-described process 1000 (or the modified process that also helps determine the rank) to identify which weights should be set to zero. For the decomposed layers, however, the weight quantizer and sparsifier 965 only provides the total number of weights identified as being set to zero. The decomposed layer weight ternarization and scale determination module 975 uses the optimization algorithm described above that accounts for sparsity to optimize the ternarization and weight scales while ensuring that the layer sparsity assigned to each is met.

The above description relates primarily to the projection step of ADMM training, which for layers marked for decomposition includes identifying the low-rank decomposition and mapping the decomposition to weight and scale tensors for each decomposed layer. In addition, as mentioned, the proximal step of ADMM training uses SGD with a loss function that includes a standard loss term as well as an ADMM penalty term. In the proximal step, inputs are processed through the quantized network and values are computed for the loss function. During this forward propagation, the layers marked for decomposition are not decomposed, so additive noise is used to model the value quantization.

The values for the loss function are back-propagated to train the weight values of the network (which allows the weight values to be temporarily moved off of their quantized values). After one or more such stages, the projection stage is again performed to (i) decompose layers, determine scales and project values to ternary values while imposing the global sparsity constraint, as described in detail above.

Figure 11:
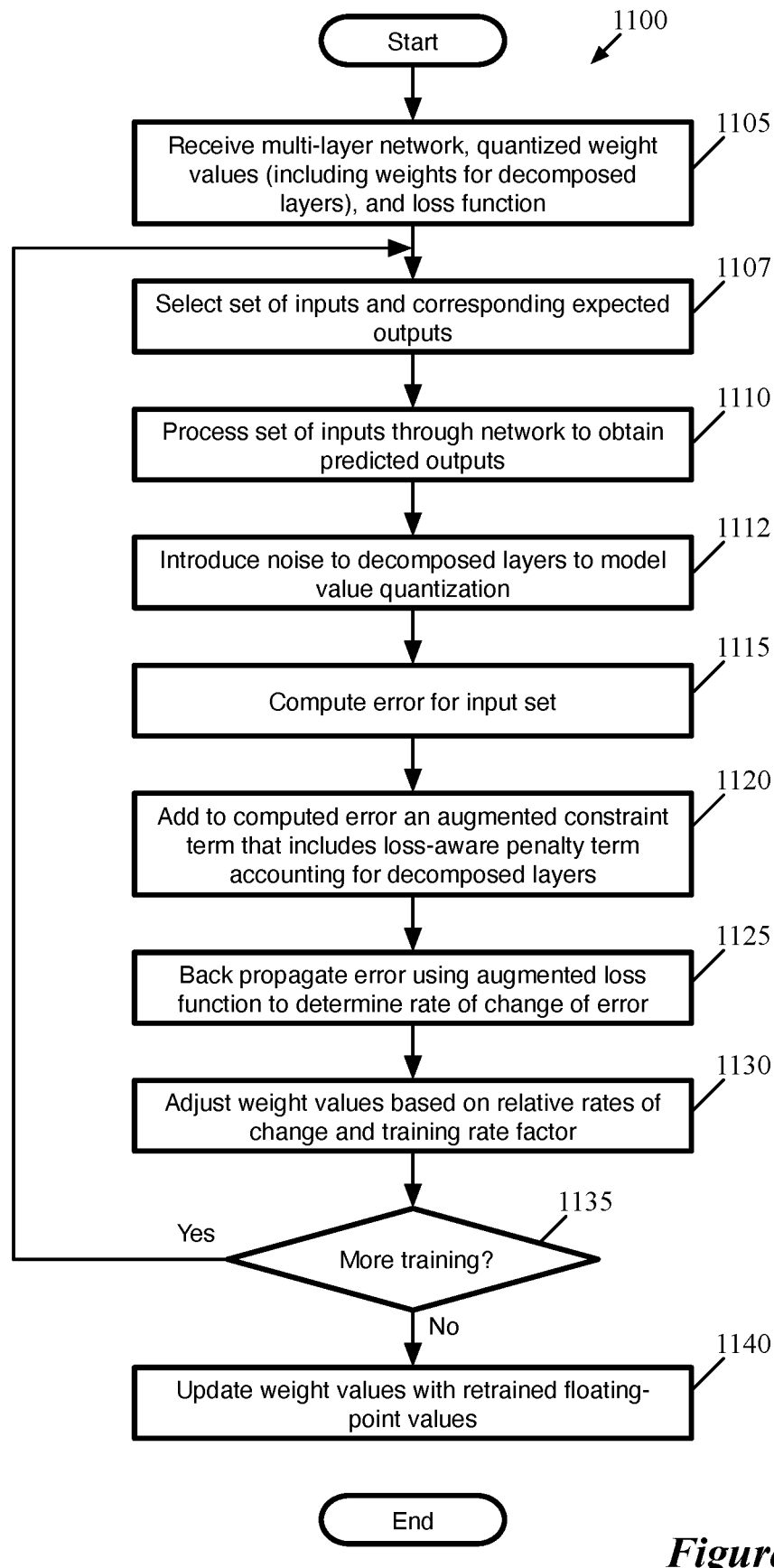
FIG. 11 conceptually illustrates a training process of some embodiments to perform the proximal step of retraining the MT network using the loss-aware penalty term.

FIG. 11 conceptually illustrates a training process 1100 of some embodiments to perform the proximal step of retraining the MT network using the loss-aware penalty term. In some embodiments, this process 1100 is performed by several modules of the training system 900 (or a similar system).

As shown, the process 1100 begins by receiving (at 1105) a multi-layer network with quantized weights (including the weights for decomposed layers) and the associated loss function that was used to originally train the floating-point values. The weight values, at this point, have been quantized via a process such as that described above. The network of some embodiments is a multi-layer machine-trained network (e.g., a feed-forward neural network), such as that shown in FIG. 1. The network includes multiple layers of nodes, including a layer of input nodes, at least one layer of hidden nodes, and a layer of output nodes. At least a subset of the layers are decomposed, as described above, but are treated as single layers with their original number of filters for the proximal step. Each hidden node and output node in convolutional and fully-connected layers includes a linear component and a non-linear activation function. For each input the network receives, it generates a corresponding output.

The process 1100 selects (at 1107) a set of inputs and corresponding expected (ground-truth) outputs. In some embodiments, the input generator 905 (or a similar module) of the training system 900 breaks up the inputs into constituent values to be fed into the input layer of the network. For instance, for a network being trained for object detection, the input generator might simply divide the pixels into several sections, or might perform computations based on the pixel values and feed these to the input layer (e.g., the percentage of red pixels in the image, the average red value of each pixel, or other statistics). In other embodiments, the inputs are provided to the network without any prior processing.

The process 1100 processes (at 1110) the selected set of inputs through the network to obtain predicted outputs (i.e., outputs predicted according to the current state of the network). Each input propagates through the processing nodes of the network, with each layer of nodes receiving their one or more inputs and generating an output to pass to the next layer of nodes. In the final output layer, one or more nodes receives the outputs from the previous layer and generates the outputs of the network. In some embodiments, this processing entails, for each node of a convolutional or fully-connected layer, the linear component first computing a weighted sum of its input values (according to the quantized initial weight values), and then the non-linear activation function computing an output based on this weighted sum.

During the processing of the inputs through the network, the process 1100 introduces (at 1112) noise to the outputs of layers marked for decomposition in order to model the value quantization that occurs to the outputs of the first low-rank layer when those layers are decomposed into first and second layers. Some embodiments process all the inputs through each layer together rather than processing each input through the entire network one at a time (e.g., to enable value quantization), and the training process uses a sample of the inputs to the layer to compute statistics and determine the scale of the additive noise as described in detail above.

After processing the inputs through the network with the added noise, the process 1100 computes (at 1115) the error of the predicted outputs versus the expected outputs for the selected inputs (i.e., the standard loss function term). In some embodiments, the error is computed for each individual input as the network generates its output. The loss function quantifies the difference between the predicted output and the actual output for each input in some embodiments. Some embodiments compute this as a simple difference, or absolute value of the difference, between the two values; other embodiments compute the square of the differences, or other such measure. In addition, some embodiments sum or average the loss function value for each input in a set of inputs.

The process 1100 also adds (at 1120) the augmented constraint term that includes the loss-aware penalty term (which accounts for decomposed layers) to the computed error, so that the loss function includes both the standard loss term and the augmented constraint term. The constraint term, as described above, penalizes weights for differing from their allowed set of values, which for layers marked for decomposition are given by the matrix X=BA.

Next, the process 1100 uses the augmented loss function to back-propagate (at 1125) the error to determine the rate of change of the error with respect to a change of each weight value. The back-propagation using the augmented loss function determines, for each weight, the rate of change of the loss function with respect to a change in the weight at the current value of the loss function. The back-propagation process uses the chain rule for partial derivatives to isolate the partial derivative of the augmented loss function with respect to each individual weight used in the multi-layer network, and assign a value to this partial derivative for the current value of the augmented loss function (i.e., the gradient, which is also used to recompute the FIM in some embodiments). Thus, this process identifies the relative effect on the augmented loss function of changes to the many different weights used to generate the outputs of the network.

Specifically, if L is the augmented loss function (including the loss-aware penalty term), then the backpropagation computes, for each weight $w_{ik}$, the partial derivative $$\frac{\partial L}{\partial w_{ik}}.$$

Because the weights are isolated in a node's output computation as well as (typically) in any constraint terms, computing these partial derivatives is not difficult via application of the chain rule. In this sense, the augmented loss function is a function in many-dimensional space (i.e., with the various weight coefficient values being the many dimensions), and the nature of the function means that the effect of each weight value can be easily isolated for a given loss function value.

The process 1100 adjusts (at 1130) the weight values based on the relative rates of change and a training rate factor. The gradients computed at 1125 are used to update the weight values by moving the weight values in the direction opposite the gradient (to attempt to reduce the loss function value) by a particular amount, with a larger partial derivative for a particular weight (i.e., a component of the gradient) resulting in a greater change to that weight. Some embodiments use a training rate factor (a hyperparameter) to determine how much to change the weight values based on the instantaneous gradient components. That is, the gradient component for a particular weight provides an amount to move (in the direction opposite to the gradient component, as the goal is to minimize the loss function) that weight value relative to the other weight values, while the training rate specifies the distance of that move.

After the weights (and any other network parameters, such as biases) are updated, the process 1100 determines (at 1135) whether to perform additional training. Some embodiments use a minimization process (e.g., a SGD minimizer) to determine when to stop training the network. In some embodiments, the training system only stops training the network once the weights have changed by less than a threshold for a particular number of training iterations. In other embodiments, because the trained weights will again be projected onto their quantized values and sparsified, only a certain number of training iterations are performed before performing the projection/sparsification process (and, then, again performing additional training). If further training is required, the process returns to 1107, which was described above. Otherwise, the process 1100 updates (at 1140) the weight values with the retrained weight values, and the process ends (i.e., quantization can again be performed).

As noted, after performing the proximal step of ADMM through one or more iterations, some embodiments then compute the ADMM penalty terms for each weight and perform the projection/sparsification (e.g., as described above). In addition, after projection, some embodiments perform the dual update step, which updates the Lagrange multipliers (and may also update the Hessian matrix at this time as well).

The above discussion focuses primarily on training of the various replica layers of weights, while ensuring that the weight values are quantized (to ternary weight values) and sparsified (enough weight values set to zero). This enables execution of the network by a neural network inference circuit of some embodiments with ternarization and sparsity requirements. When implemented on such a neural network inference circuit of some embodiments, each replica layer is treated as a separate layer, though the same set of input values are stored for use in each of the multiple copies of the layer. Each of the individual copies of the layer are computed separately, and then the chip combines the outputs of the corresponding sets of nodes using an element-wise operation to compute the output values that are stored as inputs for the next layer.

Such a neural network inference circuit is part of an integrated circuit in some embodiments. The ICs of some embodiments are configurable to implement different networks trained to perform a particular function, and such networks may include replicated layers (trained with quantization). For instance, the ICs may implement networks for object or facial recognition in images, voice recognition in audio samples, etc. The IC of some embodiments includes a set of input processing circuits, a neural network computation fabric that can be configured to apply a neural network to an input, and a microprocessor (e.g., for controlling the input processing circuits and configuring the neural network computation fabric).

Figure 12:
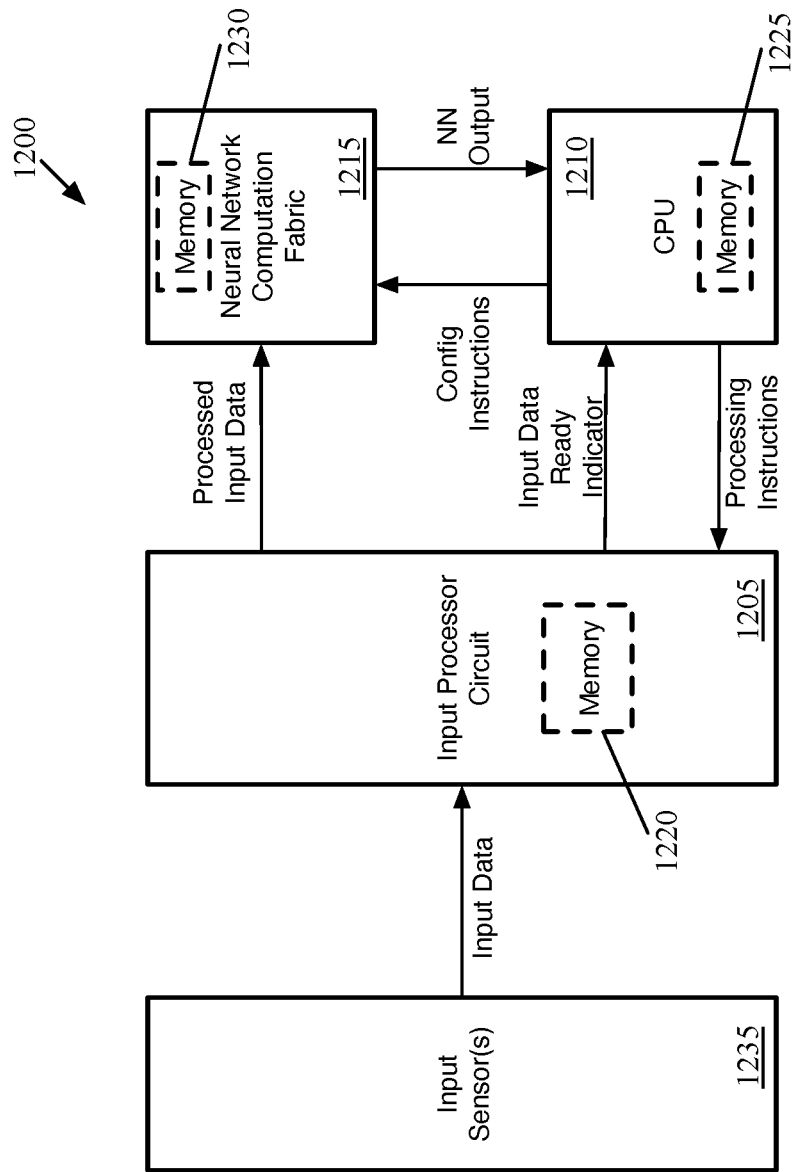
FIG. 12 conceptually illustrates an integrated circuit of some embodiments.

FIG. 12 conceptually illustrates such an IC 1200 of some embodiments. As shown, the IC includes an input processor circuit 1205, a microprocessor (CPU) 1210, and a neural network computation fabric 1215. Each of these components 1205-1215 also has corresponding memory (e.g., random access memory (RAM)) 1230. In addition, in some embodiments, the IC is integrated into a device (such as an Internet of Things (IOT) device) with one or more input sensors 1235. These input sensors can include cameras (e.g., for capturing video images on which the neural network computation fabric 1215 performs face or object recognition, etc.), microphones (e.g., for capturing audio on which the neural network computation fabric 1215 performs voice recognition, speech processing, etc.), or other types of input sensors. In other embodiments, the input sensors 1235 are located on a separate device that is linked with the IC 1200.

In some embodiments, at bootup of the IC 1200, the CPU 1210 loads neural network configuration data (e.g., weight values, scale and bias parameters, lookup table masks for each layer, memory locations for the weight and input values to use for computing each layer of the network, etc.) from off-chip storage and generates instructions for the neural network computation fabric 1215 to write the weight values and other data to its memory 1230. In addition, the CPU 1210 loads the neural network program instructions for the computation fabric to its own memory 1225. These instructions are applied by the computation fabric 1215 to input data in order to execute the neural network. These runtime instructions include, e.g., indications as to which pre-loaded sets of instructions to use for each set of calculations, etc.

The input processor circuit 1205 receives input data (e.g., still images or video frames, sounds, etc.) from the input sensor(s) 1235, and processes these according to processing instructions received from the CPU 1210. The CPU 1210 stores in its memory instructions for the input processor circuit to prepare input data for the computation fabric 1215 as well as the neural network program instructions. These instructions identify, in some embodiments, any sort of initial processing to apply to the raw data (e.g., decompression of compressed data, etc.) as well as how to arrange the data to be provided to the computation fabric 1215. For an image, e.g., these instructions might specify the order in which the pixels should be arranged and streamed to the computation fabric 1215, so that the computation fabric stores this data in the appropriate locations of its memory 1230 for subsequent operations. The input processor circuit 1205 also sends signals to the CPU 1210 to indicate when it has fully buffered an input (e.g., a frame of video) and when the input is prepared to be sent to the computation fabric 1215.

In addition to instructing the input processor circuit 1205 how and when to provide input data to the computation fabric 1215, the CPU 1210 provides the neural network program instructions to the computation fabric. In some embodiments the CPU 1210 provides these instructions in stages (e.g., one layer or portion of a layer at a time). Once the final output of the neural network is computed, the fabric 1215 provides this output back to the CPU, so that the CPU (or other circuitry on the device) can evaluate this output and perform any actions based on the output.

The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network), and/or that at least a particular percentage of the weight values be equal to zero.

Figure 13:
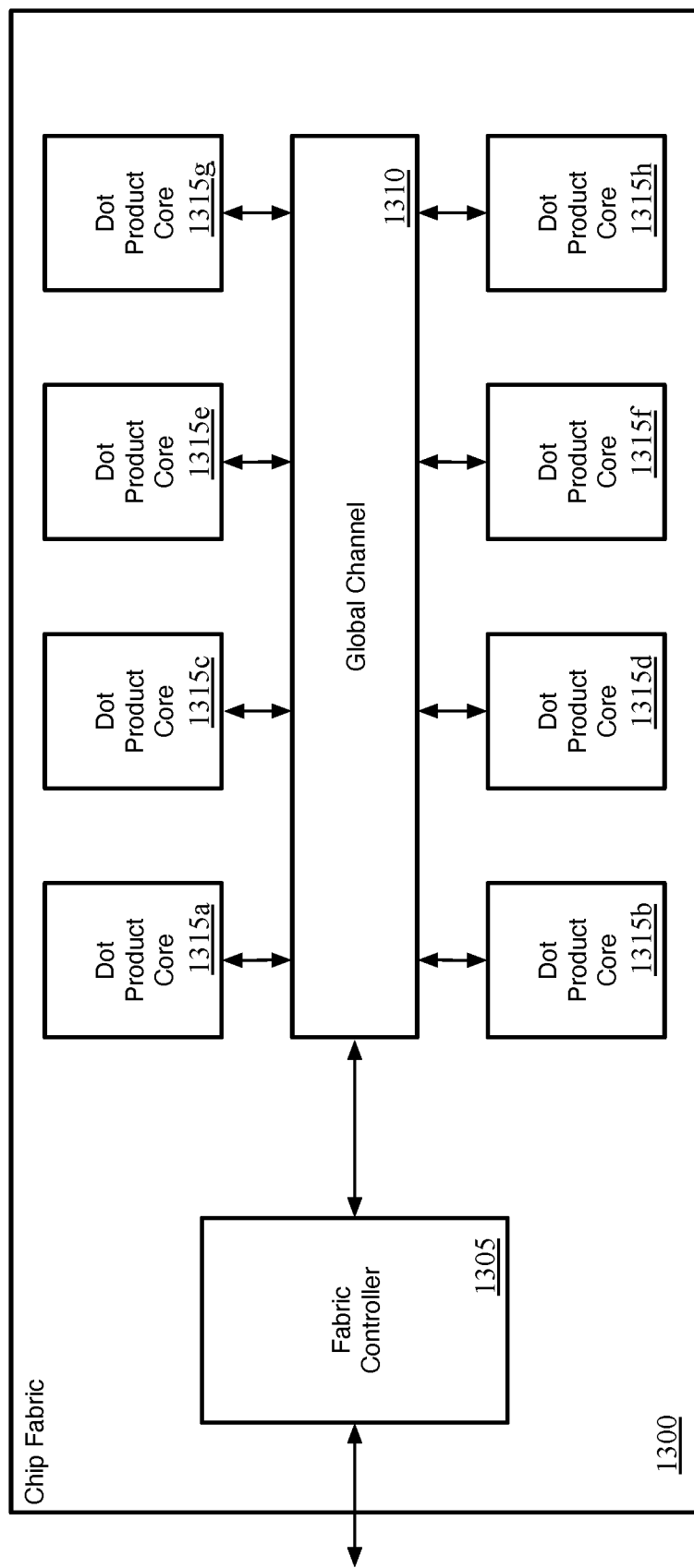
FIG. 13 conceptually illustrates the neural network computation fabric of some embodiments.

FIG. 13 conceptually illustrates the neural network computation fabric 1300 (also referred to as the chip fabric) of some embodiments. The chip fabric 1300 of some embodiments includes a fabric controller 1305, a global channel 1310, and a set of dot product cores 1315a-h. The connections between the various components 1305-1315 represent the flow of both control data (e.g., configuration data for a particular neural network layer) and computation data at runtime in some embodiments.

The fabric controller 1305 is responsible for managing the operation of the rest of the chip fabric 1300 (e.g., the dot product cores 1315) in some embodiments. The fabric controller 1305 loads instruction arguments (e.g., weight and activation value locations, which cores to use for a particular computation, etc.) from local memory (not shown) on the chip, maps instructions into a sequence of memory-mapped register writes, synchronizes the downstream controllers (e.g., controllers for the various cores 1315), etc. The instructions managed by the fabric controller 1305 are configured at compile time, in some embodiments, based on the parameters of the network being implemented by the chip fabric 1300. In some embodiments, the fabric controller 1305 interacts with the microprocessor of the IC as well (i.e., the fabric controller 1305 handles the communication with the CPU 1210 shown in FIG. 12).

The chip fabric also includes numerous dot product cores 1315 as well as a global channel 1310 that connects the cores, with these data processing circuits configured by the fabric controller (and a set of hierarchical control circuits, in some embodiments). These data processing circuits 1310 and 1315 operate to compute neural network operations in an efficient, low-power manner, according to the configuration data provided by the control circuits.

The dot product cores 1315a-h include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs.

The global channel 1310 is responsible for providing a communications bus for control and computation data between the fabric controller 1305 and the cores 1315, as well as from one core to another. The global channel 1310, among other operations, accumulates partial dot products from multiple cores when computing dot products that require more computations than can be performed in a single core, and performs post-processing on these dot products. In addition, the global channel 1310 carries activations (i.e., computation node outputs) after post-processing for storage (and for use as inputs to subsequent computation nodes) in other cores 1315. In some embodiments, the global channel 1310 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 1310, as described further below.

The chip fabric 1300 of some embodiments computes numerous neural network computation nodes simultaneously, with the computation for one node often spread across multiple cores (and subsequently the global channel). In some cases, if a neural network layer is small enough, then computation for that layer may be confined to a single core 1315. However, if multiple cores are used for a given layer (any number of cores may be used in some embodiments), then each dot product computed for that layer is spread across all of the cores 1315 in use.

That is, for a dot product computed across more than one core 1315, each of these cores computes a partial dot product from a subset of the input values and weight values for the node, then provides these partial dot products to the global channel 1310. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 1310. In some cases, however (e.g., for dot products with a very large number of terms or using larger than standard activation values, or when filters have too many nonzero weight values), each core 1315 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 1310 aggregates these partial dot products to compute the complete dot product for each node, then applies various post-processing functions (e.g., the bias, scale, and non-linear activation functions) to compute the output of each node.

In some embodiments, the dot product cores are grouped into clusters, and the global channel includes separate segments for each such cluster. Each of these channel segments includes the same circuitry in some embodiments, with the exception that buses in the first and last channel segments only connect to corresponding buses in one other channel segment while the buses in the intermediate channel segments connect to corresponding buses in two neighboring channel segments.

The data processing circuitry of each of the channel segments includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The output of the post-processing circuits is the computation node outputs (activations). The output bus, or activation write bus, carries the outputs of the post-processing circuits to the cores to be stored as inputs for the next computation layer.

Figure 14:
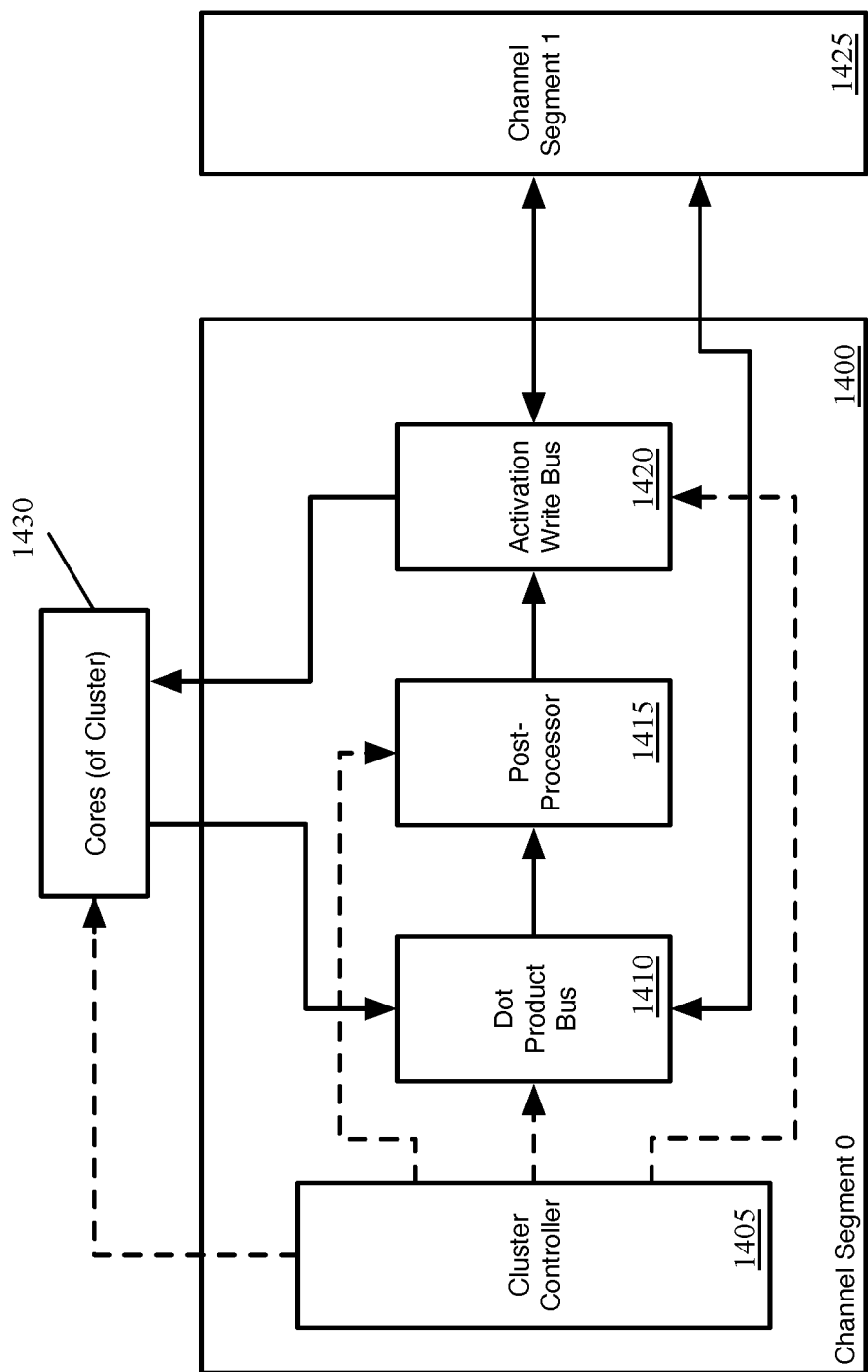
FIG. 14 conceptually illustrates the circuit blocks of a channel segment of some embodiments.

FIG. 14 conceptually illustrates the circuit blocks of a channel segment 1400 of some embodiments. The channel segment 1400 includes a cluster controller 1405, a dot product bus 1410, a post-processor 1415, and an activation write bus 1420 (also referred to as an output bus). In addition to the channel segment 1400, the figure also illustrates an additional channel segment 1425 and the cores 1430 of the local cluster for the channel segment 1400, as the circuit blocks of the channel segment 1400 exchange dot product and configuration data with these other circuits. In this diagram, the dashed lines represent the flow of configuration data while the solid lines represent the flow of neural network computation node data for convolution or fully-connected layer nodes (i.e., nodes that use a dot product based linear function). Additional neural network computation data, such as that flowing directly from the cores 1430 to the post-processor 1415 for pooling nodes or element-wise operators, is not shown.

The cluster controller 1405 configures the dot product bus 1410, post-processor 1415, and activation write bus 1420 as per the configuration instructions received from the fabric controller in some embodiments. For the dot product bus 1410, this configuration data specifies, in some embodiments, (i) which partial dot products are to be added together as part of the same neural network computation node and (ii) to which post-processing unit each aggregated dot product is sent (the post-processor 1415 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 1415, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table), as well as other data. For the activation write bus 1420, the configuration data indicates to which cores each output value is to be delivered, in some embodiments.

As mentioned, the solid lines indicate the flow of neural network computation data, for a node in a convolutional or fully-connected layer. The cores 1430 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 1410, which aggregates the partial dot products from the cores 1430 of the local cluster. The dot product bus 1410, in some embodiments, includes a number of independent dot product bus lanes that each receives partial dot products from the cores, aggregates these together, and provides the aggregated dot products to the post-processing circuits. In some embodiments, each lane of the dot product bus corresponds to (i) one of the adder trees in each of the cores (i.e., dot product bus lane N receives the partial dot products from each of the adder trees of index N in the cores), (ii) one of the post-processing units in each of the clusters (i.e., dot product bus lane N provides its aggregated output to the post-processing unit N in one of the clusters, as specified by the configuration data), and (iii) one lane of the activation write bus.

Each lane of the dot product bus 1410 spans all of the channel segments, and the dot product bus lanes in each channel segment aggregate the partial dot products from the cores of its local cluster. The dot product bus 1410 in the channel segment 1400 also exchanges locally-aggregated dot products with its neighboring segments for further aggregation if needed (i.e., if the source cores for the dot product computation span multiple clusters). In this case, the channel segment 1400 only has one neighboring segment, but internal channel segments will have two such neighboring segments. The configuration data from the cluster controller 1405 specifies whether to send these dot products in one direction or the other along the global channel for each dot product bus lane, or to aggregate the dot products from the neighboring channels locally, depending on where post-processing will occur for each dot product.

The post-processor 1415 includes numerous post-processing units that receive the dot products from their corresponding dot product bus lane and perform the non-dot product functions of the neural network computation nodes. For a typical computation node of a convolutional (or fully-connected) layer, these functions include an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table rather than a hardwired function. This enables the IC to execute different neural networks that use different activation functions and, in some embodiments, allows for different activation functions to be used in different layers of the neural network.

The activation write bus 1420 receives the computation node activation outputs from the post-processing units and carries these outputs back to the cores 1430, to be stored in the memory of the core and used as inputs for the computation nodes of the next layer of the neural network. The activation write bus connects to the cores 1430 in the local cluster as well as the activation write bus in the neighboring channel segment 1425. As with the dot product bus 1410, the activation write bus 1420 of some embodiments includes lanes, with each post-processing unit of the post-processor 1415 sending its output to a different one of these lanes.

In some embodiments, the output values may be computed by the post-processor 1415 in one cluster but carried by the activation write bus 1420 to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value. The activation write bus 1420 also includes a right shift circuit for each core that is used to align the output values for the core, in order for the values to be stored in contiguous blocks within the core RAM.

Figure 15:
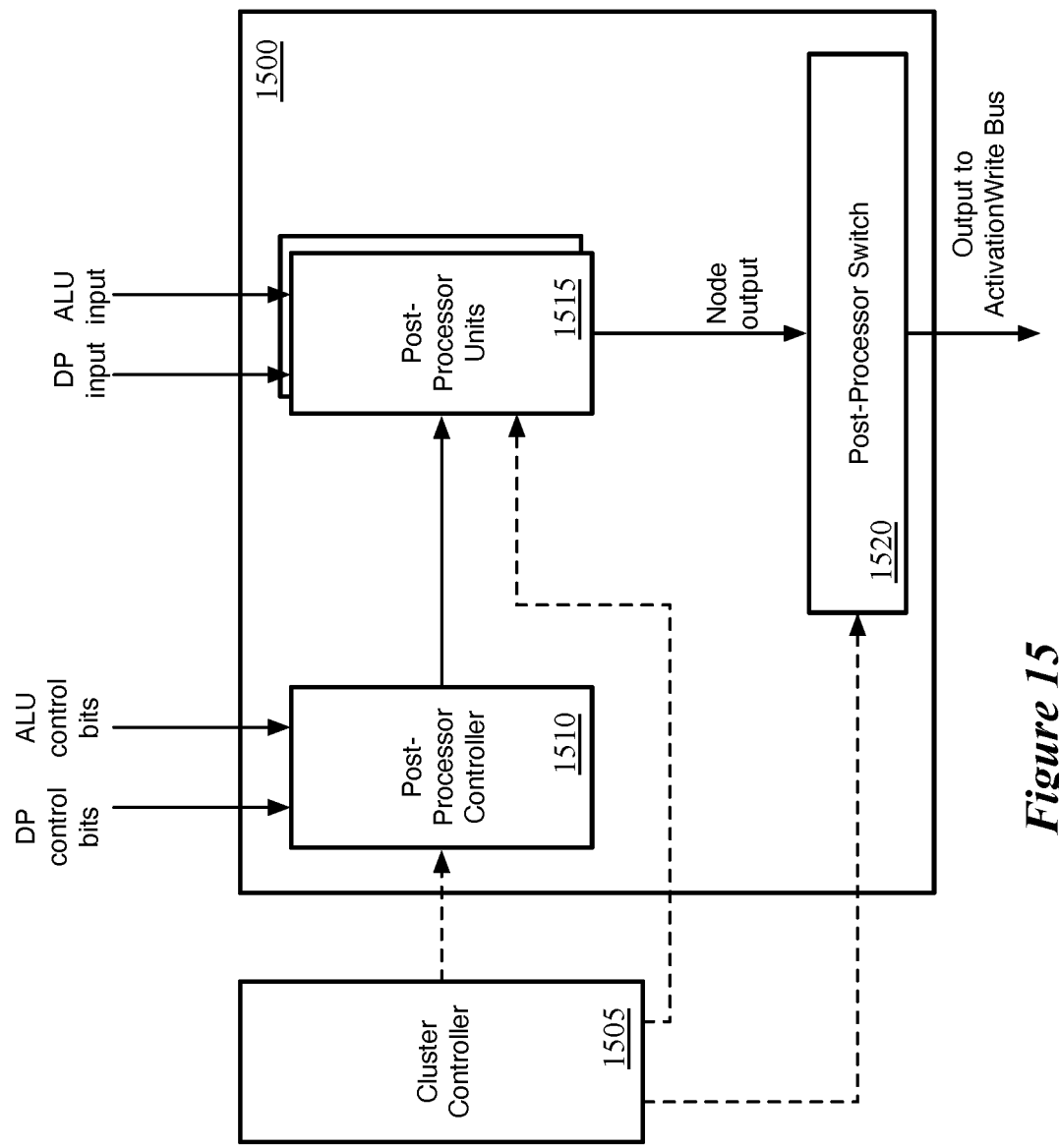
FIG. 15 conceptually illustrates the post-processing circuit block for a channel segment of some embodiments, along with the local cluster controller that provides configuration data to this post-processor.

Now that the primary circuit blocks of the global channel have been introduced, some of these circuits of some embodiments will be explained in greater detail. FIG. 15 conceptually illustrates the post-processing circuit block 1500 for a channel segment of some embodiments, along with the local cluster controller 1505 that provides configuration data to this post-processor 1500. As shown, the post-processing circuit block 1500 includes as sub-blocks a post-processor controller 1510, a set of post-processing units 1515, and a post-processor switch 1520. The cluster controller 1505 provides configuration data to each of these sub-blocks in order to synchronize operations, and to configure the post-processing units 1515 with the correct bias and scale factors as well as the activation function.

The post-processor controller block 1510 aggregates control signals from the dot product bus (for convolution and fully-connected operations) as well as the ALU bus from the cores (for pooling, copy, and element-wise operations). These control bits include accumulate and valid signals for the dot product bus (which indicate to the post-processor whether the incoming data is a final dot product, as dot products are not sent every clock cycle) as well as accumulate, valid, and end of row signals for the ALU bus. The ALU bus carries activation values directly from the cores without having dot products performed, to be used for pooling and element-wise operation layers. The accumulate and valid signals indicate to the post-processor whether the incoming ALU data is to be used, while the end of row signals indicate that different configuration data should be used for certain post-processing operations when the end of a row of input values is reached (e.g., on account of padding, etc.). The post-processor controller block 1510 aggregates these signals, as mentioned, and outputs signals to the post-processing units 1515 to indicate when the post-processing units are receiving valid dot product or ALU data.

The post-processor 1500 includes numerous post-processing units 1515 that handle the non-dot product computation of the neural network nodes. In some embodiments, the post-processor block within a segment includes the same number of post-processing units 1515 as there are dot product bus lanes and activation write bus lanes (which is also the number of adder trees in each core for computing partial dot products). Each post-processing unit 1515 receives two types of data inputs: (1) dot products from the dot product bus for convolution and fully-connected neural network nodes and (2) activation inputs (ALU inputs) from the core RAM for pooling nodes and element-wise operator nodes. In some embodiments, both types of inputs are used to execute a replicated layer (e.g., by first executing multiple convolutional layers and subsequently by combining the layers as an element-wise layer).

In some embodiments, each post-processing unit receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the post-processing units of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs). Some of the details of the post-processing units are described further below by reference to FIGS. 16 and 17.

The post-processing switch 1520 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing two 4-bit activation outputs onto the wires for one 8-bit activation output).

Figure 16:
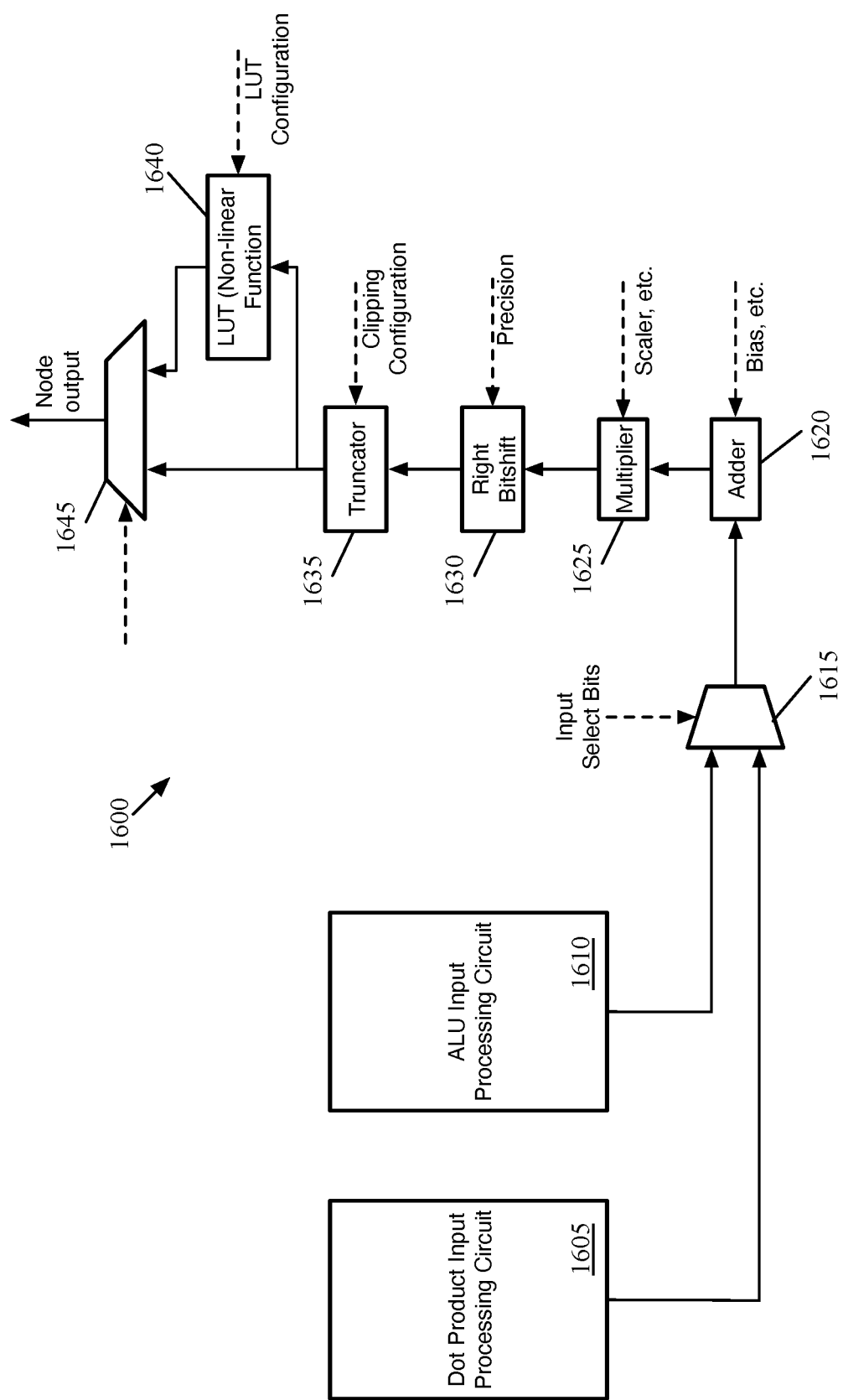
FIG. 16 conceptually illustrates the structure of a post-processing unit of some embodiments.
Figure 17:
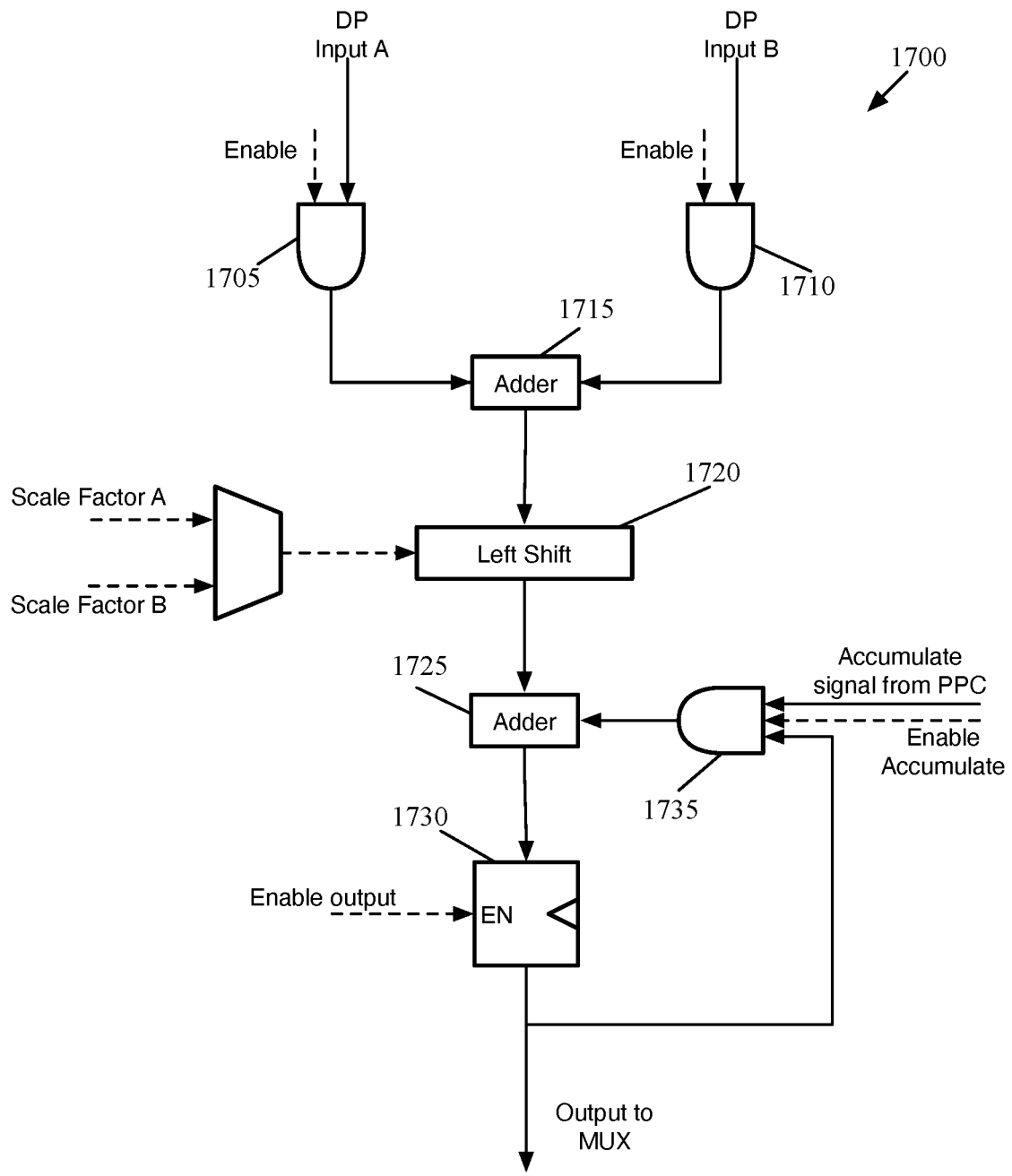
FIG. 17 conceptually illustrates a dot product input processing circuit of some embodiments.

As mentioned, FIGS. 16 and 17 illustrate the post-processing units in more detail. FIG. 16 conceptually illustrates the structure of a post-processing unit 1600 of some embodiments. As shown, the post-processing unit 1600 includes a dot product input processing circuit 1605, an ALU input processing circuit 1610, a multiplexer 1615 that selects between the outputs of these two circuits, and a set of post-processing operation circuits.

The dot product input processing circuit 1605, described in further detail by reference to FIG. 17, is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments enable dot products to be double the size of the standard quantized output (e.g., 8-bit rather than 4-bit) by using dot products from multiple cycles and bitshifting the first set of input data.

The ALU input processing circuit 1610 is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations (e.g., for the element-wise addition operation used to combine multiple replica layers). In some of these embodiments, the cores provide input values directly to the post-processing units without computing dot products, and the post-processing units are configured to perform the appropriate operations on these inputs.

The output of each of these circuits 1605 and 1610 is sent to a multiplexer 1615, and a set of configuration bits is used to select between these two possible inputs. This input value is sent to an adder 1620 and then to a multiplier 1625. For dot product outputs, the adder 1620 adds the bias of the linear function for the node and the multiplier 1625 multiplies this by the scaling factor for the linear function (these bias and scale factors may include batch normalization affine transform parameters, in some embodiments). The value sent to the multiplier 1625, in some embodiments, is a combination of (i) the scaler value computed during the training of the neural network (which is often 1) and (ii) the positive value of the ternary weight (which was removed in order to scale the weight values used in the dot product to 1 and −1). As described below, some embodiments use this scaling factor at the multiplier 1625 to handle complications arising from quantization of replica layers.

In some embodiments, a multiplexer is used to select between a bias value specific to the post-processing unit (i.e., allowing for different bias values for different computation nodes in a layer) and a bias value shared across all of the post-processing units in a layer. In general, convolution and fully-connected nodes will use a node-specific bias value (especially when accounting for the number of negative weights), but pooling and typical element-wise operator layers may use the same value for all of the nodes (often zero). However, the element-wise operation used to combine multiple replica layers may use individual node-specific bias values in some embodiments, as this layer applies post-processing operations as for a convolutional layer.

For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 1630 ensures that, post-multiplication, the value has the desired precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions. This bit shift circuit 1630 can be used to modify the precision of replica layers in some embodiments, as described below.

The truncator 1635 performs a clipping operation in some embodiments to truncate the output value of the linear operator down to the desired number of bits. In some embodiments, this can be a 4-bit value, a 5-bit value (a 4-bit signed value), an 8-bit value, or a 16-bit value. In such embodiments, the output has 16 wires, and values of less than 16-bits have 0 s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 1635 receives (as output from the right bit shifter 1630) more bits than it outputs (e.g., receiving 32 bits but outputting a maximum of 16 bits).

Finally, the LUT 1640 implements the non-linear activation function. The full (e.g., 16-bit, 8-bit) output of the truncator 1635 is passed to the multiplexer 1645, while a subset of the output bits (e.g., 5 bits) are also split off to the LUT 1645. This LUT effectively implements a mapping table representing the activation function for the neural network computation node, and the multiplexer 1645 selects between the truncator output and the LUT output. The LUT configuration, in some embodiments, is the same for all nodes in a layer, which only requires one set of mapping table values to be sent as part of the neural network instructions. The multiplexer output is the neural network node output, which is gated by a valid signal (not shown) to indicate when the post-processing unit is outputting a completed activation value to be carried by the activation write bus to the appropriate core and stored in the activation memory of that core.

The use of a LUT rather than a hardwired non-linear function enables the use of different non-linear activation functions for different layers of a neural network as well as for different networks. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function. In some embodiments, periodic functions with can be implemented using the modulus function of the truncator 1635. In this case, the period of the period function is the full truth table provided to the lookup table 1640, with the modulus function meaning that only the 5 least significant bits of the output from the right bit shifter 1630 will affect the value output by the lookup table 1640.

FIG. 17, as mentioned, conceptually illustrates a dot product input processing circuit 1700 of some embodiments. As shown, the circuit 1700 receives the output of two dot product bus lanes (dot product input A and dot product input B). These inputs are each gated by AND gates 1705 and 1710, which use enable bits from the cluster controller to specify which dot product to use as input (or both), in certain cases. In some embodiments each post-processing unit receives the output of a different corresponding dot product bus lane as its first dot product input (i.e., DP input A). That is, if there are N dot product bus lanes and N post-processing units in a cluster, then the nth post-processing unit receives its first dot product from the nth dot product bus lane. The second dot product input (i.e., DP input B) for each post-processing unit is from a different lane in some embodiments.

In this example, the activation size has the option of being either a first size (e.g., 4-bit) or twice that size (e.g., 8-bit). In the simplest case, in which (i) the dot product for a node has few enough input/weight values to be performed in one cycle, (ii) the activation size is the smaller size, and (iii) there are no sparsity violations with the filter slices assigned to each core, then the remainder of the circuit 1700 effectively acts as a pass-through for the first dot product input. The AND gate 1705 enables this first dot product input, while the AND gate 1710 gates the second dot product to 0. However, in other situations, the adder 1715, left-shift operator 1720, and adder 1725 enable the dot product calculation for a neural network node to be completed and provided to the other post-processing operations. In addition, the left shift circuit 1720 can also be used to align a dot product to ensure that the binary point is in the correct location for the input value.

In addition to these dot product operations, in some embodiments the post-processing units include additional circuitry for performing operations for neural network computation nodes that do not use dot products. The nodes of some neural network layers use computations that do not include dot products. For example, a convolutional neural network will typically include pooling layers that reduce the number of activations by performing a computation on spatially-proximate groups of activations (i.e., the outputs of spatially-proximate nodes). Typical pooling operations include average pooling (reducing a group of activations to a single activation value by computing the average of the activations) and max pooling (reducing a group of activations to a single activation value by selecting the maximum value of the activations). Element-wise operations, in some embodiments, use inputs from multiple layers that are the same shape (i.e., that have the same size and number of activation grids), and add or multiply the corresponding elements from those layers (e.g., to combine multiple replica convolutional layers).

Figure 18:
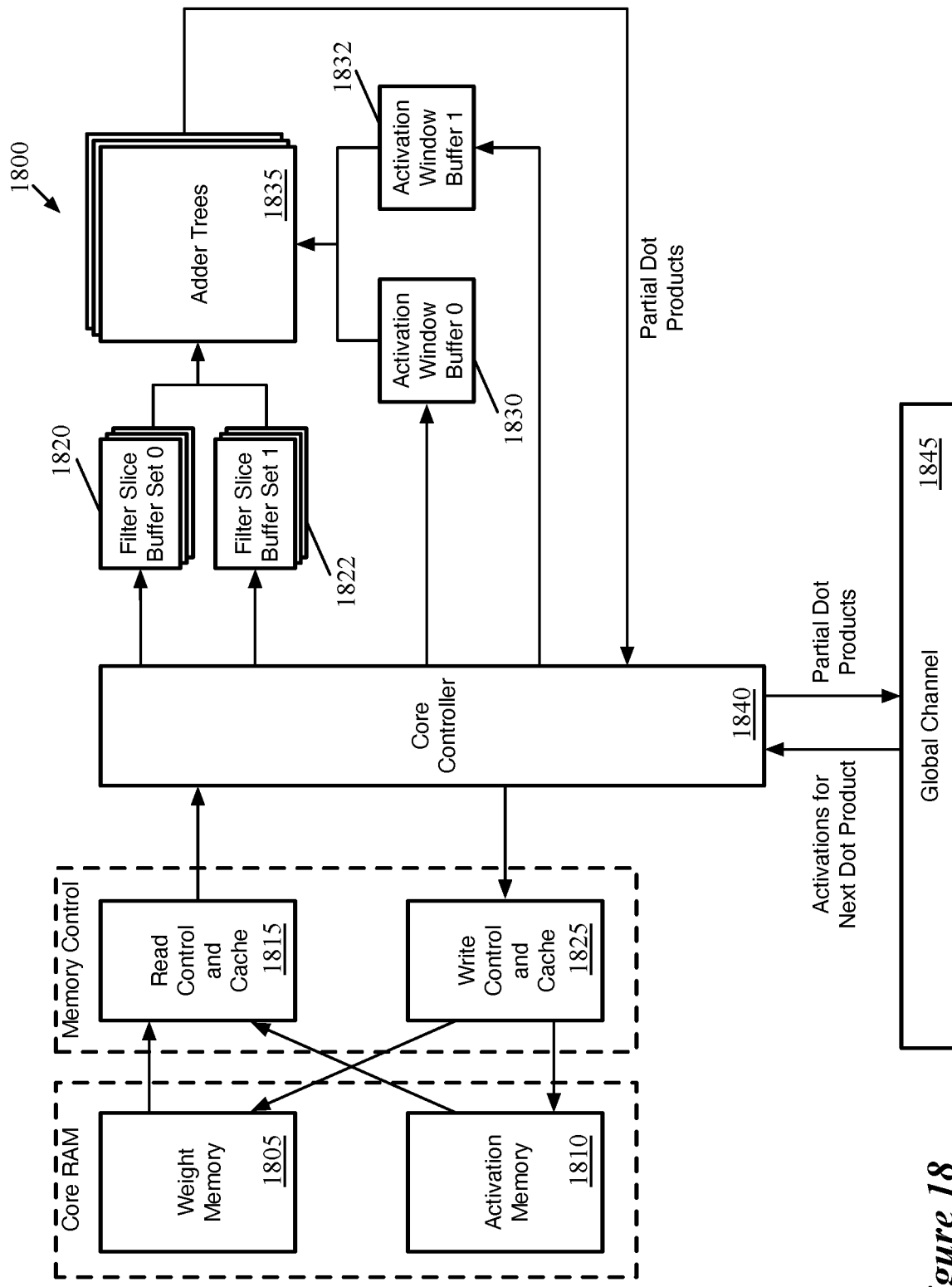
FIG. 18 conceptually illustrates the data flow within one of the cores of some embodiments for a dot product computation.

As mentioned, the dot product cores perform the majority of the dot product computation of the chip fabric of some embodiments. FIG. 18 conceptually illustrates the data flow 1800 within one of the cores of some embodiments for a dot product computation. This data flow will be described with certain specifics (e.g., weight and activation data sizes, number of separate adder trees simultaneously computing partial dot products, etc.) as examples, but it should be understood that different embodiments may use different sizes for weight data and/or activation values, different numbers of adder trees within a core, etc.

In some embodiments, the dot product cores store weight data values (e.g., weights for multiple nodes in multiple layers) in the weight memory 1805 and activation values in the activation memory 1810. In some embodiments, as shown, these memories 1805 and 1810 are part of a single block of memory for the core (e.g., banks of random access memories such as SRAMs). In addition to storing weight and activation values, in some embodiments the microprocessor of the IC can use the memories in the cores as overflow memory (e.g., to store an image before the image is processed and provided as input to the neural network fabric). The manner in which the weight data and activation values are stored in some embodiments is described in detail below by reference to FIGS. 21-23.

The weight values are part of the network parameters and thus are determined at compile time (and do not change at runtime), while the activation values (the input values to a particular node or set of nodes being computed) are the output values from a previous computation (or, for the first layer, are otherwise based on the network input) and thus are determined at runtime. Thus, the weight memory 1805 is typically larger than the activation memory 1810 (e.g., 512 KB to 64 KB), as the activation memory is at least party overwritten for each new layer of the neural network while the weight memory 1805 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/−1). In other embodiments, the weights are encoded in such a manner that less than 1 bit of the weight memory 1805 is allocated per weight value (e.g., by encoding the weight values in such a way that many of the zeros are removed, while storing additional data for each non-zero weight value).

The read controller and read cache 1815 reads data from the weight memory 1805 into sets of filter slice buffers 1820 and 1822 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 36 (or 40) weight values into each filter slice buffer, which are actually used to compute 144 dot product components (with the requirement that at least 75% of the weight values be zero, the actual adder tree only receives 36-40 inputs for each buffer of 144 activation values, as described in detail below).

Some embodiments include both primary filter slice buffers 1820 and secondary filter slice buffers 1822, as shown in this figure. In a given clock cycle, at most one of these sets of filter slice buffers is used to compute dot products (e.g., using multiplexers to select only one of the sets of weight value data). For simpler dot product computations, only the primary filter slice buffer 1820 is needed, so there is no need to load weight values into the secondary filter slice buffers 1822. However, in other cases, both sets of filter slice buffers may be used (e.g., when dot products are too large to be computed in a single clock cycle using only the primary buffers).

The read control and cache 1815 also reads data (input values) from the activation memory 1810 into the activation window buffers 1830 and 1832. In addition, the read controller 1815 arranges the input values within the activation window buffers 1830 and 1832 in some embodiments to match up with the weight values in the filters. In some embodiments, the input values in an activation window read into the buffers 1830 (and 1832) include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 1830 and a secondary activation window buffer 1832. In a given clock cycle, at most one of these sets of activation window buffers is used to compute dot products (e.g., using multiplexers to select only one of the sets of activation input values). For simpler dot product computations, only the primary activation window buffer 1820 is needed, so there is no need to load activation inputs into the secondary activation window buffer 1822. However, in other cases, both activation window buffers may be used (e.g., when dot products are too large to be computed in a single clock cycle using only the primary buffers). In some embodiments, as shown, the same read controller and cache 1815 is used to read data from both the weight memory partition 1805 and the activation memory partition 1810. In such embodiments, the cache is used to store weight value data when reading the weights from the weight memory 1805. For each pass, this memory control circuit first reads the encoded weight data and provides this data to the core controller 1840 (which decodes weight data and loads the decoded weight data into the filter slice buffers), then reads input values and provides these values to the core controller 1840 (for the core controller to load the input values into the activation window buffer(s) interspersed with the computation of dot products by the adder tree circuits 1845).

The adder trees 1845 compute the dot products between the weight values represented in the filter slice buffers 1820 and the input values in the activation window buffer 1830. The details of these partial dot product computation circuits of some embodiments are described below by reference to FIG. 19. These adder trees 1845 output partial dot products (e.g., 10-bit values) that are provided to the dot product bus, which combines the partial dot products with other partial dot products as described above. In some embodiments, the number of filter slice buffers in each of the sets 1820 and 1822 is equal to the number of adder trees 1835 in the core, as well as the number of dot product bus lanes, post-processing units, and activation write bus lanes in each segment. Thus, for a typical neural network computation node, the partial dot products computed by the adder trees 1835 in multiple cores having a particular index are aggregated by the dot product bus lane with the same index, that aggregated dot product is provided for post-processing to one of the post-processing units with the same index (i.e., the post-processing unit with that index in one of the channel segments), and the output of the post-processing unit is transported by the activation write bus with the same index) to its destination core.

The core controller 1840 configures and coordinates the operation of the read and write controllers 1815 and 1825 in addition to the filter slice buffers 1820, activation window buffer 1830, and adder trees 1835. Furthermore, the core controller 1840 receives the input activations and weights from the read controller 1815 and loads them into the correct slots in the sets of filter slice buffers 1820 and 1822 and the activation window buffers 1830 and 1832 (or directs them to the ALU bus for non-dot product computations). Lastly, when the adder trees 1835 output their partial dot product values, the core controller 1840 sends these values to the dot product bus in the global channel 1845. When the activations for the next layer are output, the activation write bus carries these values to the core controller 1840, which provides them to the write control and cache 1825 to be written to activation memory 1810.

To reduce the circuit area and power required for dot product computations (which use the majority of resources for neural network inference), the partial dot product computation circuits (e.g., the adder trees 1835) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), e.g., due to training using quantization and sparsification techniques described above, the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 19:
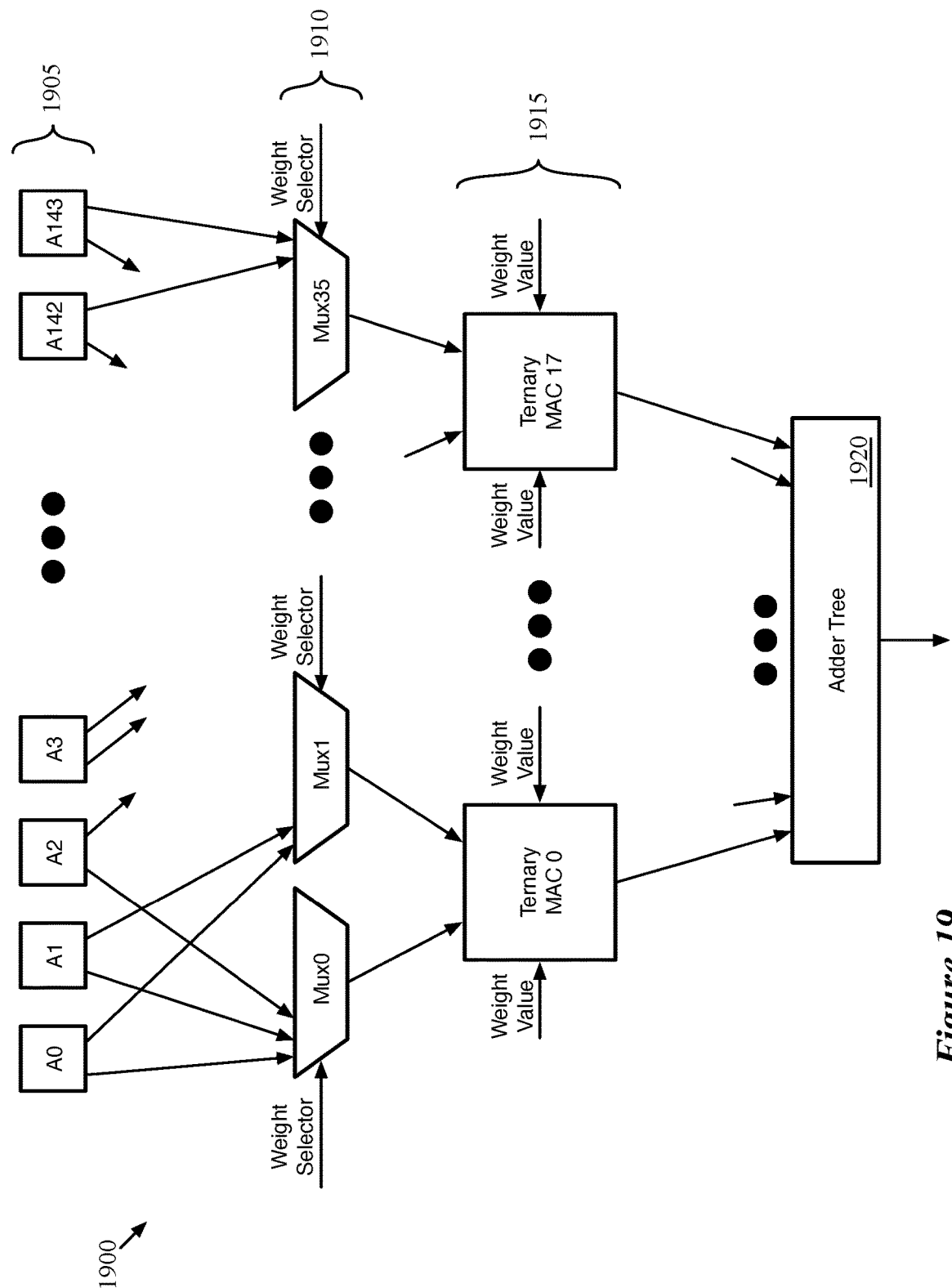
FIG. 19 conceptually illustrates an example of a partial dot product computation circuit for a guaranteed weight sparsity of at least 75%.

FIG. 19 conceptually illustrates an example of such a partial dot product computation circuit 1900 for a guaranteed weight sparsity of at least 75%. The wiring of the input values for this dot product computation circuit is designed to optimize the likelihood that, so long as the weights meet the sparsity requirement, the compiler can ensure that at runtime each input value with a nonzero corresponding weight value is provided to a different dot product input for nearly any arrangement of the nonzero weight values. As shown, the dot product computation circuit 1900 includes a set of activation inputs 1905, a set of multiplexers 1910, a set of ternary multiplier-accumulator (MAC) circuits 1915, and an adder tree 1920.

In this example, the dot product computation circuit 1900 includes 144 input values 1905. In different embodiments, the activation window buffer may have different sizes, which defines the size of the partial dot product computation. Each input value storage (e.g., each location in the activation window buffer) is connected to two of the thirty-six multiplexers 1910. In this example, at least 75% sparsity is assumed for each set of weight values, and thus the 144 activation inputs can be reduced to 36 inputs for the actual dot product computation. This significantly reduces the circuit area required for the dot product computation, as the number of adders is reduced by 75% (the adder tree effectively starts with 36 values rather than 144 values), in addition to reducing the amount of weight data that is stored in memory.

The multiplexers 1910 each have eight inputs and receive a set of select bits (the weight selector input) from the core controller that specifies which of these eight inputs to pass to the dot product computation. In some embodiments the weight selector input is a 3-bit value that is stored as part of the weight data for each non-zero weight. Having thirty-six 8-input multiplexers 1910 allows for 288 sets of wires from the activation inputs 1905 to the multiplexers 1910, which is two wires for each activation input. If the sparsity guarantee was only 50%, then seventy-two 4-input multiplexers could be used with two sets of wires for each activation input 1905

(or seventy-two 8-input multiplexers with four sets of wires for each activation input 1905), with similar proportions for different sparsity guarantees and numbers of wires per activation input.

The wire sets from the activation inputs to the multiplexers are arranged such that the compiler can verify that each input value with a nonzero corresponding weight is provided to a different one of the multiplexers 1910. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 1905 to the multiplexers 1910. In some embodiments, this algorithm computes two hashes (e.g., with two different hash functions) for each of the activation input locations 1905 that map to two different multiplexers 1910 (e.g., by computing the hash modulo 36). Each activation input location 1905 is wired to these two different multiplexers 1910 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

The weight values are known before the network is executed by the IC (i.e., at compile time), and thus the compiler can determine which of the two multiplexers that receive each input value with a non-zero corresponding weight at runtime will select that input value, such that each input value is selected by a different multiplexer (and only one multiplexer). In some embodiments, the compiler uses the same cuckoo hashing or other algorithm as was used for the wires. The select bits for the multiplexers 1910 are determined by which of the inputs to the multiplexer carries an input activation value with a nonzero corresponding weight value, and are received from the filter slice buffer. In some embodiments, these multiplexer select bits are stored for each non-zero weight value (for multiplexers that do not receive any inputs corresponding to non-zero weights, the multiplexer select bits do not matter, and thus do not need to be stored in the encoded weight data). These multiplexers 1910 provide their output to a set of ternary multiply-accumulator (MAC) circuits 1915. The ternary MAC circuits effectively form the leaves of the dot product computation, and the number of such circuits is half the number of multiplexers 1910 (18 ternary MAC circuits 1915 in this example).

In some embodiments, the weight values for a particular dot product computation are all either zero, a positive value, or the negation of the positive value in some embodiments. In this case, the dot product does not require any actual multiplication at the leaves of the computation, as the positive and negative weight values can be treated as 1 and −1, with a single multiplication by the positive value afterwards. Removing the multiplication at the leaves saves significant circuit area for a chip with numerous such computation circuits.

To combine the two input values while accounting for the ternary weight values, the ternary MAC circuits 1915 add the two input values from the multiplexers 1910 while also receiving as inputs the corresponding weight data for these input values. In some embodiments, the ternary MAC receives two bits of weight data for each of its inputs. If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value. The negative values are accounted for in the bias computation within the post-processing unit, as described above.

The outputs of the ternary MACs provide the inputs to the adder tree 1920 that computes the output for the partial dot product computation. In some embodiments, this adder tree is a standard adder tree circuit that adds pairs of values over several layers. For example, the adder tree 1920 receives 18 inputs for 9 adders, which in turn provide outputs to 4 adders (with an additional output to be added in later), etc. In some embodiments, the inputs to the ternary MACs 1915 are 4-bit inputs (the length of the quantized activation values), and the ternary MACs 1915 output 6-bit values. The adder tree 1920 receives these 6-bit values and outputs a 10-bit value after several stages of addition. It should be noted that this description refers to handling of signed 4-bit input values. Some embodiments can also handle unsigned input values by converting them to signed input values before performing the addition operations. For example, some embodiments output and store 4-bit outputs, which can be signed or unsigned. Before performing the addition operations, an additional bit is added that either sign-extends (to convert signed 4-bit inputs to signed 5-bit inputs) or 0-pads (to convert unsigned 4-bit inputs to signed 5-bit inputs).

While this diagram shows the wires (or some of the wires) connecting each of the input values 1905 to a single partial dot product computation circuit, in some embodiments each of these input values 1905 in the activation window buffer is actually connected to each of the partial dot product computation circuits in the core. That is, for the case with 64 such circuits, each value in the activation window buffer is carried by 128 total wires to 128 multiplexers (two for each of the partial dot product computation circuits). In some embodiments, the wiring arrangement is the same for each set of multiplexers (i.e., for each partial dot product computation circuit).

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. In this case, some of the activations 1905 are mapped to three of the multiplexers 1910, rather than two. In addition, some embodiments use a different size activation window buffer (e.g., with 128 activations rather than 144).

Figure 20:
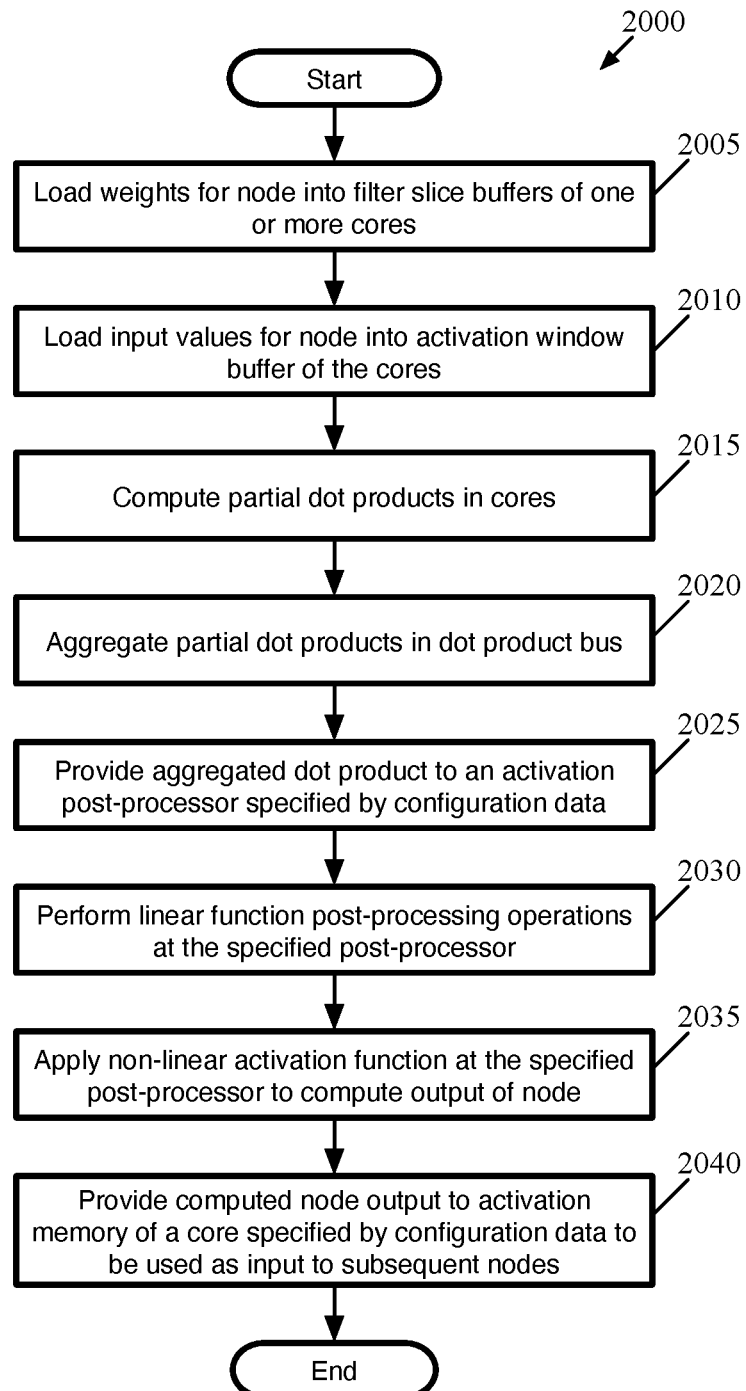
FIG. 20 conceptually illustrates a process of some embodiments for executing a set of instructions (or a portion of a set of instructions) to compute the output of a neural network node.

FIG. 20 conceptually illustrates a process 2000 of some embodiments for executing a set of instructions (or a portion of a set of instructions) to compute the output of a neural network node (specifically, a convolutional or fully-connected node). The process 2000 is executed by the chip fabric of a neural network IC, such as that described above. Typically, the process 2000 is executed simultaneously for multiple nodes, and operations 2010-2040 are performed repeatedly for multiple activation windows (i.e., multiple groups of input values loaded into the activation window buffer) in order to completely execute a layer (or portion of a layer) of the neural network. In the case of the process 2000, the dot product can be computed in a single cycle and does not involve any split filter slices (i.e., no time-multiplexing is required).

As shown, the process begins (at 2005) by loading the weights for a node into filter slice buffers of one or more cores. In addition, the process loads (at 2010) the input (activation) values for the node into the activation window buffer of these cores. In some embodiments, a set of input values are loaded into one activation window buffer in a core while the weight data for several nodes are loaded into several filter slice buffers of the core. Other embodiments load the weight data into the filter slice buffers first, then load the input values into the activation window buffer. Furthermore, some embodiments load the weight data once for a pass (that computes outputs for many activation nodes), then iteratively load sets of input values and compute dot products for numerous nodes without the need to re-load the weight data. In addition, the weights and activations for a node, in some embodiments, are divided among the filter slice and activation window buffers of all of the cores that are active for the current set of instructions. The storage of the weight and activation values and loading of these values into the filter slice buffer and activation window buffer, respectively, are also described in greater detail below.

The process 2000 then computes (at 2015) partial dot products in the cores. As described above, the activation values loaded into the activation window buffers in each of the active cores are multiplied by their corresponding weight values loaded into the filter slice buffers of these cores. In some embodiments, the size of the partial dot products is reduced using the wiring structure shown in FIG. 19, and with ternary weight values of $\{0, 1, -1\}$, the multiplication is handled by the ternary MAC circuits shown in this figure.

Next, the process aggregates (at 2020) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 2000 then provides (at 2025) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 2000 performs (at 2030) linear function post-processing operations. For all dot products, this includes the bias and scale operations described by reference to FIG. 16 above, with the values for these operations sent as configuration data from the cluster controller. In addition, certain dot products are aggregated over multiple cycles by the dot product input processing circuit (e.g., if time-multiplexing is required to handle dot products with a large number of components, or for dot products with double the standard number of bits).

Next, the process 2000 applies (at 2035) the non-linear activation function at the post-processing unit to complete the calculation of the node output value. In some embodiments, as shown in FIG. 16, a lookup table is used for this computation (e.g., a 5-bit to 4-bit mapping table). The mapping for each possible set of input bits is provided by configuration data from the cluster controller in some embodiments.

In some embodiments, the operations 2015-2035 are executed to compute the node output without storing the any intermediate values in memory. That is, none of the partial dot products are stored in any memories (e.g., RAM) during the computation within the core, and the same is true before and during the aggregation within the dot product bus. In some embodiments, a register is used to aggregate multiple dot product bus inputs over multiple cycles. However, in a standard case (e.g., for 4-bit dot products), this register passes the dot product input through and the entire set of operations 2015-2035 is executed in a single clock cycle.

Finally, the process 2000 provides the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s). In some embodiments, once at the specified core, the node output value may be temporarily stored in a write cache until the write cache is full and the data is written to the core memory.

As mentioned, the process 2000 illustrates the most simplistic case for computing a dot product. For this simplest type of dot product computation, the neural network computation circuit of some embodiments places the following restrictions on the computation: (i) all of the input values should be of the specified discrete size (e.g., 4 bits), (ii) the maximum number of input values is the size of the input buffer multiplied by the number of cores (e.g., 144 inputs×16 cores=2304 total input values), (iii) all of the weight values are either 0, +α, or −α (and thus can be stored as 0, 1, and −1), and a large enough percentage of the weight values are 0 that the input values with non-zero weight values can each map to a different multiplexer input.

As mentioned above by reference to FIG. 18, each core includes a block of memory to store the weight data and activation values used by the core to compute dot products (i.e., the activation values that are loaded into the activation window buffer and the weight data that is loaded into the filter slice buffers). In some embodiments, each core is allocated the same amount of memory in total, which is divided between weight memory and activation memory for a particular network by the compiler that designs the program for the inference circuit to execute the network. Some embodiments require that each core be divided between weight memory and activation memory in the same manner (i.e., the allocation of weight/activation memory to each core is the same for all of the cores), while other embodiments allow for different allocations between the cores. For example, in some embodiments the allocation is the same for each core within a cluster, but can vary between cores in different clusters (e.g., if a subset of cores are used for a majority of the layers of the network, then that subset of cores might need more of its memory allocated to weight data storage.

Within a core, the weight memory and activation memory partitions are themselves subdivided between layers of the network. As described above, all of the weight data used by a core is stored in the memory of that core at bootup time, because these values are the same for every input provided to the network. On the other hand, the activation values are determined at runtime (and occupy more memory per value than the weight data), so the cores do not store all of the activation values at a time. Depending on the type of network, only two layers of activations may need to be stored at once (the input activation values for the current layer being executed as well as the output activation values for that layer). In this case, once layer L is being executed (using the layer L activations as inputs and outputting the layer L+1 activations), the circuit can overwrite the layer L-1 activations. On the other hand, if a network has residual connections (i.e., the output activations from layer L are used as inputs for more than just layer L+1), then more than two layers of activations may need to be stored at once.

Figure 21:
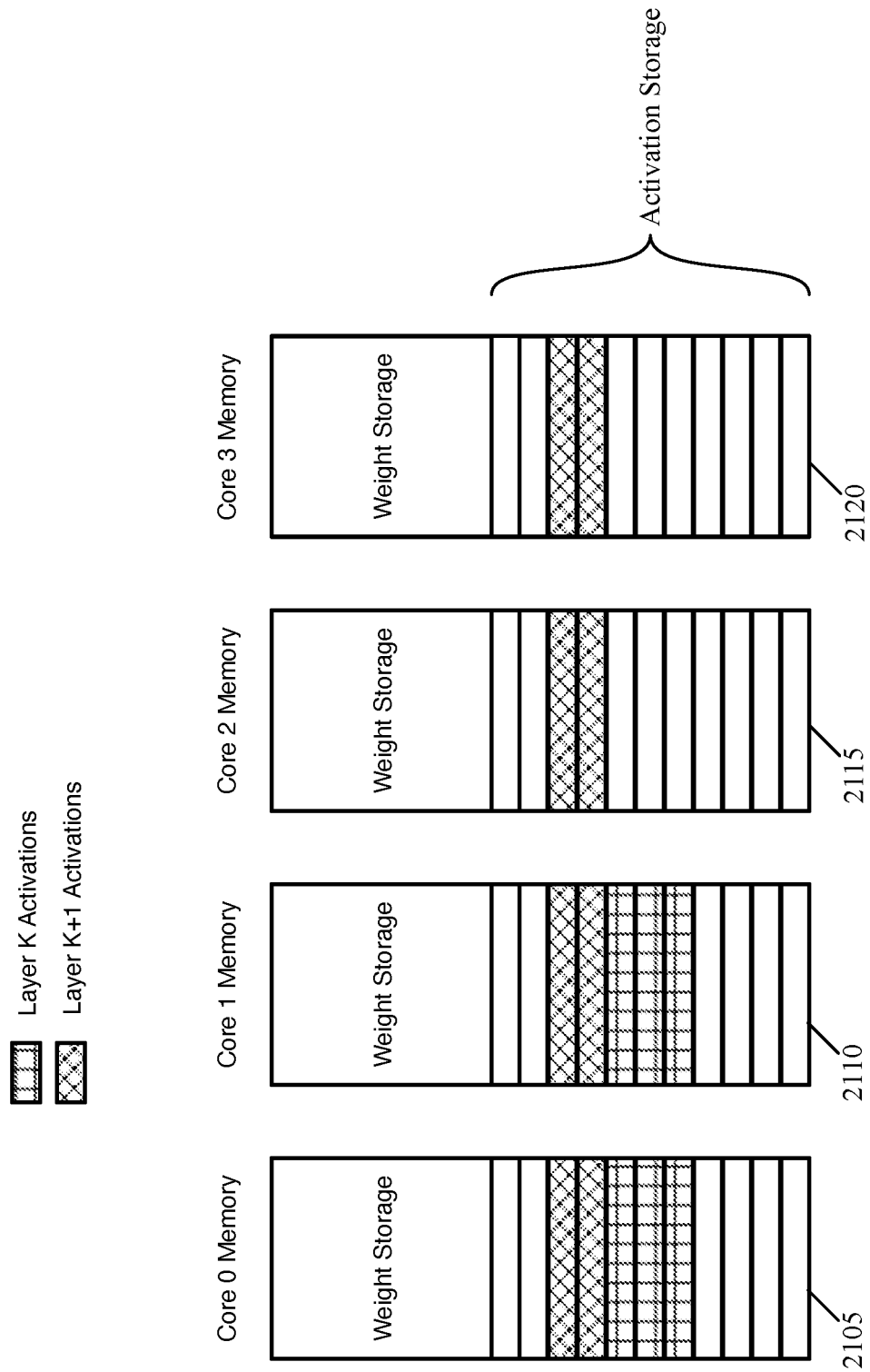
FIG. 21 conceptually illustrates the assignment of layers of activations to memories of four cores within a cluster.

FIG. 21 conceptually illustrates the assignment of layers of activations to memories 2105-2120 of four cores within a cluster. In this example, each of the cores is partitioned into weight storage (shown in the figure as a single block) as well as activation storage (shown as blocks of memory). Each of the blocks within the activation storage represents a set of memory locations (e.g., a bank of RAM, each containing numerous RAM words) in some embodiments. Though the figure shows a small number of such blocks within each core memory 2105-2120, it should be understood that a typical neural network computation circuit will have thousands of RAM words per memory. In addition, although the activation partition is larger than the weight partition in this example, the weight partition will often be the larger partition because all of the weight values for the entire network are stored in the memories at boot time.

The figure illustrates (using different types of crosshatching) the memory portions allocated to the activation values (i.e., input activation values) for each of two layers (layer K and layer K+1). In this example, the activations for layer K are divided across the memories 2105 and 2110 for two of the cores (meaning that only these two cores participate in the dot product calculations for this layer), whereas the activations for layer K+1 are divided across the memories 2105-2120 for all four illustrated cores. When there are replica layers, the input activations are the same for each replica layer, and the output activations for the replica layers will all be stored across the same set of cores (which may not be the same as the cores storing the input activations). For each of the layers, the first RAM word storing activations for that layer is aligned to the same memory address (i.e., the first activation for the layer stored in each core starts at an equivalent memory location within the respective core). In addition, the first activation for a layer starts at the beginning of a RAM word (i.e., the least significant bit in the word) in some embodiments.

In some embodiments, the activation values for a layer are divided evenly among the cores storing the activations for that layer (or as close to evenly as possible). Some embodiments require that the number of cores for a layer is a multiple of the number of cores in a cluster (e.g., a multiple of four). Other embodiments simply impose the requirement that the number of two-dimensional activation grids assigned to each core is equal (or as close to equal as possible). Referring to the three-dimensional structure of a layer of activations shown in FIG. 2, each two-dimensional grid of activations is assigned entirely to a single core. As such, if the number of activation grids is not evenly divisible by the number of cores to which those activations are assigned, then some of the cores will be assigned more of the actual activation values than other cores. However, some embodiments assign zero-grids (i.e., grids of activation values equal to zero) to make up the difference and even out the number of activations in each core for the layer. In other embodiments, rather than specifically ensuring the activation values are all zero (which would require generating one or more extra activation value grids of zeros and loading these values into the RAM each time the network is executed), the compiler ensures that the corresponding weight values stored in the weight memory are all zero, such that the data used for these activation value grids does not matter).

In addition, as shown in FIG. 21, all of the activation values for a layer are assigned to a contiguous block of each core's memory. As described further below, in certain cases, a portion of a RAM word may be zero-padded (or left with unverified data that is not used in the computations for the layer) within this contiguous block of memory.

Figure 22:
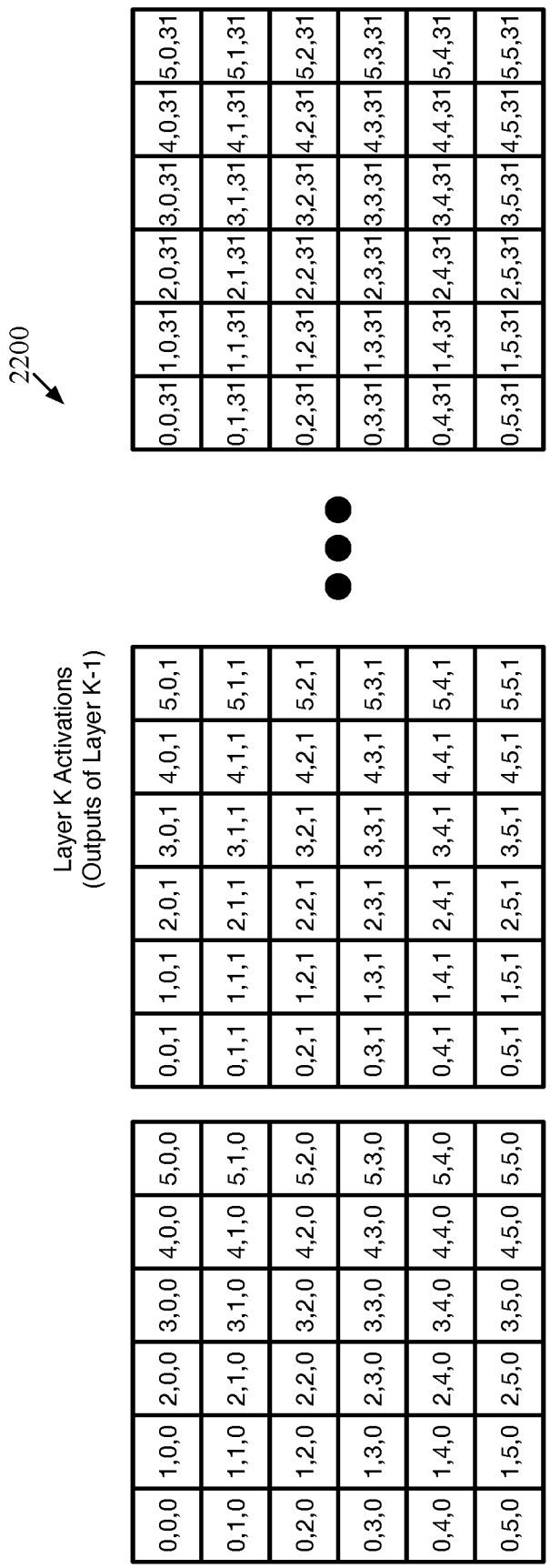
FIG. 22 conceptually illustrates a layer of activation values.
Figure 23:
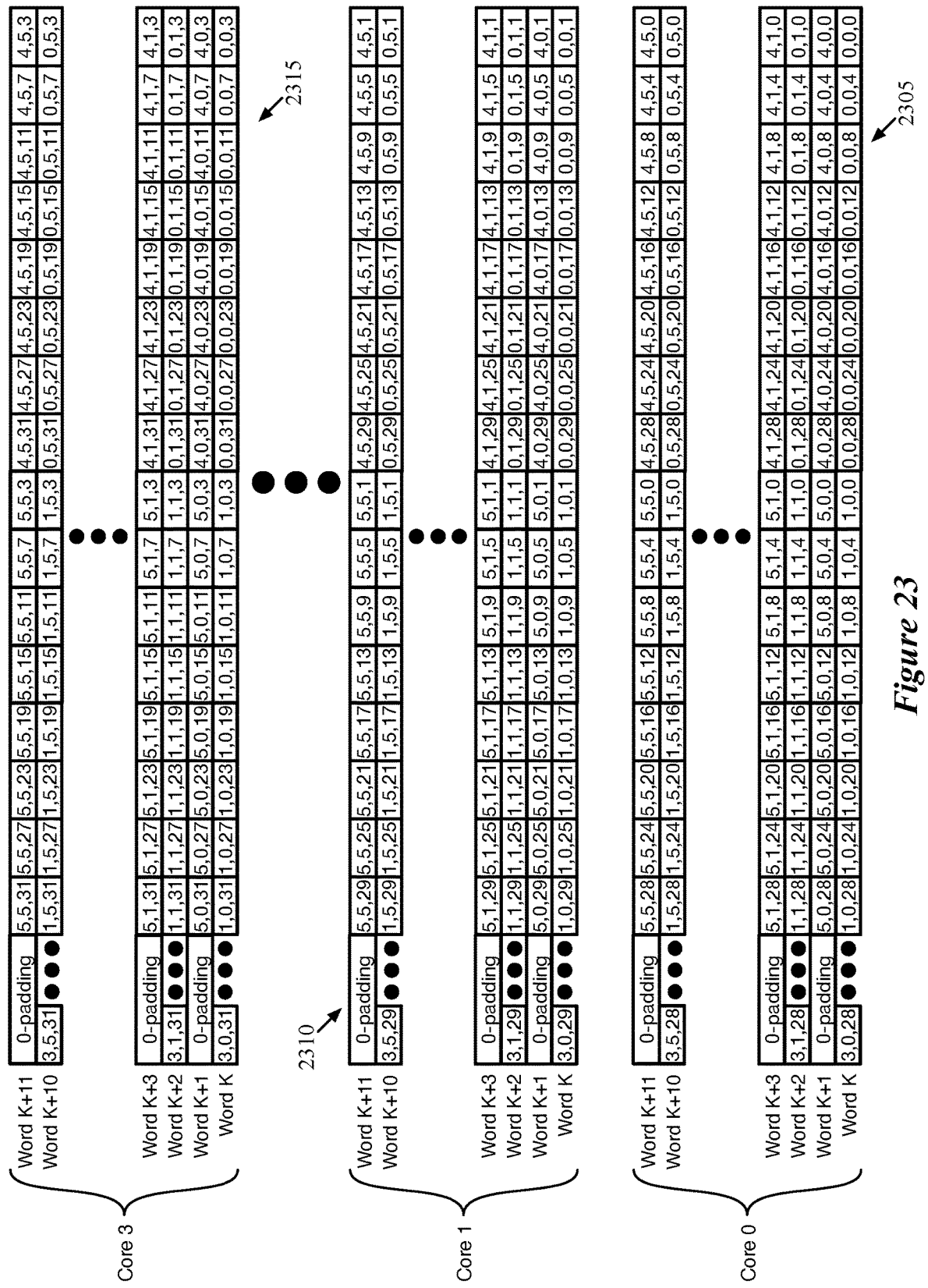
FIG. 23 conceptually illustrates the arrangement of the activation values of FIG. 22 among the memory of four cores.

FIG. 22 conceptually illustrates a layer of activation values 2200, and FIG. 23 conceptually illustrates the arrangement of these activation values 2200 among the memory of four cores. As shown in FIG. 22, the layer K activation values are structured as a 6×6×32 layer (i.e., 32 6×6 grids, meaning that the previous layer most likely had 32 filters). Each activation value in the layer is labeled with a three-dimensional (x, y, z) coordinate. The x-coordinate refers to the column to which the activation belongs (0-5), the y-coordinate refers to the row to which the activation belongs (0-5), and the z-coordinate refers to the grid to which the activation belongs (0-31). Each of these activations will have different values depending on the input data provided to the network, but the activation value at a given coordinate will be stored in the same location in the core memories each time the network is executed.

FIG. 23, as mentioned, illustrates the arrangement of the activation values 2200 according to the activation storage rules of some embodiments. In this case, the compiler determined that the activation values 2200 of Layer K will be stored in four cores of the neural network computation fabric (Cores 0-3). The memories 2305-2315 of each of the cores include numerous banks of RAM in some embodiments, divided into words that can each be read from or written to individually. These words may have different lengths in different embodiments; in this example, the words are each 128 bits long. Thus, if the activation values are each 4-bit values (as is the case in some embodiments), then a single word can hold 32 activation values. When larger 8-bit activation values are used, then a single word holds 16 activation values. In the figure, each word is shown with the least significant bits on the right, which will be referred to as the "start" of the word. Thus, the rightmost 4 bits (least significant nibble) of each word holds the first activation value of the word. In addition, the words are ordered, with this example showing the first word in each core (or at least the first word for the illustrated layer of activation values) at the bottom of the diagram.

To optimize the use of the core memory as well as the efficiency with which the activation values are read from the core memory, some embodiments organize the activation values in the memory according to a set of defined rules (which are shown by way of example in FIG. 23). As mentioned, each two-dimensional grid of activation values is assigned entirely to a single core. In this example, grids {0, 4, 8, . . . 28} are assigned to Core 0, grids {1, 5, 9, . . . 29} are assigned to Core 1, grids {2, 6, 10, . . . 30} are assigned to Core 2, and grids {3, 7, 11, . . . 31} are assigned to Core 3. The compiler may use different algorithms to assign grids of activation values to different cores in some embodiments, so long as the grids are assigned evenly (or as close as possible to evenly) to the cores.

The activation values within a core are not necessarily arranged with all of the activation values of a grid stored contiguously. Instead, within each core, some embodiments store all of the activations for a particular coordinate (i.e., an x-y coordinate) within the grids assigned to that core in a contiguous block. For a typical convolution, all of the activation values at a particular (x,y) coordinate will be used for dot product computations at the same time, so storing these values contiguously helps minimize resources used (and latency) for loading the activation values when computing the dot products for a layer.

As shown, the activation memory for layer K in each core starts with the activations at (0,0) for all of the grids assigned to that core. In this case, eight grids of activation values are assigned to each of the four cores (the 32 grids are evenly divisible by 4, so no zero-grids are required). Thus, the first eight values of the first word in each core (designated as word K) are the activations with (x,y) coordinates of (0,0). In some embodiments, if there are more grids assigned to a core than the number of activation values that a memory location (i.e., a RAM word) can store, then these are split up into separate sets of activations, and only a single word worth of activation values at the same coordinate are stored contiguously. That is, if 35 grids of activation values were assigned to Core 0, then only the first 32 activation values would have coordinates of (0,0). Those first 32 grids would be stored as a contiguous block that iterates through each (x,y) coordinate, followed by the remaining 3 grids of activation values (stored in the same way, iterating through each (x,y) coordinate).

Within the memory 2305-2315 of each core, the first 8 activation values are those located at coordinate (0,0). Next, the algorithm for activation value storage moves to the activation values coordinate (1,0)—that is, the x-coordinate is incremented as the next value in the same row of each grid is stored. This proceeds until the end of the current row is reached (i.e., the activation values with coordinate (5,0)). In some embodiments, once the end of a row in the activation grids is reached, the remainder of the current RAM word is 0-padded. As shown in the figure, this means that the last half (64 bits, or 16 activations) of word K+1 (as well as words K+3, K+5, etc.) in each of the memories 2305-2315 is 0-padded (or padded with unverified data that is never loaded into the activation window buffer). This pattern (arranging the activation values in row-major order) is repeated for each row of activation values in the grids assigned to a given core.

When loading the activation values as inputs to dot product computation, upon reaching the end of a row of the activation grids, the core memory controller returns to the start of the next row, and the activation values from the end of the previous row are not reused. The use of 0-padding (rather than starting the next row of activation values in the same RAM word) avoids the need to read multiple words when starting a new row of convolutional layer computations (which would require additional clock cycles).

As a result of this activation storage algorithm, a given memory location in one source core for a layer will store activations for the same x-y coordinates as that memory location in any of the other source cores. For example, the tenth activation in RAM word K+1 of Core 0 is the activation for coordinate (5,0) in activation grid 4. Correspondingly, the tenth activation in RAM word K+1 of any of the other cores is also an activation for coordinate (5,0), in different activation grids.

The weight values are stored in a similar manner, in some embodiments, with certain differences. Just as activation values for a layer are divided across multiple cores (and, specifically, the activation values for each particular dot product in a layer are divided across the multiple cores), the weight values for each filter in a layer also divided across these same multiple cores. Over the course of a convolutional layer, a particular weight value in a filter is multiplied by numerous activation values, all of which are in the same activation grid. As such, each weight value is stored in the same core as the activation grid that contains the activations by which that weight value is multiplied. However, in some embodiments, the length of each filter slice may be different, even within a single layer, due to the different number of non-zero weight values. That is, even if a filter slice buffer always has 36 (or 40) weight values, the amount of memory required to store those weight values may differ depending on the number of non-zero weight values. For a set of replica layers, the same input activations are used for each of the layers, and thus the weight values for each replica layer are stored in the same set of cores as the activations. If the replica layers have fewer non-zero weight values than the original layer, then the weights for these replica layers will occupy less memory in some embodiments.

Figure 24:
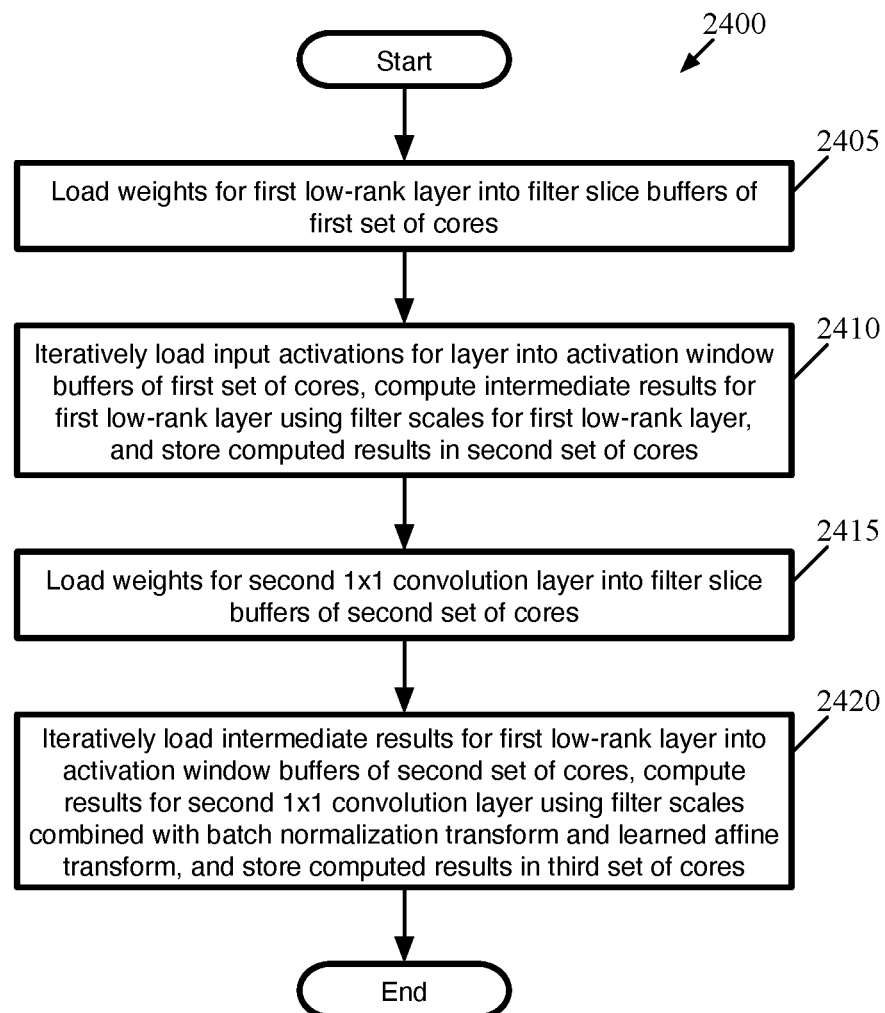
FIG. 24 conceptually illustrates a process 2400 of some embodiments for executing a decomposed layer on a neural network inference circuit.

Now that the circuits for executing convolutional and fully-connected layers on a neural network inference circuit of some embodiments have been described, the process for executing a decomposed layer on such a circuit will be elaborated upon. FIG. 24 conceptually illustrates a process 2400 of some embodiments for executing a decomposed layer on a neural network inference circuit such as that described herein. In some embodiments, the decomposition is invisible to the neural network inference circuit, which simply executes two layers according to instructions for these layers. Similarly, the compiler that generates the instructions for the neural network inference circuit treats the layers as two convolutional layers with different properties (i.e., different filter sizes, stride, padding, affine transform, activation function, etc.).

As shown, the process 2400 begins by loading (at 2405) the weights for the first low-rank layer into the filter slice buffers of a first set of cores. Ideally, because the decomposition reduces the number of filters in this layer, all of the filters can be handled at once (if there are more filters in the layer than filter slice buffers per core, then multiple passes are required for the layer). The compiler determines the first set of cores that store these weights.

Next, the process 2400 iteratively (at 2410) loads the input activations for the first low-rank layer into the activation window buffers of the first set of cores, computes the intermediate results for the first low-rank layer (using these input activations and the weights loaded into the filter slice buffers), and stores the computed results in a second set of cores. As described above, the read controllers in the first set of cores load a set of input activation values into the activation window buffers of their respective cores. Once these values are loaded, the adder trees in these cores compute partial dot products, which are combined in the dot product bus. These combined dot products are provided to the post-processing units, which perform any scaling and bias that is required. In some embodiments, the scaling factors determined for each filter during training (the factors in the tensor $Q^A$) are used to scale the dot products. In some embodiments, no activation function is applied at this time, though the output value is quantized. In some embodiments, even if the input activations to each layer are 4-bit values, the intermediate values output by the post-processing units for the first low-rank layer are 8-bit values so as to preserve more of the intermediate computations. The outputs of the post-processing units are then stored in the second set of cores, which may be the same as the first set of cores, different than the first set of cores but with overlapping cores, or completely separate from the first set of cores, depending on the decisions made by the compiler. Additional input activations are then loaded into the activation window buffer, the partial dot products are again computed and scaling factors applied, and the next set of results for the first low-rank layer are stored in the second set of cores. This set of operations is repeated until the first low-rank layer is complete.

After completing the low-rank first layer (i.e., one or more passes through the set of input activations, depending on the number of filters in the low-rank layer) and storing all of the intermediate values in the second set of cores, the process 2400 loads (at 2415) the weights for the second 1×1 convolution layer into the filter slice buffers of the second set of cores. The compiler determines the second set of cores that store these weights, which is the same as the cores in which the intermediate results are stored. In general, the filters are fairly small (because they are 1×1 filters, and so the rank of the first layer is equal to the number of weights in each filter of the second layer) such that they might only require the use of a single core (though this is also dependent on having enough storage in the single core for all of the intermediate values, enough of the weights of each filter being set to zero, etc.).

Finally, the process 2400 iteratively (at 2420) loads the intermediate results from the first low-rank layer into the activation window buffers of the second set of cores, computes the results for the second 1×1 convolutional layer (using these intermediate results and the weights loaded into the filter slice buffers), and stores the computed results in a third set of cores. As described above, the read controllers in the second set of cores load a set of input activation values into the activation window buffers of their respective cores. Once these values are loaded, the adder trees in these cores compute partial dot products, which are combined in the dot product bus. These combined dot products are provided to the post-processing units, which perform any scaling and bias that is required. In some embodiments, the scaling factors determined for each filter during training (the factors in the tensor $Q^B$) are combined with the batch normalization transform and the learned affine transform. In some embodiments, the activation function for the decomposed layer is applied at this time, and the output value is quantized. In some embodiments, 4-bit or 8-bit activation values are used, depending on the network settings. The outputs of the post-processing units are then stored in the third set of cores, which may be the same as the first and/or second sets of cores, different than the first and/or second sets of cores but with overlapping cores, or completely separate from the first and/or second sets of cores, depending on the decisions made by the compiler. Additional input activations are then loaded into the activation window buffer, the partial dot products are again computed and scaling factors applied, and the next set of results for the 1×1 convolutional layer are stored in the third set of cores. This set of operations is repeated until the second 1×1 convolutional layer is complete.

Such a neural network inference circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the neural network inference circuit to be executed on the device. These devices can include mobile devices, desktop computers, Internet of Things (IoT devices), etc.

Figure 25:
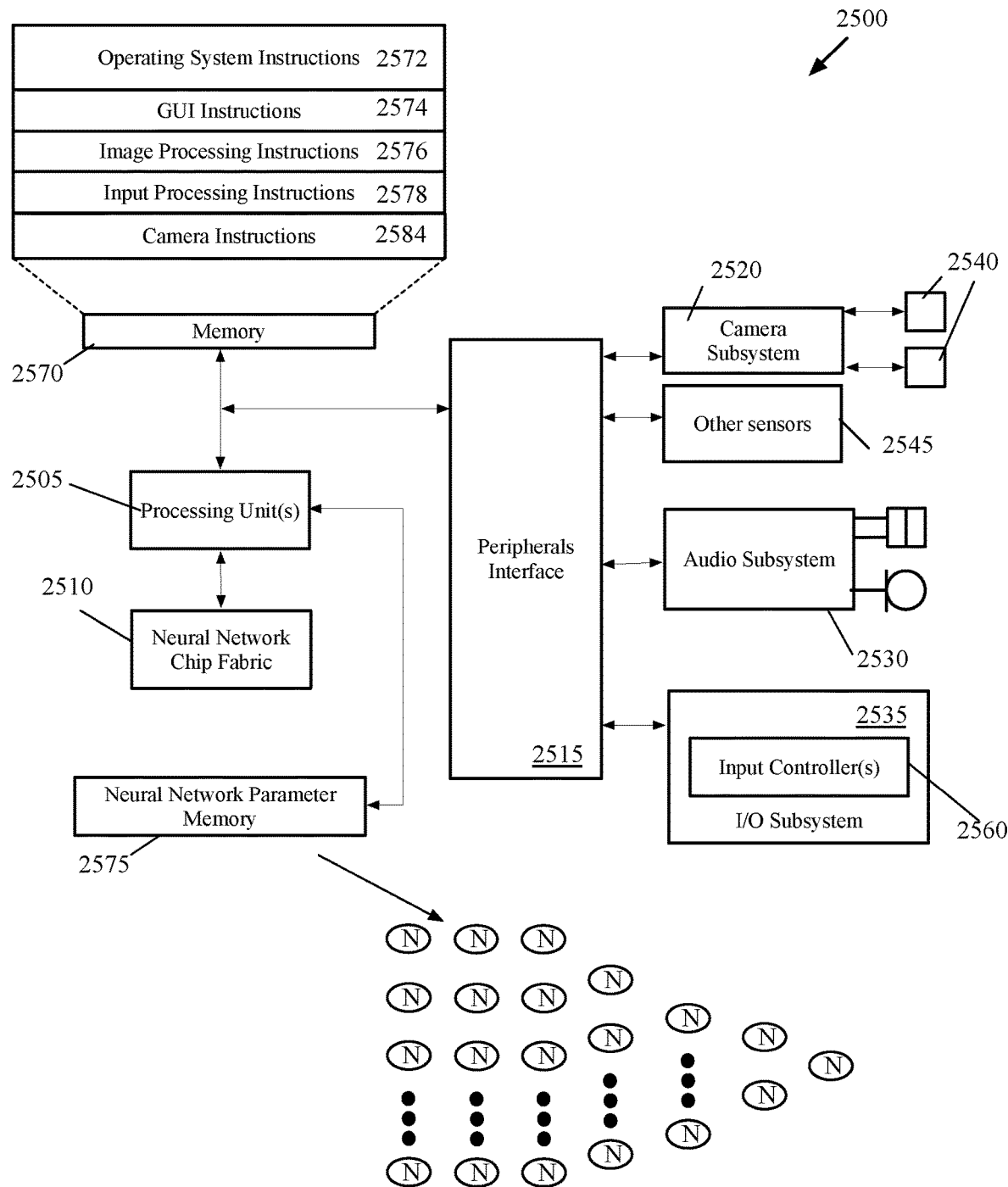
FIG. 25 illustrates an example of the architecture of a mobile computing device that stores neural network processing instructions.

FIG. 25 is an example of an architecture 2500 of an electronic device that includes a neural network integrated circuit of some embodiments. The electronic device may be a mobile computing device such as a smartphone, tablet, laptop, etc., or may be another type of device (e.g., an IoT device, a personal home assistant). As shown, the device 2500 includes one or more general-purpose processing units 2505, a neural network chip fabric 2510, and a peripherals interface 2515.

The peripherals interface 2515 is coupled to various sensors and subsystems, including a camera subsystem 2520, an audio subsystem 2530, an I/O subsystem 2535, and other sensors 2545 (e.g., motion/acceleration sensors), etc. The peripherals interface 2515 enables communication between the processing units 2505 and various peripherals. For example, an orientation sensor (e.g., a gyroscope) and an acceleration sensor (e.g., an accelerometer) can be coupled to the peripherals interface 2515 to facilitate orientation and acceleration functions. The camera subsystem 2520 is coupled to one or more optical sensors 2540 (e.g., charged coupled device (CCD) optical sensors, complementary metal-oxide-semiconductor (CMOS) optical sensors, etc.). The camera subsystem 2520 and the optical sensors 2540 facilitate camera functions, such as image and/or video data capturing.

The audio subsystem 2530 couples with a speaker to output audio (e.g., to output voice navigation instructions). Additionally, the audio subsystem 2530 is coupled to a microphone to facilitate voice-enabled functions, such as voice recognition, digital recording, etc. The I/O subsystem 2535 involves the transfer between input/output peripheral devices, such as a display, a touch screen, etc., and the data bus of the processing units 2505 through the peripherals interface 2515. The I/O subsystem 2535 various input controllers 2560 to facilitate the transfer between input/output peripheral devices and the data bus of the processing units 2505. These input controllers 2560 couple to various input/control devices, such as one or more buttons, a touch-screen, etc.

In some embodiments, the device includes a wireless communication subsystem (not shown in FIG. 25) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 25, a memory 2570 (or set of various physical storages) stores an operating system (OS) 2572. The OS 2572 includes instructions for handling basic system services and for performing hardware dependent tasks. The memory 2570 also stores various sets of instructions, including (1) graphical user interface instructions 2574 to facilitate graphic user interface processing; (2) image processing instructions 2576 to facilitate image-related processing and functions; (3) input processing instructions 2578 to facilitate input-related (e.g., touch input) processes and functions; and (4) camera instructions 2584 to facilitate camera-related processes and functions. The processing units 2505 execute the instructions stored in the memory 2570 in some embodiments.

The memory 2570 may represent multiple different storages available on the device 2500. In some embodiments, the memory 2570 includes volatile memory (e.g., high-speed random access memory), non-volatile memory (e.g., flash memory), a combination of volatile and non-volatile memory, and/or any other type of memory.

The instructions described above are merely exemplary and the memory 2570 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 2575 stores the weight values, bias parameters, etc. for implementing one or more machine-trained networks by the neural network chip fabric 2510. In some embodiments, different clusters of the fabric 2510 can implement different machine-trained networks in parallel in some embodiments. In different embodiments, these neural network parameters are stored on-chip (i.e., in memory that is part of the neural network chip fabric 2510) or loaded onto the IC 2510 from the neural network parameter memory 2575 via the processing unit(s) 2505.

While the components illustrated in FIG. 25 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 2505 and the neural network IC 2510, which enables the processing units 2505 to provide inputs to the neural network IC 2510 and receive the outputs of the network from the IC 2510. Also, while many of the functions have been described as being performed by one component, one of ordinary skill in the art will realize that the functions described with respect to FIG. 25 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 26:
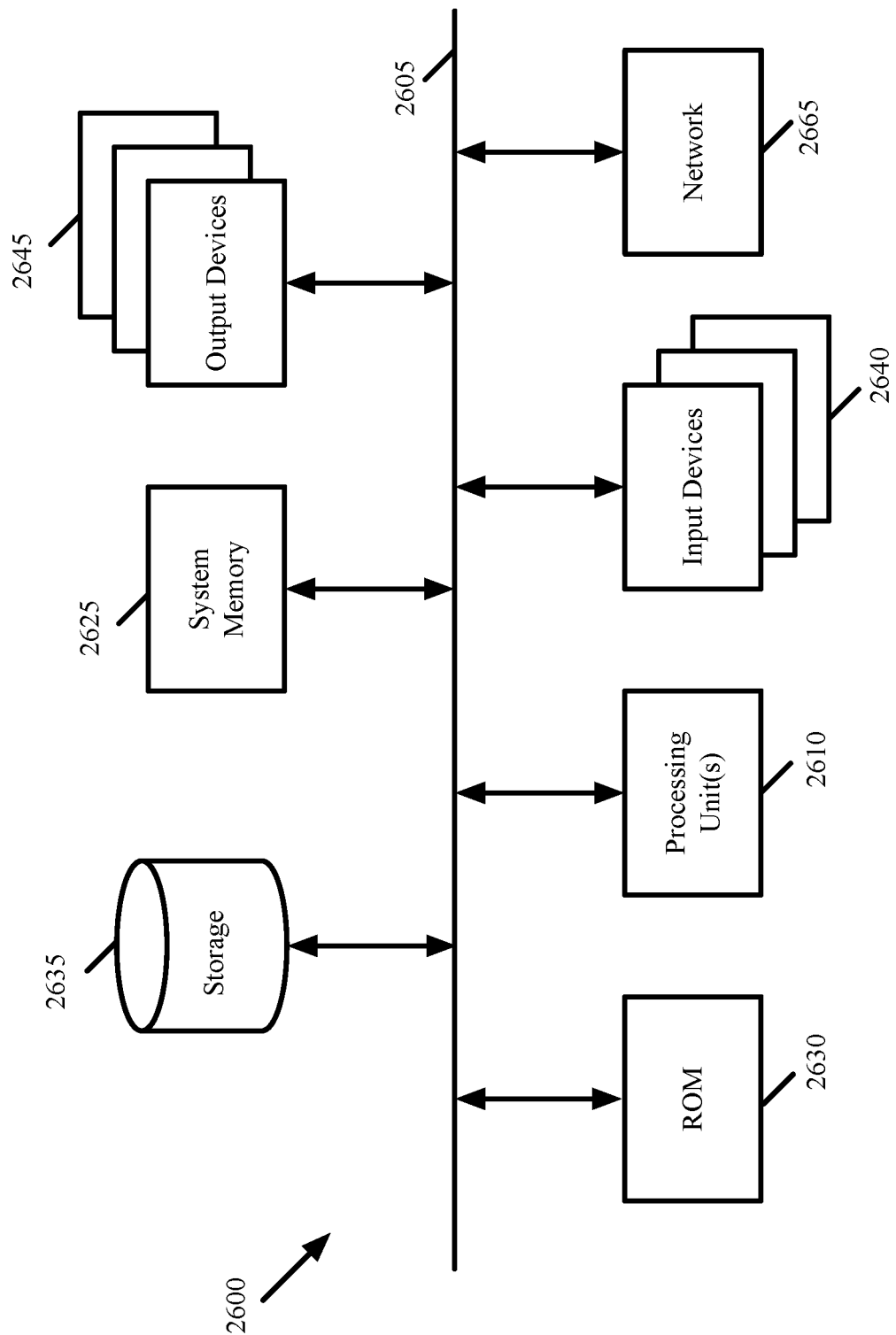
FIG. 26 conceptually illustrates an electronic system with which some embodiments of the invention are implemented.

FIG. 26 conceptually illustrates an electronic system 2600 with which some embodiments of the invention are implemented. The electronic system 2600 can be used to execute any of the applications (e.g., the training application) described above. The electronic system 2600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2600 includes a bus 2605, processing unit(s) 2610, a system memory 2625, a read-only memory 2630, a permanent storage device 2635, input devices 2640, and output devices 2645.

The bus 2605 collectively represents all system, peripheral, and chipset buses that communicatively connect the numerous internal devices of the electronic system 2600. For instance, the bus 2605 communicatively connects the processing unit(s) 2610 with the read-only memory 2630, the system memory 2625, and the permanent storage device 2635.

From these various memory units, the processing unit(s) 2610 retrieves instructions to execute and data to process in order to execute the processes of the invention. The processing unit(s) may be a single processor or a multi-core processor in different embodiments, and may include generic CPUs as well as graphics processing units (GPUs).

The read-only-memory (ROM) 2630 stores static data and instructions that are needed by the processing unit(s) 2610 and other modules of the electronic system. The permanent storage device 2635, on the other hand, is a read-and-write memory device. This device is a non-volatile memory unit that stores instructions and data even when the electronic system 2600 is off. Some embodiments of the invention use a mass-storage device (such as a magnetic or optical disk and its corresponding disk drive) as the permanent storage device 2635.

Other embodiments use a removable storage device (such as a floppy disk, flash drive, etc.) as the permanent storage device. Like the permanent storage device 2635, the system memory 2625 is a read-and-write memory device. However, unlike storage device 2635, the system memory is a volatile read-and-write memory, such a random-access memory. The system memory stores some of the instructions and data that the processor needs at runtime. In some embodiments, the invention's processes are stored in the system memory 2625, the permanent storage device 2635, and/or the read-only memory 2630. From these various memory units, the processing unit(s) 2610 retrieves instructions to execute and data to process in order to execute the processes of some embodiments.

The bus 2605 also connects to the input and output devices 2640 and 2645. The input devices enable the user to communicate information and select commands to the electronic system. The input devices 2640 include alphanumeric keyboards and pointing devices (also called "cursor control devices"). The output devices 2645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 26, bus 2605 also couples electronic system 2600 to a network 2665 through a network adapter (not shown). In this manner, the computer can be a part of a network of computers (such as a local area network ("LAN"), a wide area network ("WAN"), or an Intranet, or a network of networks, such as the Internet. Any or all components of electronic system 2600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 3, 8, 11, 20, and 24) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for training a plurality of parameters of a machine-trained (MT) network to enable execution of the MT network on a particular type of neural network inference circuit, the method comprising:
   receiving a first MT network comprising a plurality of layers of computation nodes, wherein each computation node of a set of the layers computes an output value based on a set of input values and a set of trained weight values, wherein a first layer of the first MT network comprises a first number of filters;
   generating a modified, second MT network by replacing the first layer with (i) a second layer having a second number of filters that is less than the first number of filters and (ii) a third layer following the second layer, the third layer having the first number of filters,
      wherein (i) each weight value in each respective filter of the filters of the second and third layers is restricted to a respective set of allowed quantized weight values and (ii) a first total number of weight values in the filters of the second and third layers is less than a second total number of weight values in the filters of the first layer,
      wherein the reduction in the total number of weight values enables the second MT network to be loaded onto and executed by the particular type of neural network inference circuit by reducing a number of weight values to be stored by the neural network inference circuit; and
   retraining the weight values of the first MT network with a loss function that includes (i) a first term measuring a difference between expected outputs and generated outputs for a set of inputs and (ii) a second term that biases the weight values of the first layer towards a matrix representing the quantized weight values of the replacement second and third layers.

2. The method of claim 1, wherein (i) each filter of the first layer comprises a particular number of weight values, (ii) each filter of the second layer comprises the same particular number of weight values, and (iii) each filter of the third layer comprises a smaller number of weight values than the particular number of weight values.

3. The method of claim 2, wherein the third layer is a 1×1 convolutional layer, such that the number of weight values in each filter of the third layer is equal to the number of filters in the second layer.

4. The method of claim 2, wherein each filter of the first layer has an associated stride and zero-padding, wherein each filter of the second layer has the same associated stride and zero-padding.

5. The method of claim 4, wherein each filter in the third layer is a 1×1 convolutional filter with a stride of 1 and no zero-padding.

6. The method of claim 1, wherein (i) each filter of the first layer comprises a first number of weight values, (ii) each filter of the second layer comprises a second number of weight values smaller than the first number of weight values, and (iii) each filter of the third layer comprises a third number of weight values smaller than the first number of weight values.

7. The method of claim 6, wherein (i) the first layer is a k×k convolutional layer, (ii) the second layer is a k×1 convolutional layer, and (iii) the third layer is a 1×k convolutional layer.

8. The method of claim 1, wherein the first layer is trained with floating-point weight values, wherein the set of allowed quantized weight values for each weight value comprises a ternary set of values.

9. The method of claim 8, wherein replacing the first layer comprises decomposing the floating-point weight values of the first layer into (i) ternary weight values of the second layer, (ii) a first set of scale values for the second layer, (iii) ternary weight values of the third layer, and (iv) a second set of scale values for the third layer.

10. The method of claim 9, wherein each ternary weight value is a member of the set $\{1, 0, -1\}$.

11. The method of claim 9, wherein (i) the first set of scale values comprises a different scale value for each filter of the second layer and (ii) the second set of scale values comprises a different scale value for each filter of the third layer.

12. The method of claim 9, wherein:
the floating-point weight values of the first layer are stored in a first weight tensor, the ternary weight values of the second layer are stored in a second weight tensor, and the ternary weight values of the third layer are stored in a third weight tensor;
each row in the second weight tensor corresponds to a filter of the second layer and each row in the third weight tensor corresponds to a filter of the third layer; and
each respective column in the third weight tensor corresponds to weight values that are multiplied by output values from a respective filter in the second layer.

13. The method of claim 9, wherein decomposing the floating-point values of the first layer comprises performing singular value decomposition.

14. The method of claim 9, wherein the decomposition accounts for relative importances of each weight value in the filters of the first layer.

15. The method of claim 9, wherein the decomposition accounts for a sparsity requirement that defines a minimum number of weight values that are set to zero.

16. The method of claim 1 further comprising, after retraining the weight values of the first MT network, generating a modified, third MT network by again replacing the first layer with (i) a fourth layer having a third number of filters that is less than the first number of filters and (ii) a fifth layer following the fourth layer, the fifth layer having the first number of filters.

17. The method of claim 1, wherein the second term is a loss-aware penalty term that, for each weight value of the first layer, accounts for an increase in loss when quantizing the weight values of the second and third layers.

18. A non-transitory machine-readable medium storing a program which when executed by at least one processing unit trains a plurality of parameters of a machine-trained (MT) network to enable execution of the MT network on a particular type of neural network inference circuit, the program comprising sets of instructions for:

receiving a first MT network comprising a plurality of layers of computation nodes, wherein each computation node of a set of the layers computes an output value based on a set of input values and a set of trained weight values, wherein a first layer of the first MT network comprises a first number of filters trained with floating-point weight values; and generating a modified, second MT network by decomposing the floating-point weight values of the first layer and replacing the first layer with (i) a second layer having a second number of filters that is less than the first number of filters and (ii) a third layer following the second layer, the third layer having the first number of filters, wherein (i) each weight value in each respective filter of the filters of the second and third layers is restricted to a respective ternary set of allowed quantized weight values, (ii) a first total number of weight values in the filters of the second and third layers is less than a second total number of weight values in the filters of the first layer, and (iii) the floating-point weight values are decomposed into (1) ternary weight values of the second layer, (2) a first set of scale values for the second layer, (3) ternary weight values of the third layer, and (4) a second set of scale values for the third layer, wherein the decomposition of the floating-point weight values into a reduced number of ternary weight values enables the second MT network to be loaded onto and executed by the particular type of neural network inference circuit by reducing a number of weight values to be stored by the neural network inference circuit.

19. The non-transitory machine-readable medium of claim 18, wherein (i) each filter of the first layer comprises a particular number of weight values, (ii) each filter of the second layer comprises the same particular number of weight values, and (iii) each filter of the third layer comprises a smaller number of weight values than the particular number of weight values.

20. The non-transitory machine-readable medium of claim 19, wherein the third layer is a 1×1 convolutional layer, such that the number of weight values in each filter of the third layer is equal to the number of filters in the second layer.

21. The non-transitory machine-readable medium of claim 19, wherein:
each filter of the first layer has an associated stride and zero-padding;
each filter of the second layer has the same associated stride and zero-padding; and
each filter in the third layer is a 1×1 convolutional filter with a stride of 1 and no zero-padding.

22. The non-transitory machine-readable medium of claim 18, wherein (i) the first set of scale values comprises a different scale value for each filter of the second layer and (ii) the second set of scale values comprises a different scale value for each filter of the third layer.

23. The non-transitory machine-readable medium of claim 18, wherein:
the floating-point weight values of the first layer are stored in a first weight tensor, the ternary weight values of the second layer are stored in a second weight tensor, and the ternary weight values of the third layer are stored in a third weight tensor;

each row in the second weight tensor corresponds to a filter of the second layer and each row in the third weight tensor corresponds to a filter of the third layer; and each respective column in the third weight tensor corresponds to weight values that are multiplied by output values from a respective filter in the second layer.

24. The non-transitory machine-readable medium of claim 18, wherein the decomposition accounts for (i) relative importances of each weight value in the filters of the first layer and (ii) a sparsity requirement that defines a minimum number of weight values that are set to zero.

* * * * *